(12) United States Patent
Lin et al.

(10) Patent No.: US 11,330,575 B2
(45) Date of Patent: May 10, 2022

(54) ADAPTATION OF COMMUNICATION PARAMETERS FOR A USER EQUIPMENT

(71) Applicant: Samsung Electronics Co., Ltd., Suwon-si (KR)

(72) Inventors: Qiongjie Lin, Mountain View, CA (US); Hongbo Si, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 16/512,196

(22) Filed: Jul. 15, 2019

(65) Prior Publication Data

US 2020/0029315 A1     Jan. 23, 2020

Related U.S. Application Data

(60) Provisional application No. 62/855,344, filed on May 31, 2019, provisional application No. 62/835,257, (Continued)

(51) Int. Cl.
*H04W 72/04*     (2009.01)
*H04L 1/00*     (2006.01)
(Continued)

(52) U.S. Cl.
CPC ........ *H04W 72/042* (2013.01); *H04B 7/0413* (2013.01); *H04L 1/0026* (2013.01);
(Continued)

(58) Field of Classification Search
CPC ... H04W 72/042; H04W 80/08; H04W 76/28; H04W 24/08; H04L 1/0026;
(Continued)

(56) References Cited

U.S. PATENT DOCUMENTS

| 2010/0215011 A1* | 8/2010 | Pan | H04L 5/14 370/329 |
| 2012/0009923 A1* | 1/2012 | Chen | H04L 5/0053 455/434 |

(Continued)

OTHER PUBLICATIONS

Catt et al., "New SID: Study on UE Power Saving in NR", 3GPP TSG RAN Meetings #80, Jun. 11-14, 2018, RP-181463, 5 pages.
(Continued)

*Primary Examiner* — Steven H Nguyen

(57) ABSTRACT

A UE includes a transceiver configured to receive an adaptation request (AR) via a DCI format in a PDCCH. The UE further includes a processor configured to configure the transceiver to operate in a first state associated with a reception of a first DCI format in a first search space set in response to an AR reception outcome, and to operate in a second state associated with a reception of a second DCI format in a second search space set. A BS includes a transceiver configured to transmit an AR via a DCI format in a PDCCH. The BS includes a processor configured to configure the transceiver to operate in a first state associated with a transmission of a first DCI format in a first search space set, and to operate in a second state associated with a transmission of a second DCI format in a second search space set.

20 Claims, 27 Drawing Sheets

Related U.S. Application Data filed on Apr. 17, 2019, provisional application No. 62/828,715, filed on Apr. 3, 2019, provisional application No. 62/806,419, filed on Feb. 15, 2019, provisional application No. 62/755,235, filed on Nov. 2, 2018, provisional application No. 62/732,288, filed on Sep. 17, 2018, provisional application No. 62/717,240, filed on Aug. 10, 2018, provisional application No. 62/699,255, filed on Jul. 17, 2018.

(51) Int. Cl.
*H04L 5/00* (2006.01)
*H04W 80/08* (2009.01)
*H04W 76/28* (2018.01)
*H04B 7/0413* (2017.01)
*H04W 24/08* (2009.01)

(52) U.S. Cl.
CPC .......... *H04L 5/0051* (2013.01); *H04W 24/08* (2013.01); *H04W 76/28* (2018.02); *H04W 80/08* (2013.01)

(58) Field of Classification Search
CPC ... H04L 5/0051; H04L 5/0007; H04L 5/0091; H04L 5/0044; H04L 1/0046; H04L 1/0075; H04B 7/0413
See application file for complete search history.

(56) References Cited

U.S. PATENT DOCUMENTS

| | | |
|---|---|---|
| 2014/0177582 A1 | 6/2014 | Wu et al. |
| 2016/0366672 A1 | 12/2016 | Papasakellariou et al. |
| 2017/0135127 A1* | 5/2017 | Nogami ............ H04W 72/0453 |
| 2017/0318565 A1 | 11/2017 | Golitschek Edler von Elbwart et al. |
| 2018/0332566 A1* | 11/2018 | You ........................ H04L 1/0091 |
| 2019/0246378 A1* | 8/2019 | Islam .................. H04W 72/042 |
| 2021/0120572 A1* | 4/2021 | Chen ................. H04W 72/0493 |

OTHER PUBLICATIONS

"3rd Generation Partnership Project; Technical Specification Group Services and System Aspects; Release 15 Description; Summary of Rel-15 Work Items (Release 15)", 3GPP TR 21.915 V0.2.0 (Jul. 2018), Jul. 13, 2018, 89 pages.

International Search Report dated Oct. 25, 2019 in connection with International Patent Application No. PCT/KR2019/008848, 3 pages.

Written Opinion of the International Searching Authority dated Oct. 25, 2019 in connection with International Patent Application No. PCT/KR2019/008848, 6 pages.

"5G; NR; Physical channels and modulation (3GPP TS 38.211 version 15.5.0 Release 15)", ETSI TS 138 211 V15.5.0, Apr. 2019, 98 Pages.

"5G; NR; Multiplexing and channel coding (3GPP TS 38.212 version 15.5.0 Release 15)", ETSI TS 138 212 V15.5.0, May 2019, 104 pages.

"5G; NR; Physical layer procedures for control (3GPP TS 38.213 version 15.5.0 Release 15)", ETSI TS 138 213 v15.5.0, May 2019, 106 pages.

"5G; NR; Physical layer procedures for data (3GPP TS 38.214 version 15.5.0 Release 15)", ETSI TS 138 214 V15.5.0, May 2019, 105 pages.

"3rd Generation Partnership Project; Technical Specification Group Radio Access Network; NR; Physical layer measurements, (Release 15)", 3GPP TS 38.215 V15.5.0, Jun. 2019, 16 pages.

"5G; NR; Medium Access Control (MAC) protocol specification (3GPP TS 38.321 version 15.5.0 Release 15)", ETSI TS 138 321 V15.5.0, May 2019, 80 pages.

"5G; NR; Radio Resource Control (RRC); Protocol specification (3GPP TS 38.331 version 15.5.1 Release 15)", ETSI TS 138 331 V15.5.1, May 2019, 488 pages.

Extended European Search Report dated Feb. 18, 2022 regarding Application No. 19838210.3, 9 pages.

Qualcomm Incorporated, "Remaining Issues on DL/UL Resource Allocation", 3GPP TSG-RAN WG1 Meeting #93, R1-1807652, May 2018, 16 pages.

MediaTek Inc., "Summary of Cross-slot Scheduling Power-Saving Techniques", 3GPP TSG RAN WG1 Meeting #97, R1-1907918, May 2019, 26 pages.

\* cited by examiner

ADAPTATION OF COMMUNICATION PARAMETERS FOR A USER EQUIPMENT

CROSS-REFERENCE TO RELATED APPLICATIONS AND CLAIMS OF PRIORITY

This application claims priority under 35 U.S.C. § 119(e) to: U.S. Provisional Patent Application No. 62/699,255 filed on Jul. 17, 2018; U.S. Provisional Patent Application No. 62/717,240 filed on Aug. 10, 2018; U.S. Provisional Patent Application No. 62/732,288 filed on Sep. 17, 2018, U.S. Provisional Patent Application No. 62/755,235 filed on Nov. 2, 2018, U.S. Provisional Patent Application No. 62/806,419 filed on Feb. 15, 2019, U.S. Provisional Patent Application No. 62/828,715 filed on Apr. 3, 2019, U.S. Provisional Patent Application No. 62/835,257 filed on Apr. 17, 2019, and U.S. Provisional Patent Application No. 62/855,344 filed on May 31, 2019. The above-identified provisional patent application is hereby incorporated by reference in their entirety.

TECHNICAL FIELD

The present disclosure generally relates to communication systems and, in particular, to adapting parameters for communication between a user equipment (UE) and a base station.

BACKGROUND

To meet the increased demand for wireless data services since the deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beamforming, massive multiple-input multiple-output (MIMO), Full Dimensional MIMO (FD-MIMO), array antenna, analog beamforming, and large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To reduce UE power consumption in wireless communication systems, there is a need to design an adaptation procedure for a UE operation and enable a UE to transmit an adaptation request to a serving base station (gNB) or enable a gNB to transmit an adaptation request to the UE that can be facilitated by assistance information from the UE. There is another need to specify UE adaptation schemes for UE power consumption characteristics in frequency, time, and antenna domains, in a DRX configuration, and in a UE processing timeline. There is yet another need to design a downlink physical layer signal/channel for signaling from a gNB to a UE an adaptation of parameters in the UE operation. There is yet another need to design an uplink physical layer signal/channel for a UE to signal an adaptation request to a gNB for parameters in the UE operation. There is yet another need to specify parameters that comprise assistance information that a UE transmits to a gNB to enable the gNB to determine an adaptation for parameters in the UE operation.

SUMMARY

The present disclosure relates to a pre-5G or 5G communication system to be provided for supporting higher data rates beyond 4G communication system such as Long Term Evolution (LTE).

In one embodiment, a UE includes a transceiver configured to receive an adaptation request (AR) via a downlink control information (DCI) format in a physical downlink control channel (PDCCH). The UE further includes a processor operably connected to the transceiver. The processor is configured to configure the transceiver to operate in a first state associated with a reception of a first DCI format in a first search space set in response to an AR reception outcome, and configure the transceiver to operate in a second state associated with a reception of a second DCI format in a second search space set.

In another embodiment, a base station (BS) includes a transceiver configured to transmit an adaptation request (AR) via a downlink control information (DCI) format in a physical downlink control channel (PDCCH). The BS further includes a processor operably connected to the transceiver. The processor is configured to configure the transceiver to operate in a first state associated with a transmission of a first DCI format in a first search space set depending on the AR transmission, and configure the transceiver to operate in a second state associated with a transmission of a second DCI format in a second search space set.

In another embodiment, a method for a UE to configure a receiver is provided. The method includes receiving an adaptation request (AR) via a downlink control information (DCI) format in a physical downlink control channel (PDCCH), and configuring the receiver to operate in a first state associated with a reception of a first DCI format in a first search space set in response to an AR reception outcome, and configuring the receiver to operate in a second state associated with a reception of a second DCI format in a second search space set.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

This disclosure relates to designing an adaptation procedure for a UE operation to enable signaling for both an adaptation request from the UE to a serving base station (gNB) and an adaptation request from the gNB to the UE that can be based on assistance information from the UE. This disclosure also relates to enabling adaptation schemes in a UE operation to support the adaptation on UE operating characteristics in frequency, time, and antenna domains, in Discontinuous Reception (DRX) configuration, and in processing timeline. This disclosure further relates to designing a downlink (DL) physical layer signal/channel for a gNB to signal to a UE information for the UE to adapt parameters of the UE operation. This disclosure additionally relates to designing an uplink (UL) physical layer signal/channel for a UE to transmit an adaptation request to a gNB. This disclosure additionally also relates to specifying assistance information for a UE to transmit to a gNB to assist the gNB in determining adaptations in parameters of the UE operation.

This disclosure also relates to enhancing a design of synchronization signals/physical broadcast channel (SS/PBCH) blocks based mobility measurements by a UE and to enhancing a design of CSI-RS based mobility measurements by a UE for asynchronous networks. This disclosure also relates to reducing an RRM measurement overhead by utilizing a change in UE mobility state or channel condition. This disclosure additionally relates to optimizing a mobility measurement by a UE in discontinuous reception (DRX) operation in a Radio Resource Control (RRC)_CONNECTED state (C-DRX) over reference signal (RS) resources with more flexibility in both time and frequency domains.

Figure 1:
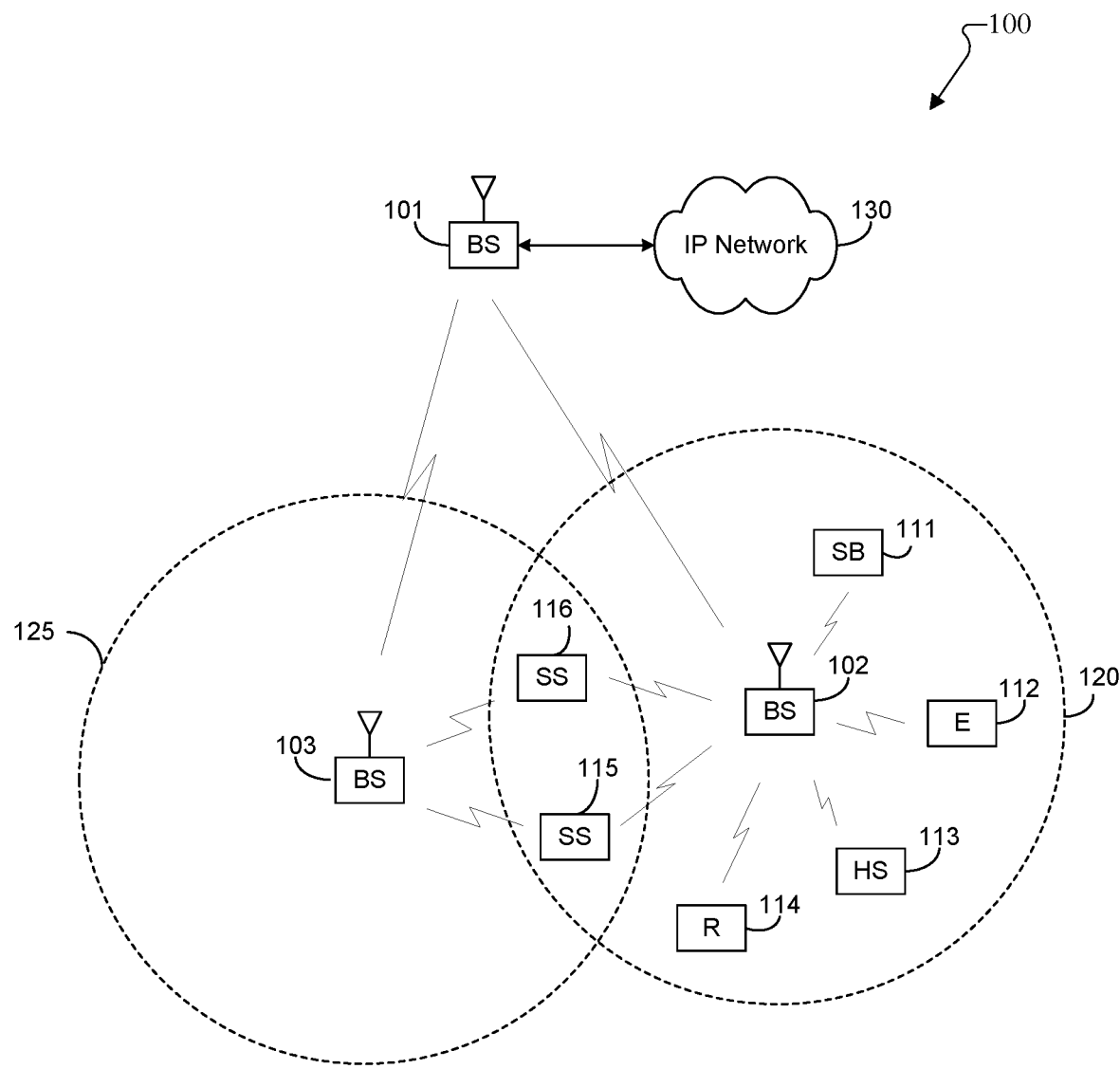
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
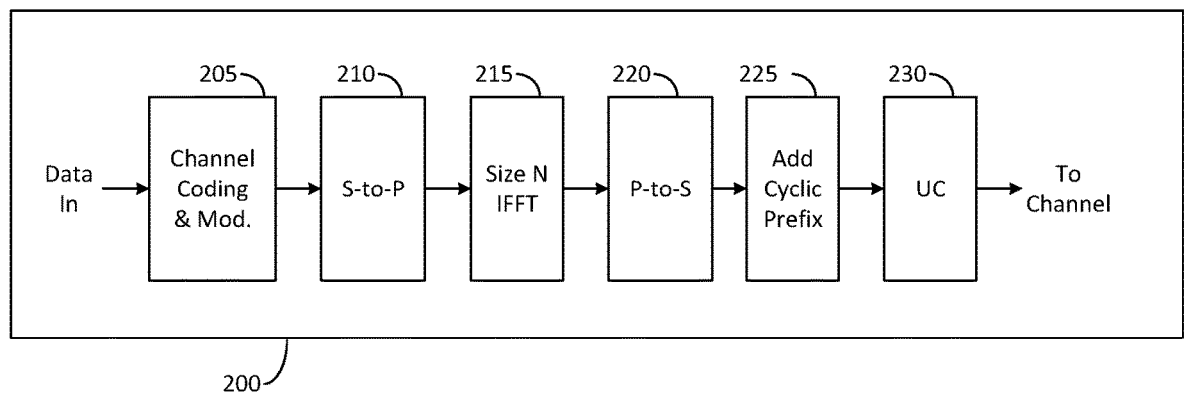
FIGS. 2A and 2B illustrate example wireless transmit and receive paths according to this disclosure.
Figure 2B:
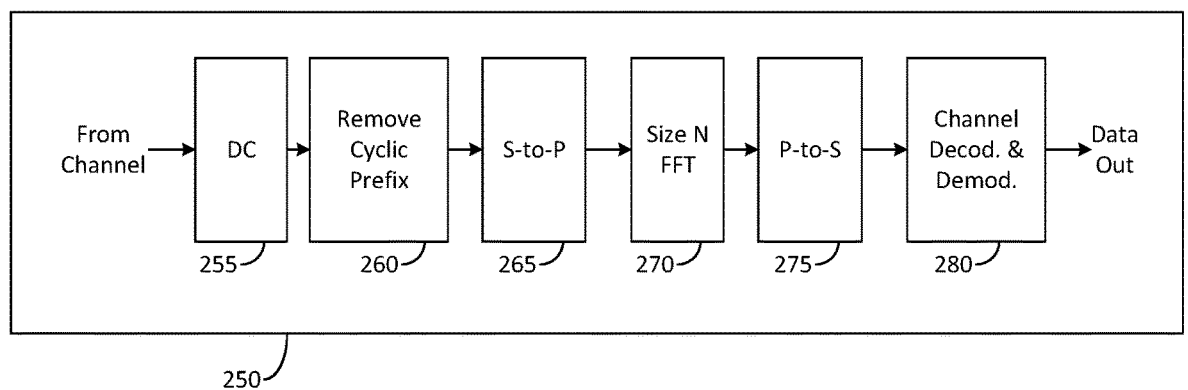

FIGS. 2A and 2B illustrate example wireless transmit and receive paths according to this disclosure. In the following description, a transmit path 200 may be described as being implemented in an gNB (such as gNB 102), while a receive path 250 may be described as being implemented in a UE (such as UE 116). However, it will be understood that the receive path 250 could be implemented in an gNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
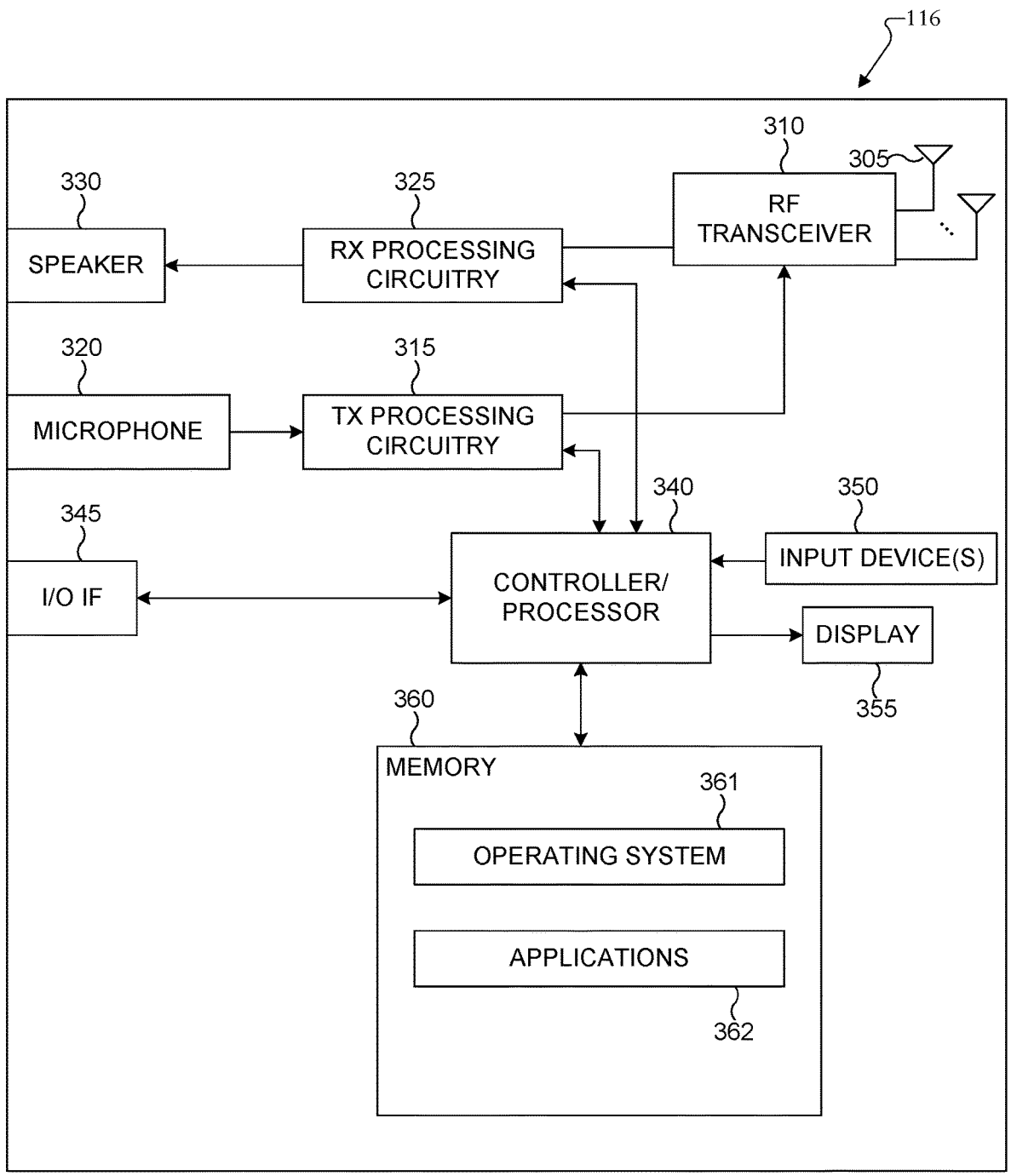
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
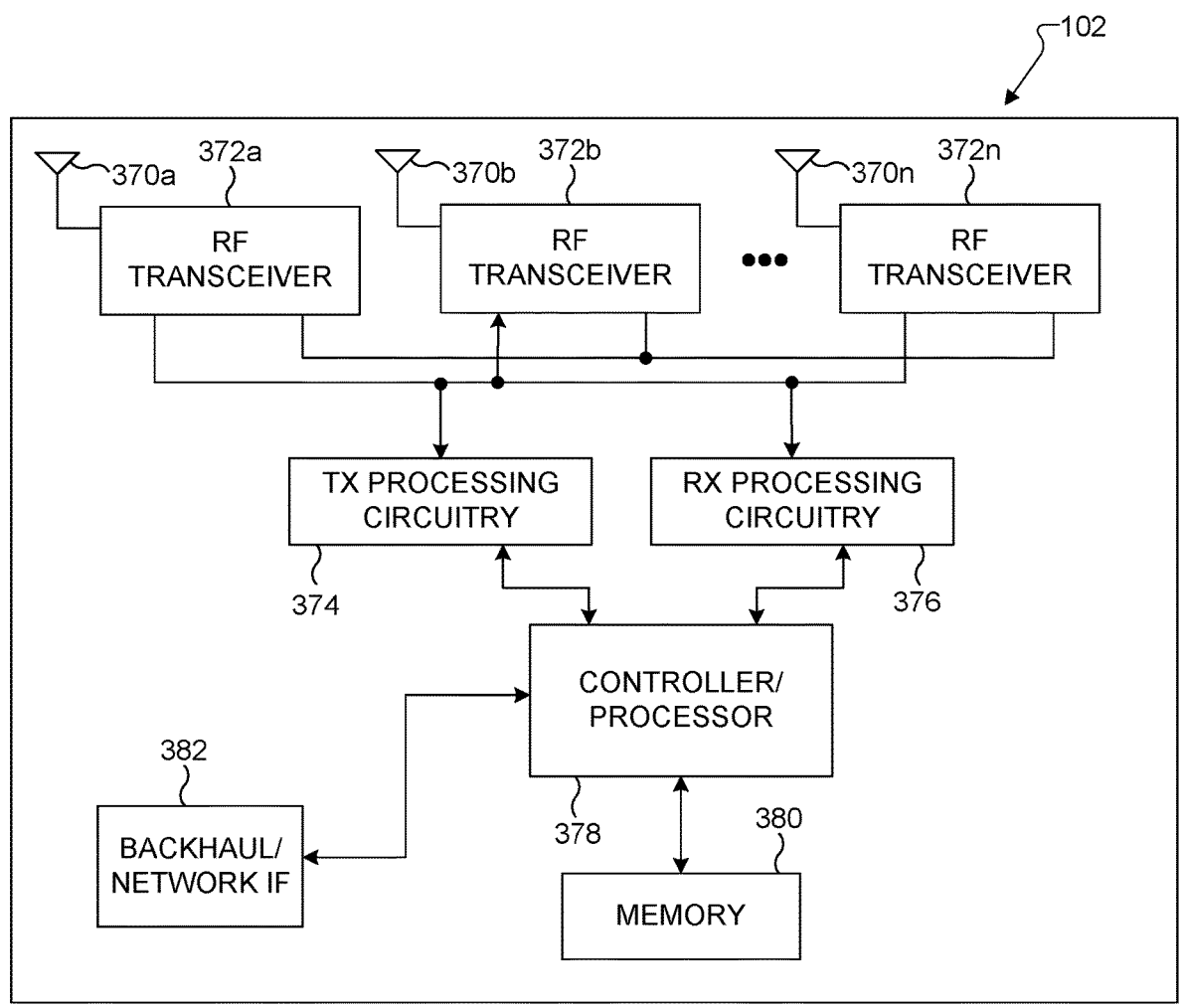
FIG. 3B illustrates an example enhanced NodeB (gNB) according to this disclosure.

FIG. 3B illustrates an example gNB 102 according to this disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the gNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) support communication with aggregation of FDD cells and TDD cells.

Although FIG. 3B illustrates one example of an gNB 102, various changes may be made to FIG. 3B. For example, the gNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

A UE is typically configured by a gNB to monitor multiple locations for respective candidate PDCCH receptions to decode one or more DCI formats. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier. For a DCI format scheduling a PDSCH conveying system information (SI), the RNTI can be a SI-RNTI. For a DCI format scheduling a PDSCH providing a random access response (RAR), the RNTI can be a RA-RNTI. For a DCI format providing transmit power control (TPC) commands to a group of UEs, the RNTI can be a TPC-RNTI. Each RNTI type can be configured to a UE through higher-layer signaling such as RRC signaling. A DCI format scheduling PDSCH reception by a UE is also referred to as DL DCI format or DL assignment while a DCI format scheduling PUSCH transmission from a UE is also referred to as UL DCI format or UL grant.

A PDCCH transmission can be within a set of PRBs. A gNB can configure a UE one or more sets of PRB sets, also referred to as control resource sets (CORESETs), for PDCCH receptions. A PDCCH transmission can be in control channel elements (CCEs) of a CORESET. A UE determines CCEs for a PDCCH reception based on a search space set. A set of CCEs that can be used for PDCCH reception by a UE define a PDCCH candidate location.

Figure 4A:
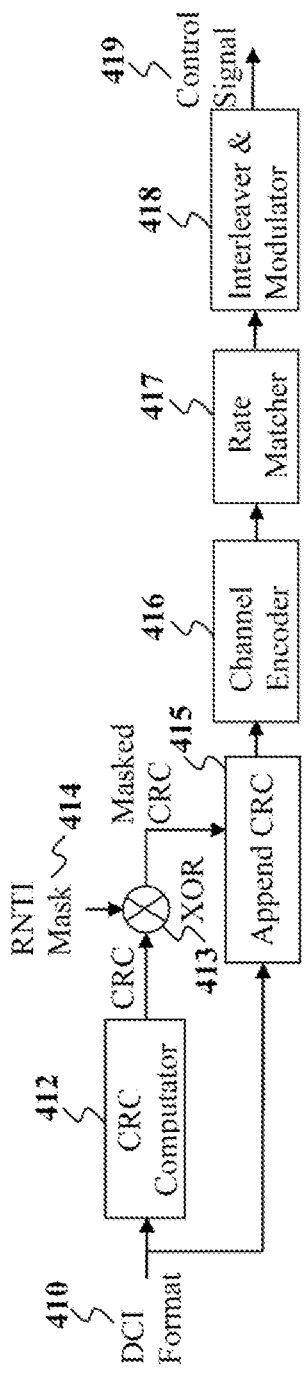
FIG. 4A illustrates an example encoding process for a DCI format according to this disclosure.

FIG. 4A illustrates an example encoding process for a DCI format according to this disclosure. The embodiment shown in FIG. 4A is for illustration only. Other embodiments could be used without departing from the scope of this disclosure.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC can include 16 bits or 24 bits and the RNTI can include 16 bits or 24 bits. Otherwise, when a RNTI is not included in a DCI format, a DCI format type indicator field can be included in the DCI format. The CRC of (non-coded) DCI format information bits 410 is determined using a CRC computation unit 412, and the CRC is masked using an exclusive OR (XOR) operation unit 413 between CRC bits and RNTI bits 414. The XOR operation is defined as XOR(0,0)=0, XOR(0,1)=1, XOR(1,0)=1, XOR(1,1)=0. The masked CRC bits are appended to DCI format information bits using a CRC append unit 415. An encoder 416 performs channel coding (such as tail-biting convolutional coding or polar coding), followed by rate matching to allocated resources by rate matcher 417. Interleaving and modulation units 418 apply interleaving and modulation, such as QPSK, and the output control signal 419 is transmitted.

Figure 4B:
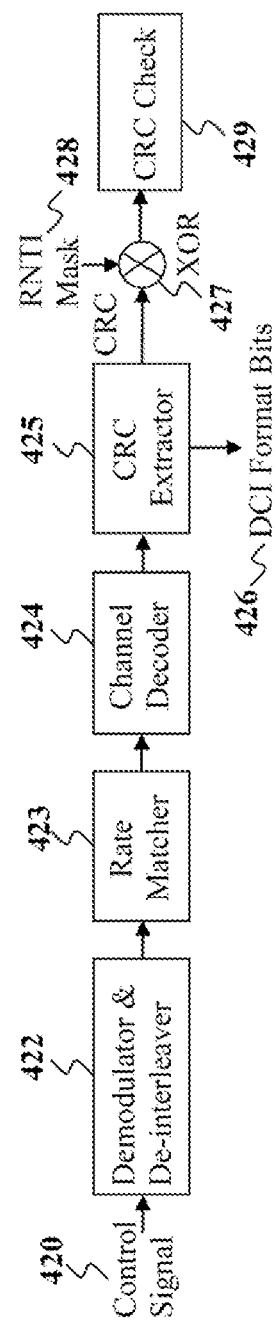
FIG. 4B illustrates an example decoding process for a DCI format according to this disclosure.

FIG. 4B illustrates an example decoding process for a DCI format according to this disclosure. The embodiment shown in FIG. 4B is for illustration only. Other embodiments could be used without departing from the scope of this disclosure.

A received control signal 420 is demodulated and de-interleaved by a demodulator and a de-interleaver 422. A rate matching applied at a transmitter is restored by rate matcher 423, and resulting bits are decoded by decoder 424. After decoding, a CRC extractor 425 extracts CRC bits and provides DCI format information bits 426. The DCI format information bits are de-masked 427 by an XOR operation with a RNTI 428 (when applicable) and a CRC check is performed by unit 429. When the CRC check succeeds (check-sum is zero), the DCI format information bits are considered to be valid (at least when corresponding information is valid). When the CRC check does not succeed, the DCI format information bits are considered to be invalid.

For each DL bandwidth part (BWP) configured to a UE in a serving cell, the UE can be provided by higher layer signaling a number of CORESETs. For each CORESET, the UE is provided: a CORESET index p; a DM-RS scrambling sequence initialization value; a precoder granularity for a number of REGs in frequency where the UE can assume use of a same DM-RS precoder; a number of consecutive symbols; a set of resource blocks; CCE-to-REG mapping parameters; an antenna port quasi co-location; from a set of antenna port quasi co-locations, indicating quasi co-location information of the DM-RS antenna port for PDCCH reception; and/or an indication for a presence or absence of a transmission configuration indication (TCI) field for DCI format 1_1 transmitted by a PDCCH in CORESET p;

For each DL BWP configured to a UE in a serving cell, the UE is provided by higher layers with a number of search space sets where, for each search space set from the number search space sets, the UE is provided the following: a search space set index s; an association between the search space set s and a CORESET p; a PDCCH monitoring periodicity of $k_s$ slots and a PDCCH monitoring offset of $o_s$ slots; a PDCCH monitoring pattern within a slot, indicating first symbol(s) of the control resource set within a slot for PDCCH monitoring; a number of PDCCH candidates $M_s^{(L)}$ per CCE aggregation level L; an indication that search space set s is either a common search space set or a UE-specific search space set; and/or a duration of $T_s<k_s$ slots indicating a number of slots that the search space set s exists.

For a search space set s associated with CORESET p, the CCE indexes for aggregation level L corresponding to PDCCH candidate $m_{s,n_{CI}}$ of the search space set in slot $n_{s,f}^\mu$ for a serving cell corresponding to carrier indicator field value $n_{CI}$ (also referred to as search space) are given as in Equation 1A:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad \text{(Equation 1A)}$$

where: for any common search space, $Y_{p,n_{s,f}^\mu}=0$;
for a UE-specific search space, $Y_{p,n_{s,f}^\mu}=(A_p \cdot Y_{p,n_{s,f}^\mu-1})$ mod D, $Y_{p,-1}=n_{RNTI}\neq 0$, $A_p=39827$ for p mod3=0, $A_p=39829$ for p mod3=1, $A_p=39839$ for p mod3=2, and D=65537; i=0, . . . , L−1;
$N_{CCE,p}$ is the number of CCEs, numbered from 0 to $N_{CCE,p}-1$, in CORESET p;
$n_{CI}$ is the carrier indicator field value if the UE is configured with a carrier indicator field;
otherwise, including for any common search space, $n_{CI}=0$;
$m_{s,n_{CI}}=0, \ldots , M_{p,s,n_{CI}}^{(L)}-1$, where $M_{s,n_{CI}}^{(L)}$ is the number of PDCCH candidates the UE is configured to monitor for aggregation level L for a serving cell corresponding to $n_{CI}$ and a search space set s;
for any common search space, $M_{s,max}^{(L)}=M_{s,0}^{(L)}$;
for a UE-specific search space, $M_{s,max}^{(L)}$ is the maximum of $M_{s,n_{CI}}^{(L)}$ across all configured $n_{CI}$ values for a CCE aggregation level L of search space set s in control resource set p;
the RNTI value used for $n_{RNTI}$.

A PUCCH can be transmitted according to one from multiple PUCCH formats. A PUCCH format corresponds to a structure that is designed for a particular UCI payload range as different UCI payloads require different PUCCH transmission structures to improve an associated UCI BLER. A PUCCH transmission is also associated with a TCI state providing a spatial domain filter for a PUCCH transmission. A PUCCH can be used to convey HARQ-ACK information, SR, or periodic/semi-persistent CSI and their combinations.

A UE can be configured for operation with multiple bandwidth parts (BWP) in a DL system BW (DL BWPs) and in an UL system BW (UL BWP). At a given time, only one DL BWP and only one UL BWP are active for the UE. Configurations of various parameters, such as search space set configuration for PDCCH reception or PUCCH resources for PUCCH transmission, can be separately provided for each respective BWP. A primary purpose for BWP operation is to enable power savings for the UE. When the UE has data to transmit or receive, a large BWP can be used and, for example, search space sets can be more than one and have short monitoring periodicity. When the UE does not have data to transmit or receive, a small BWP can be used and, for example, a single search space set can be configured with longer monitoring periodicity.

From a UE power saving perspective, it is preferable for a UE to turn on its RF and baseband capabilities for receiving and transmitting control and data information as needed according to traffic demand (such as data rate/latency), link characteristics (such as coverage/channel condition), and UE status (such as load/mobility/battery). Compared with a gNB, a UE is more aware of real-time changes on channel conditions, mobility status, as well as traffic patterns, especially in the RRC_CONNECTED state.

Embodiment 1. UE Adaptation Procedure

The first embodiment of this disclosure considers a UE adaptation procedure for enabling signaling of an adaptation request (AR), from the UE or from a serving gNB, that indicates adaptation on different power consumption aspect(s) or configuration parameter(s) for the UE communication with the gNB.

Embodiment 1-A. Adaptation Request from a UE

In one approach of a UE adaptation procedure, an adaptation request (AR) can be transmitted from a UE to a serving gNB. A response by the gNB can be explicit or implicit. For implicit AR response, the UE can either assume that the AR is rejected/accepted by the gNB when the UE does not receive any response from the gNB within a predetermined time period after the UE transmits the AR. Alternatively, the AR from the UE is used by the gNB to assist the gNB in determining a subsequent adaptation to the UE operation and no explicit response is necessary. For explicit AR response, a gNB can transmit to a UE one of the following: in one example, the gNB can transmit a positive acknowledgement (ACK) or a negative acknowledgement (NACK) respectively indicating acceptance or rejection of the AR from the UE; in another example, the gNB can transmit a new or refined AR to the UE to indicate the adaptation parameters to the UE operation. Alternatively, the UE can either assume that the AR is rejected/accepted by default when the UE does not receive any response from the gNB within a predetermined time period after the UE transmits the AR.

An explicit AR from a UE can indicate a request for adapting one or more parameter(s) for transmissions to or receptions from a gNB. For example, an explicit AR can indicate a subset of a set of CCE ALs for monitoring PDCCH, such as ALs of {1, 2} CCEs from a set of {1, 2, 4, 8, 16} CCEs. For example, an explicit AR can be a request for the UE to switch from a first state to a second state for transmission or reception parameters, where a set of states for transmission or reception parameters can be provided to UE in advance, for example, through higher layer signaling or can be predefined in the specification of the system operation.

Figure 5:
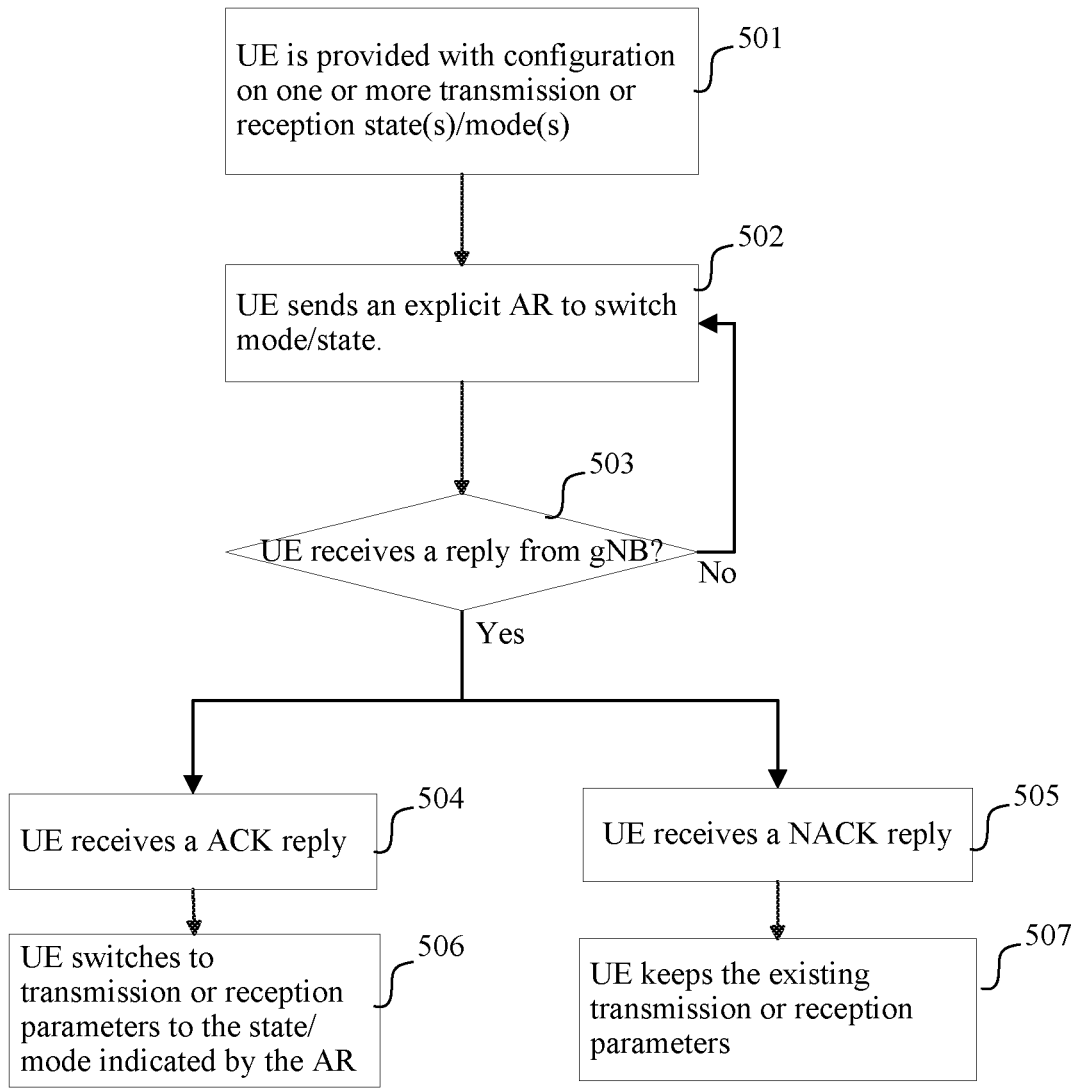
FIG. 5 illustrates an example of a UE procedure for adaptation of a transmission or reception state based on an explicit AR according to one embodiment of the present disclosure.

FIG. 5 illustrates an example of a UE procedure for adaptation of a transmission or a reception state based on an explicit AR according to one embodiment of the present disclosure. The embodiment shown in FIG. 5 is for illustration only. Other embodiments could be used without departing from the scope of this disclosure.

A UE can be provided with a configuration for one or more transmission or reception state(s)/mode(s), for example through higher layer signaling from gNB, in step 501. The UE can transmit an explicit AR to switch transmission or reception mode/state in step 502. For example, the AR can indicate switching transmission or reception parameters to a power saving mode/state from a normal state. For another example, the AR can indicate to switch transmission or reception parameters to a normal state/mode from a power saving state/mode. The UE then determines whether or not the UE receives a response from the gNB in step 503. When the UE receives an ACK from the gNB in step 504, the UE switches transmission or reception parameters to the state/mode indicated by the AR and communicates with the gNB according to the transmission or reception parameters indicated by the AR 506. When the UE receives a NACK from the gNB 505, the UE keeps the existing transmission or reception parameters in step 507. When the UE does not receive a response from the gNB for a configured time period, the UE can retransmit the AR 502.

An implicit AR from a UE can indicate a preferred adaptation for one or multiple transmission or reception parameters relating, for example, to power consumption aspect(s) or configuration parameter(s). Instead of the UE indicating explicit parameters for adaptation, the UE provides a request to adapt from a first operating state. When a gNB receives an implicit AR from a UE, the gNB can either transmit an ACK/NACK in response to accepting/rejecting the implicit AR from the UE or transmit an AR to indicate the actual adaptation command (refined AR). In one example, an implicit AR from a UE can be a request to switch a mode/state for transmission or reception parameters where each mode/state can be configured in advance by the gNB through higher layer signaling, for example RRC signaling or can be predefined in the specification of the system operation. The gNB can transmit to the UE an adaptation request indicating activation/deactivation of one or multiple schemes associated with the requested state/mode for transmission or reception parameters.

Figure 6:
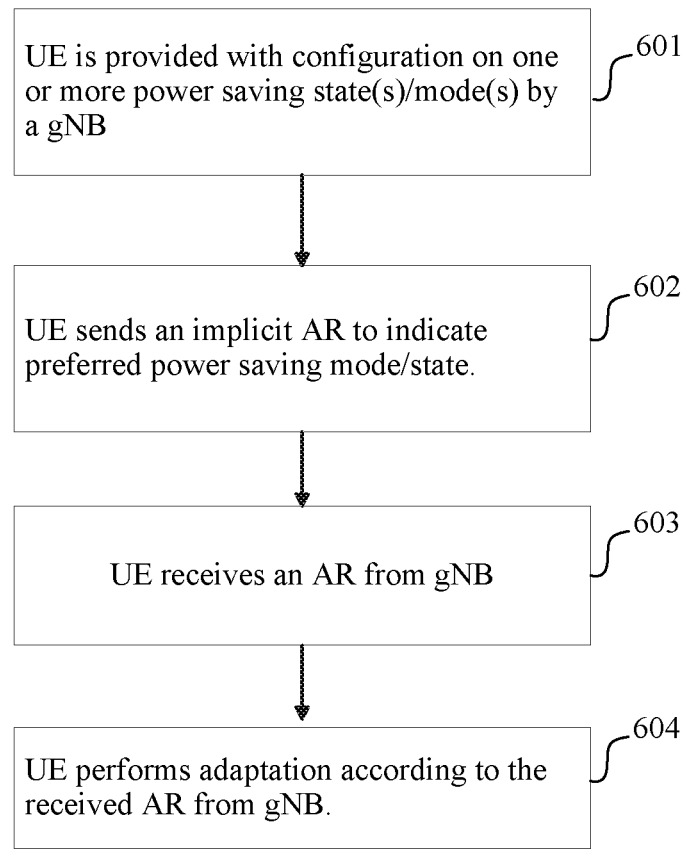
FIG. 6 illustrates an example of a UE procedure for UE adaptation based on UE's implicit adaptation request according to one embodiment of the present disclosure.

FIG. 6 illustrates an example of a UE procedure for UE adaptation based on UE's implicit adaptation request according to one embodiment of the present disclosure. The embodiment shown in FIG. 6 is for illustration only. Other embodiments could be used without departing from the scope of this disclosure.

A UE can be provided with a configuration for one or more state(s)/mode(s) for transmission or reception parameters through the higher layer signaling from the gNB, where each mode/state can be associated with one or more power saving scheme(s) in step 601. The UE can transmit an implicit AR to indicate a preferred mode/state in step 602. The UE receives an AR from the gNB, where the AR can trigger an adaptation to the UE for transmission or reception parameters associated with a mode/state in step 603. The UE performs adaptation on corresponding transmission or reception parameters according to the received AR from the gNB in step 604. For example, the UE can switch/activate/deactivate a state for transmission or reception parameters or adapt transmission or reception scheme(s).

Additional timeline on UE adaptation procedure can be adopted to avoid misunderstanding between a gNB and a UE for an adaptive configuration. A UE can be configured with any of the following timers.

PT0: specifies how long a UE should wait for an adaptation request response (AR-R) from a gNB after transmitting an AR to the gNB. When the UE does not receive an AR-R from the gNB before the PT0 timer expires, the UE can assume one of the following:

Case 1: the gNB implicitly accepts the AR without transmitting an associated AR-R. When the UE does not receive an AR-R from the gNB before PT0 expires, the UE can perform adaptation of transmission or reception parameters as indicated by the AR.

Case 2: the UE does not detect an AR-R either because an associated AR is not detected by the gNB or because the AR-R is not detected by the UE. In this case, the UE cannot perform the adaptation and can retransmit the AR in next transmission occasion after PT0 expires. The UE can maintain the previous configuration or revert to a superset configuration to account for the case that the gNB transmitted the AR-R but the UE failed to detect the AR-R.

Case 3: the AR is assistance information for the gNB to independently determine an adaptation of transmission or reception parameters for the UE and no explicit response from the gNB is needed. For example, the AR can indicate a preference on minimum time gap between a PDCCH reception with a DL DCI format and a scheduled PDSCH reception.

PT1: specifies how long the UE should wait before applying an adaptation to transmission or reception parameters after receiving an AR-R from the gNB.

A UE can determine any of PT0/PT1 through one of the following: In one example, any of PT0/PT1 can be predefined in the specification of the system operation. For example, PT0=10 ms or 3 ms, PT1=0 ms or 1 ms. In another example, any of PT0/PT1 can be provided by higher layer singling. In yet another example, any of PT0/PT1 can be reported by the UE to the gNB as part of the UE capability.

A UE can transmit an AR to a gNB either in a periodic manner or in an aperiodic manner.

For periodic AR from a UE, the UE can be configured with periodic PUCCH/PUSCH resources for transmitting a periodic AR to a gNB. The periodic AR can coincide with a periodic/semi-persistent CSI report, with same or different periodicity than for the AR, and the UE can then combine the AR and CSI report in a same PUCCH resource. When a number of available REs (excluding REs used for DMRS transmission) in a PUCCH resource is not sufficient for control information in a respective PUCCH transmission to achieve a target code rate, the UE can prioritize transmission of the AR over transmission of CSI reports.

Figure 7:
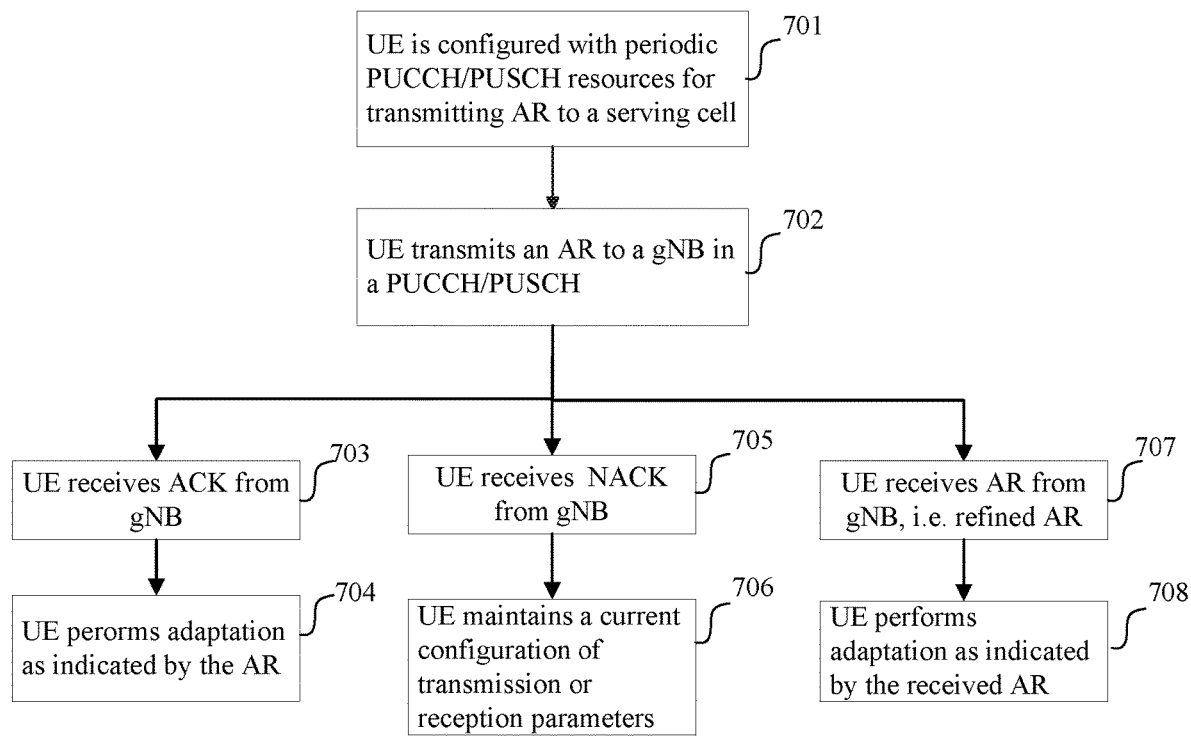
FIG. 7 illustrates an example of UE adaptation procedure with periodic AR transmitted from the UE according to one embodiment of the present disclosure.

FIG. 7 illustrates an example of UE adaptation procedure with periodic AR transmitted from the UE according to one embodiment of the present disclosure. The embodiment shown in FIG. 7 is for illustration only. Other embodiments could be used without departing from the scope of this disclosure.

A UE is provided with a configuration of periodic PUCCH/PUSCH resources for transmitting AR to a serving cell/gNB in step 701. The UE transmits an AR to the gNB in a PUCCH/PUSCH in step 702. When the UE receives an ACK from the gNB in response to the AR in step 703, the UE performs adaptation of transmission or reception parameters as indicated by the AR in step 704. When the UE receives a NACK from the gNB in response to the AR in step 705, the UE maintains a current configuration of transmission or reception parameters and does not perform any adaptation in step 706. When the UE receives an AR from gNB indicating a refined adaptation request in step 707, the UE performs adaptation of transmission or reception parameters as indicated by the received AR from gNB in step 708.

Figure 8:
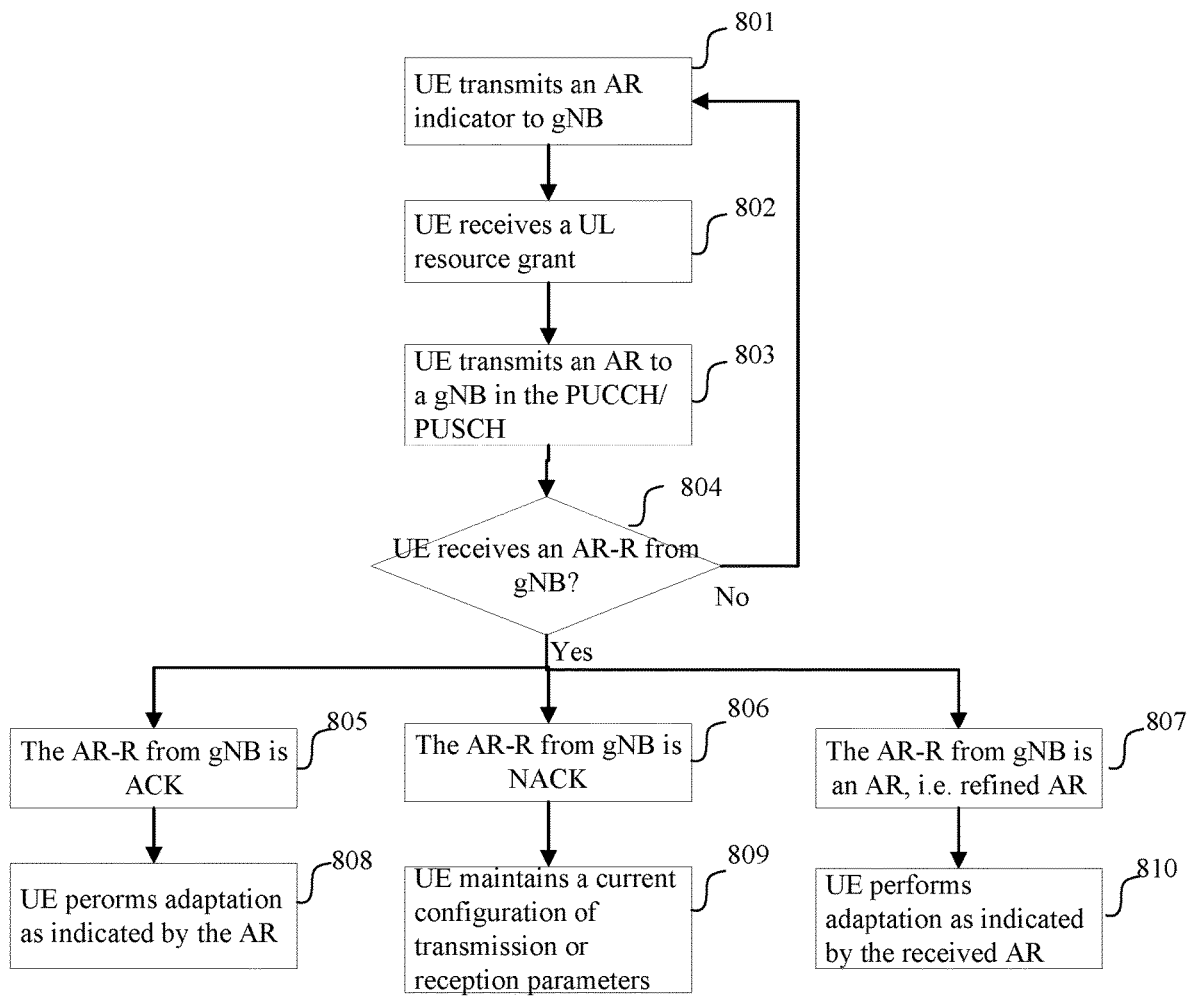
FIG. 8 illustrates an example of a UE adaptation procedure with aperiodic AR transmitted from the UE according to one embodiment of the present disclosure.

FIG. 8 illustrates an example of a UE adaptation procedure with aperiodic AR transmitted from the UE according to one embodiment of the present disclosure. The embodiment shown in FIG. 8 is for illustration only. Other embodiments could be used without departing from the scope of this disclosure For aperiodic AR from a UE, the UE can transmit an AR to a gNB on demand. A UE sends an AR indicator, AR-I, to a gNB to request transmission of an AR in step 801. The physical layer resources, such as PUCCH resources, for AR-I transmission can be same as for SR transmission. The UE can use a value for the transmitted information, such as a binary '0', to indicate AR-I and another value such as a binary '1' to indicate SR. In this manner, an AR-I can be treated as a special SR state and be reported together with other SR states when corresponding reporting instances overlap. When the gNB receives an AR request, the gNB can schedule a PUCCH/PUSCH for the UE to report AR information. The UE then receives an UL DCI format (UL grant) scheduling an AR transmission in a PUSCH or PUCCH in step 802. The UE transmits the AR in the PUSCH/PUCCH 803. The UE determines whether or not the UE receives an AR-R from the gNB 804. When the UE receives an ACK from the gNB in response to the AR 805, the UE performs adaptation of transmission or reception parameters as indicated by the AR 808. When the UE receives a NACK from the gNB in response to the AR 806, the UE does not perform any adaptation of transmission or reception parameters 809. When the UE receives an AR from gNB indicating a refined adaptation request 807, the UE performs adaptation as indicated by the received AR transmitted from gNB 810. Otherwise, when the UE does not receive a response by the gNB within a predetermined or configured time, the UE can retransmit an AR indicator to trigger another round of aperiodic AR 801.

Embodiment 1-B. Adaptation Request from gNB with Assistance Information from UE

In another approach for a UE adaptation procedure of transmission or reception parameters, an AR can be transmitted from a serving cell or a gNB to a UE. The AR from the gNB can be transmitted based on some assistance information transmitted from the UE or based on some statistics for the communication with the UE as obtained by the gNB. The AR transmitted from a gNB to a UE can be transmitted either through a DCI format in PDCCH for fast adaptation or in a MAC control element (CE) in a PDSCH. For the latter case, the UE can also determine whether or not the AR is correctly received (by performing a CRC check for a reception of an associated transport block). For example, the UE can use a PUCCH format 0 or 1 to provide an acknowledgement to an AR reception by a MAC CE where a binary '1' value can represent a positive acknowledgement (ACK) and a binary '0' value can represent a negative acknowledgement (NACK) or an absence of reception.

Figure 9:
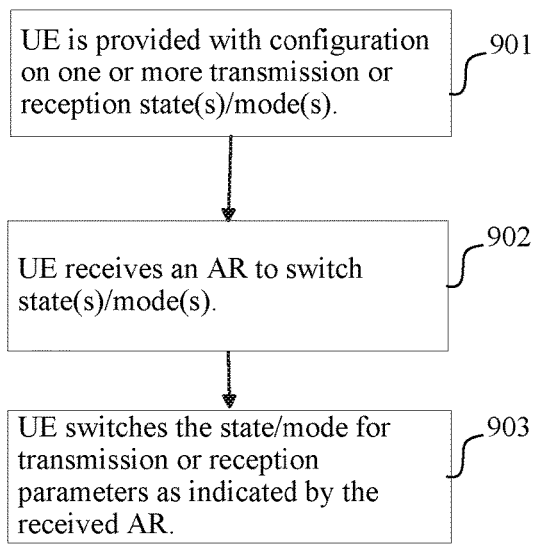
FIG. 9 illustrates an example of a UE procedure for adaptation on power saving state/mode based on an adaptation request from a gNB according to one embodiment of the present disclosure.

FIG. 9 illustrates an example of a UE procedure for adaptation of an operating state/mode based on an adaptation request from a gNB according to one embodiment of the present disclosure. The embodiment shown in FIG. 9 is for illustration only. Other embodiments could be used without departing from the scope of this disclosure.

A UE can be provided with a configuration for one or more state(s)/mode(s) of transmission or reception parameters, for example through higher layer signaling from a gNB, where each mode/state can be associated, for example, with one or more power saving scheme(s) in step 901. The UE receives an AR from the gNB that indicates updating/switching a current state/mode in step 902. The UE switches the state/mode for transmission or reception parameters as indicated by the received AR in step 903.

Additional timeline on UE adaptation procedure can be adopted to avoid misunderstanding on adaptive system configuration. A UE can be provided with an application delay, PT2, that determines a time period that the UE should wait before applying the received AR from the gNB. A UE can determine PT2, in the unit of one slot or one millisecond, through one of the following examples. In one example, PT2 can be defined in the specification of the system operation. For example, PT2=1 ms or PT2=1 slot. In another example, PT2 can be provided by higher layer signaling. In yet another example, PT2 can be reported by the UE to a gNB as part of the UE capability. In this case, multiple values for PT2 can be predefined in the specification of the system operation with respect to different UE capabilities. In yet another example, PT2 can be associated with a PDCCH monitoring periodicity. For example, PT2=c1*min{ks}, where ks is the PDCCH monitoring periodicity for a configured search space s, and c1 can be either predefined in the specification of the system operation, for example c1=1, or provided to the UE through higher layer signaling. For another example, PT2=c1*min{ks_min} where ks_min is the minimum PDCCH monitoring periodicity among all impacted search space sets and c1 can be either predefined in the specification of the system operation, for example c=1, or provided to the UE through higher layer signaling.

Figure 10:
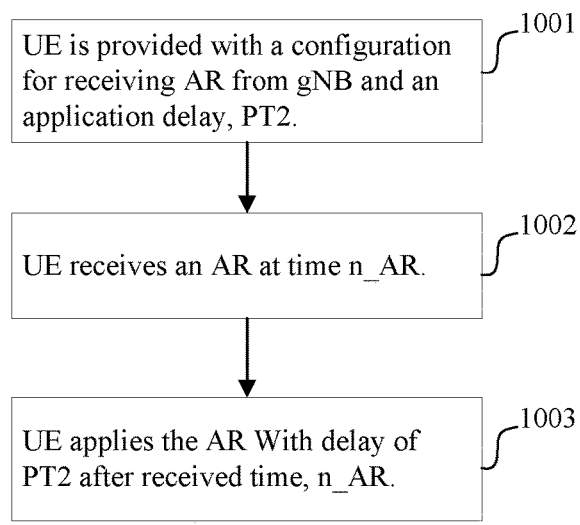
FIG. 10 illustrates an example of a UE procedure for applying an AR transmitted from a gNB to a UE according to one embodiment of the present disclosure.

FIG. 10 illustrates an example of a UE procedure for applying an AR transmitted from a gNB to the UE according to one embodiment of the present disclosure. The embodiment shown in FIG. 10 is for illustration only. Other embodiments could be used without departing from the scope of this disclosure.

A UE is provided with a configuration for receiving AR from a gNB and a corresponding application delay for the AR, PT2, in step 1001. The AR can be included in a DCI format provided by a PDCCH. The UE then determines whether or not the UE receives an AR from the gNB in step 1002. When the UE receives an AR at time n_AR, the UE acquires information for transmission or reception parameters from the AR. The UE can apply the indicated adaptation after an application delay of PT2 in step 1003. The UE does not expect to apply the adaptation on respective transmission or reception parameters indicated by the AR before slot $$\left\lfloor (n\_AR + PT2) \cdot \frac{2^{\mu_X}}{2^{\mu_{AR}}} \right\rfloor, \text{ or } \left\lceil (n\_AR + PT2) \cdot \frac{2^{\mu_X}}{2^{\mu_{AR}}} \right\rceil,$$

where $\mu_x$ is either the subcarrier spacing (SCS) configuration of scheduled PDSCH or PUSCH, and $\mu_{AR}$ is the SCS configuration of the received AR.

Figure 11:
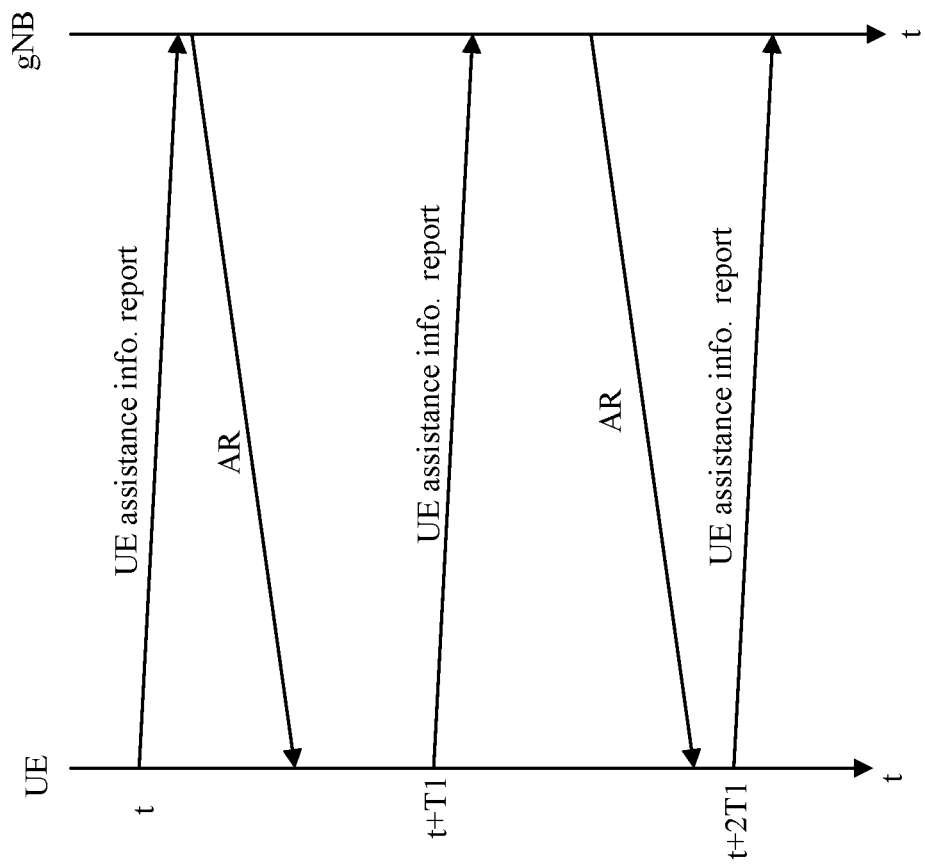
FIG. 11 illustrates the timeline for transmission/reception of an AR between gNB/UE with periodic UE assistance information report according to one embodiment of the present disclosure.

FIG. 11 illustrates the timeline for transmission/reception of an AR between gNB/UE with periodic UE assistance information report according to one embodiment of the present disclosure. The embodiment shown in FIG. 11 is for illustration only. Other embodiments could be used without departing from the scope of this disclosure.

For a periodic report of UE assistance information, the UE can be configured a reporting periodicity, T1, and a PUCCH/PUSCH resource for transmission of the UE assistance information. The periodic report of UE assistance information can coincide with a periodic/semi-persistent CSI report, with same or different periodicity than for the UE assistance information, and the UE can combine the two reports in a same PUCCH. When a number of available REs (excluding REs used for DMRS transmission) in a PUCCH resource is not sufficient for control information in a respective PUCCH transmission to achieve a target code rate, the UE can prioritize transmission of the configuration report over transmission of CSI reports.

Figure 12:
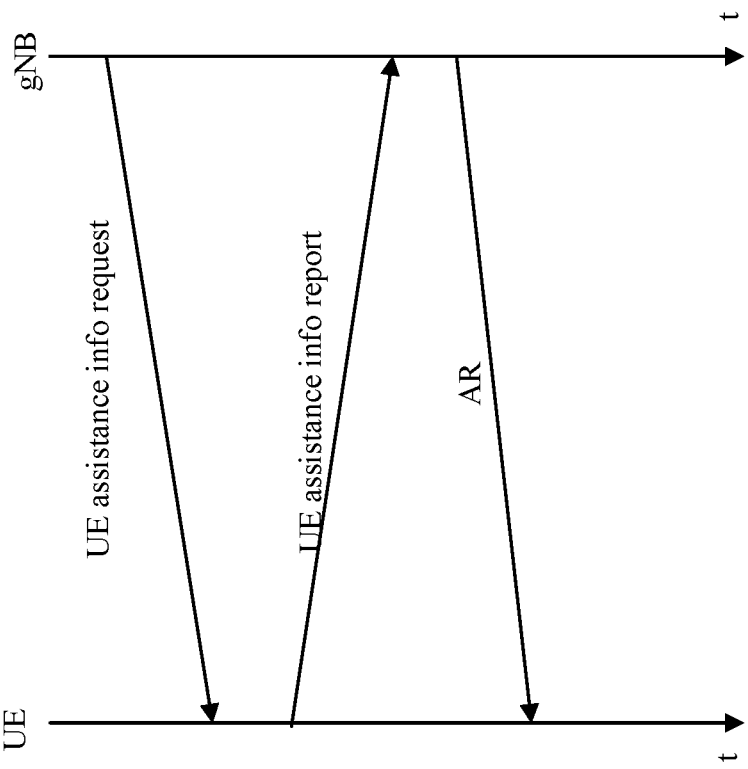
FIG. 12 illustrates the timeline for transmission/reception of an adaptation request between gNB/UE with triggered UE assistance information report according to one embodiment of the present disclosure.

FIG. 12 illustrates the timeline for transmission/reception of an adaptation request between gNB/UE with triggered UE assistance information report according to one embodiment of the present disclosure. The embodiment shown in FIG. 12 is for illustration only. Other embodiments could be used without departing from the scope of this disclosure.

For a triggered report of UE assistance information, the UE can include the report in a MAC CE that the UE transmits in a PUSCH. This also enables the UE to determine whether or not the report is correctly received (by performing a CRC check for a reception of an associated transport block). A report of UE assistance information can also be requested by a serving gNB, for example through a field in a DCI format, such as DCI format 0_1 or 1_1, similar as for a CSI request.

Embodiment 2: UE Adaptation Scheme

The second embodiment of this disclosure considers UE adaptation schemes to support UE adaptation on entities related to UE transmission or reception parameters or configuration in frequency, time, and antenna domains, in DRX operation, and in UE processing timeline. For a UE adaptation scheme, one or more adaptation entities and corresponding changes are indicated by an adaptation request (AR). The AR is transmitted from a gNB or from a UE. An AR can provide control/signaling information for triggering one or more UE adaptation schemes. The control/signaling information in an AR for indicating corresponding adaptation on respective adaptation entities can be any of the following examples.

In one example, the control/signaling information for each of the respective adaptation entities can be included in the AR independently for each entity. In another example, the control/signaling information for respective adaptation entities can be included in the AR jointly for two or more entities. In this case, the control/signaling information can indicate a row index in a configured or predetermined joint adaptation table. The column of the adaptation table is associated with one of the respective adaptation entities. Each row of the adaptation table indicates a corresponding adaptation of transmission or reception parameters for the UE over the respective adaptation entities. The adaptation table can be either predefined in the specification of the system operation or provided to the UE through higher layer signaling. For the latter case, the adaptation table can be configured by some RRC parameter(s) that can be decoded by the UE with CRC scrambled by C-RNTI or in SIB with CRC scrambled by SI-RNTI. The respective adaptation entity can be any adaptation entity in this embodiment. In yet another example, the control/signaling information can be common for multiple respective adaptation entities. In this case, the control signaling is applicable to multiple respective adaptation entities. The respective adaptation entities can be either predefined in the specification of system operation or provided to the UE through higher layer signaling.

Embodiment 2-A. Time Domain Radio Resources

The first sub-embodiment considers UE adaptation schemes in time domain. One or a combination of the following examples or approaches for adaptation of transmission or reception parameters for a UE in the time domain can be enabled.

In a first approach for a time domain UE adaptation scheme, an AR can trigger UE adaptation on operation/configuration of discontinuous reception in RRC_CONNECTED state (C-DRX). The AR can indicate adaptation for at least one of the following C-DRX related adaptation entities.

In one example, the C-DRX related adaptation entity can be a DRX cycle. $T\_drx$, that can be either the long or short DRX cycle. In one sub-example, an AR can indicate to the UE to extend/reduce the DRX cycle to the next N-th larger/smaller candidate from a list of predetermined or preconfigured candidate values, where N is either predefined in the specification of the system operation, for example, N=1, or provided to the UE through higher layer signaling. In another sub-example, an AR can indicate dynamic scaling on DRX cycle, such that $T\_drx=max(T\_drx*c_1, T^{\wedge}min\_drx)$, when $0<c_1<1$; $T\_drx=min(T\_drx*c_1, T^{\wedge}max\_drx)$, when $c_1>1$, $c_1$ is the scaling factor indicated by the AR, and $T^{\wedge}min\_drx$ and $T^{\wedge}max\_drx$ are the minimum and maximum value of $T\_drx$.

In another example, the C-DRX configuration parameter for adaptation can be the DRX ON duration that is a drx-onDurationTimer denoted as $T\_on$ in this disclosure. In one sub-example, an AR can indicate to a UE to extend/reduce $T\_on$ to a next N-th larger/smaller candidate value from a predefined or configured list of candidate values, where N is either predefined in the specification of the system operation, for example. N=1, or provided to the UE through higher layer signaling. In another sub-example, an AR can indicate a dynamic scaling for $T\_on$, such that $T\_on=max(T\_on*c_2, T^{\wedge}min\_on)$, when $0<c_2<1$; $T\_on=min(T\_on*c_1, T^{\wedge}max\_on)$, when $c_2>1$, $c_2$ is the scaling factor indicated by the AR and $T^{\wedge}min\_on$ and $T^{\wedge}max\_on$ are respectively the minimum and maximum values of $T\_on$.

In yet another example, the C-DRX configuration parameter for adaptation can be a drx-InactivityTimer, denoted as $T\_inact$ in this disclosure. For one sub-example, an AR can indicate to a UE to extend/reduce $T\_inact$ to a next N-th larger/smaller candidate from a predefined or configured list of candidate values, where N is either predefined in the specification of the system operation, for example N=1, or provided to the UE through higher layer signaling. In another sub-example, an AR can indicate dynamic scaling on $T\_inact$, such that $T\_inact=max(T\_inact*c_3, T^{\wedge}min\_inact)$, when $0<c_3.1$; $T\_inact=min(T\_inact*c_3, T^{\wedge}max\_inact)$, when $c_3>1$, $c_3$ is the scaling factor indicated by the AR, and $T^{\wedge}min\_inact$ and $T^{\wedge}max\_inact$ are the minimum and maximum value of $T\_inact$.

A UE can determine any of $T^{\wedge}max\_drx/T^{\wedge}max\_on/T^{\wedge}max\_inact/T^{\wedge}min\_drx/T^{\wedge}min\_on/T^{\wedge}min\_inact$ through one of the following examples:

In one example, any of $T^{\wedge}max\_drx/T^{\wedge}max\_on/T^{\wedge}max\_inact/T^{\wedge}min\_drx/T^{\wedge}min\_on/T^{\wedge}min\_inact$ is fixed and defined in the specification of the system operation. In another example, any of $T^{\wedge}max\_drx/T^{\wedge}max\_on/T^{\wedge}max\_inact/T^{\wedge}min\_drx/T^{\wedge}min\_on/T^{\wedge}min\_inact$ is provided to the UE through higher layer signaling. In yet another example, any of $T^{\wedge}max\_drx/T^{\wedge}max\_on/T^{\wedge}max\_inact/T^{\wedge}min\_drx/T^{\wedge}min\_on/T^{\wedge}min\_inact$ is reported by the UE to gNB.

An adaptation on C-DRX can be jointly performed with at least one of the following adaptation entities from other domains: In one example, the adaptation entity from another domain jointly adapted with C-DRX can be an active DL BWP. For example, an AR can trigger a UE to switch a C-DRX configuration together with an active DL BWP.

In another example, the adaptation entity from another domain jointly adapted with C-DRX can be a (de)activation of SCells. For example, an AR can trigger a UE to switch to a shorter DRX cycle with a smaller number of active CCs. In yet another example, the adaptation entity from another domain jointly adapted with C-DRX can be a PDCCH monitoring periodicity for at least UE-specific search space sets.

For adaptation associated with C-DRX, a UE can be provided with a set of adaptation candidates with respect to different traffic loads/UE power status/latency requirements/ UE mobility status/link quality/channel condition. The predetermined adaptation candidates can be either defined in the specification of the operation system or provided to the UE through higher layer signaling. Each adaption candidate can be associated with one or multiple adaptation entities/ parameters related to C-DRX operation and/or other power consumption dimensions. An AR associated with C-DRX can indicate one or multiple adaptation candidates from the predetermined set of adaption candidates.

Figures 13A, 13B:
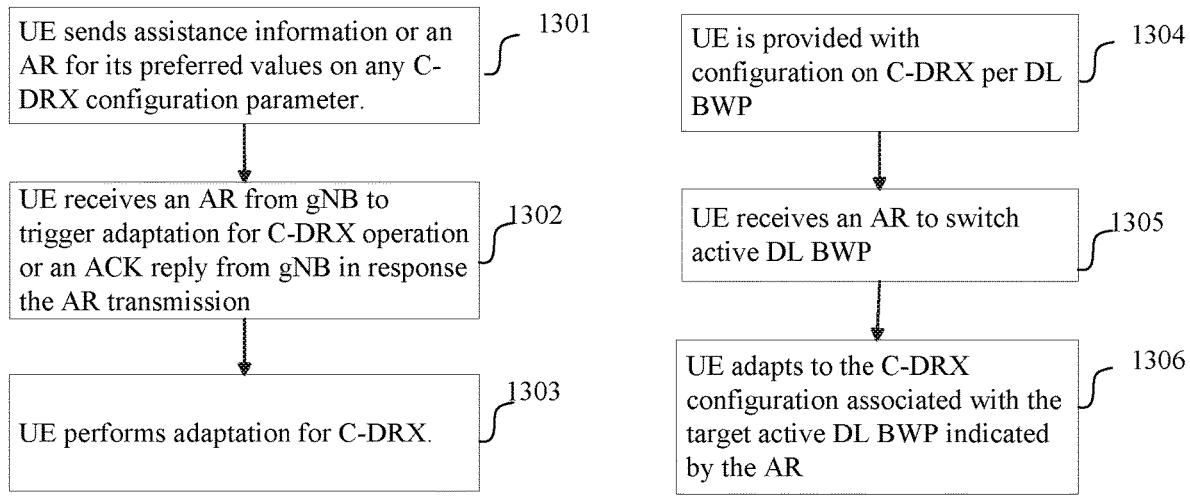
FIGS. 13A and 13B illustrate examples of UE procedures for UE-assisted adaptation on C-DRX operation according to embodiments of the present disclosure.

FIG. 13A illustrates an example of a UE procedure for UE-assisted adaptation on C-DRX operation according to one embodiment of the present disclosure. The embodiment shown in FIG. 13 is for illustration only. Other embodiments could be used without departing from the scope of this disclosure.

As illustrated in FIG. 13A, a UE transmits assistance information or an AR for preferred values on any C-DRX related adaptation entity or configuration parameter, such as T_drx/T_on/T_inact/T^max_drx/T^max_on/T^max_inact/ T^min_drx/T^min_on/T^min in step 1301. A UE receives an AR from a gNB to trigger the adaptation for C-DRX operation or an ACK from gNB in response the AR transmission from the UE in step 1302. The UE then performs adaptation for the respective adaptation entities related to C-DRX as indicated by the AR from gNB or as acknowledged by the gNB based on the AR transmitted from the UE in step 1303.

FIG. 13B illustrates another example of a UE procedure for adaptation on C-DRX operation jointly with BWP switching according to one embodiment of the present disclosure. The embodiment shown in FIG. 13B is for illustration only. Other embodiments could be used without departing from the scope of this disclosure.

As illustrated in FIG. 13B, a UE is provided with a C-DRX configuration per DL BWP, for example through higher layer signaling in step 1304. The UE receives an AR to switch an active DL BWP in step 1305. The UE then adapts to the C-DRX configuration associated with the target active DL BWP indicated by the received AR in step 1306.

In a second approach for a time domain UE adaptation scheme for transmission or reception parameters, an AR can trigger UE adaptation on PDCCH monitoring. The AR can indicate adaptation on at least one of the following PDCCH monitoring related adaptation entities; In one example, the PDCCH monitoring related adaptation entity can be a PDCCH monitoring periodicity, T_PDCCH. An AR can carry a scaling factor, c1, to indicate dynamic scaling of T_PDCCH associated with one or multiple search space set(s). In another example, the PDCCH monitoring related adaptation entity can be a PDCCH monitoring duration, D_PDCCH. An AR can carry a scaling factor, c2, to indicate dynamic scaling of D_PDCCH associated with one or multiple search space set(s). In yet another example, the PDCCH monitoring related adaptation entity can be the PDCCH monitoring offset associated with one or multiple search space set(s). In yet another example, the PDCCH monitoring related adaptation entity can be (de)activation of search space set(s). An AR can indicate deactivation or activation of one or multiple search space set(s). In yet another example, the PDCCH monitoring related adaptation entity can be the number of consecutive OFDM symbols of a control resource set (CORESET) associated with one or more search space sets. N^PDCCH_OS. An AR can carry a dynamic scaling factor, c3, such that N^PDCCH_OS=max (N^PDCCH_OS*c3, 1), when 0<c3<1; N^PDCCH_OS=min (N^PDCCH_OS*c3, 3), when c3>1.

PDCCH monitoring can be jointly adapted with one or a combination of the following entities from other operating dimensions: In one example, the entity from another operating dimension jointly adapted with PDCCH monitoring can be the bandwidth of an associated CORESET. For example, an AR can indicate a longer PDCCH monitoring periodicity for a USS over relatively larger CORESET bandwidth. In another example, the entity from another operating dimension jointly adapted with PDCCH monitoring can be the DL active BWP. For example, the AR can indicate a longer PDCCH monitoring periodicity for a USS over a larger active BWP.

For adaptation on PDCCH monitoring, a UE can be provided with a set of adaptation candidates with respect to different traffic loads/UE power status/latency requirements/ UE mobility status/link quality/channel condition. The predetermined adaptation candidates can be either defined in the system operation or provided to the UE through higher layer signaling. Each adaptation candidate can be associated with one or multiple adaptation entities/parameters related to PDCCH monitoring and/or other operational dimensions. An AR associated with PDCCH monitoring can indicate one or multiple adaptation candidates from the predetermined set of adaptation candidates.

Figure 14:
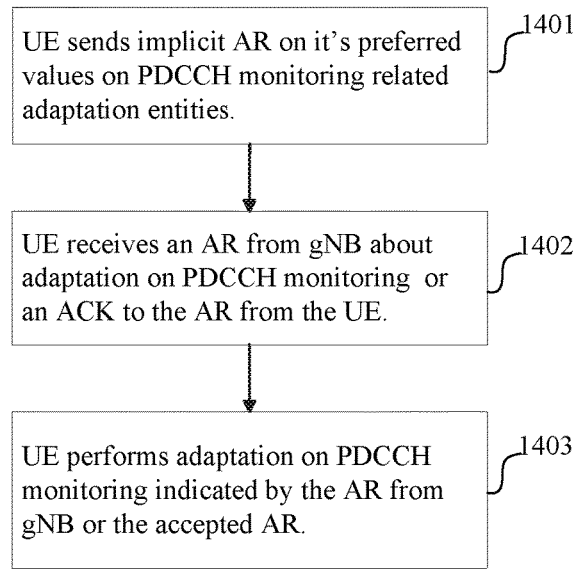
FIG. 14 illustrates an example of a UE procedure for UE-assisted adaptation on PDCCH monitoring according to one embodiment of the present disclosure.

FIG. 14 illustrates an example of a UE procedure for UE-assisted adaptation on PDCCH monitoring according to one embodiment of the present disclosure. The embodiment shown in FIG. 14 is for illustration only. Other embodiments could be used without departing from the scope of this disclosure.

As illustrated in FIG. 14, a UE transmits assistance information or an AR for preferred values on any PDCCH monitoring related adaptation entities, such as PDCCH monitoring periodicity T_PDCCH, in step 1401. The UE can receive an AR from a gNB to trigger the adaptation on PDCCH monitoring or an ACK from the gNB in response to the AR transmitted from the UE in step 1402. The UE then performs adaptation on the respective adaptation entities related to PDCCH monitoring indicated by the AR from gNB or the accepted AR.

In a third approach of a time domain UE adaptation scheme, an AR can trigger UE adaptation on a processing timeline for data transmission/reception. An AR can indicate adaptation for at least one of the following UE processing timeline related adaptation entities: In one example, the UE processing timeline related adaptation entity can be K1, wherein K1 is the PDSCH-to-HARQ_feedback timing indicator or the time between one or more PDSCH receptions and a transmission of a PUCCH that includes corresponding HARQ-ACK information. An AR can indicate to a UE to extend/reduce a default set of slot timing values of K1, including the size/granularity of K1, denoted as |K1|, or a range for elements in the set of K1 values. In another example, the UE processing timeline related adaptation entity can be default K0, wherein default K0 is the slot offset between the last symbol of the CORESET of the reception of the DCI format scheduling a PDSCH reception and the PDSCH reception, when the field of K0 is absent in the configured TDRA table for DL data transmission, i.e., PDSCH-TimeDomainResourceAllocationList. In yet another example, the UE processing timeline related adaptation entity can be default K2, wherein default K2 is the slot offset between the last symbol of the CORESET of the DCI format scheduling a PUSCH transmission and the PUSCH transmission, when the field of K2 is absent in the configured TDRA table for UL data transmission, i.e. PUSCH-TimeDomainResourceAllocationList.

In yet another example, the UE processing timeline related adaptation entity can be minimum scheduling delay for PDSCH reception/PUSCH transmission, denoted as X/Y in this disclosure, wherein X is the minimum slot offset between the last symbol of the CORESET of the DL DCI format reception and the corresponding PDSCH reception, and Y is the minimum slot offset between the last symbol of the CORESET of the UL DCI format reception and the corresponding PUSCH transmission. For any dynamic slot offset K0 between the last symbol of the CORESET of the DL DCI format reception and the corresponding PDSCH reception indicated by the DL DCI format, the UE assumes that K0>=X. For any dynamic slot offset K2 between the last symbol of the CORESET of the UL DCI format reception and the corresponding PUSCH transmission indicated by the UL DCI format, the UE assumes that K2>=Y. When the field of K0 is absent in the configured TDRA table, i.e. PDSCH-TimeDomainResourceAllocationList, for a DL DCI format, such as DCI format 1_0/1_1, the UE can apply the minimum slot offset X as default value for K0. When the field of K2 is absent in the configured TDRA table. i.e. PUSCH-TimeDomainResourceAllocationList for an UL DCI format, such as DCI format 0_0/0_1, the UE can apply the minimum slot offset Y as default value for K2.

In one sub-example, an AR can indicate to extend/reduce or to dynamically scale X/Y. For example, X=c1*X. Y=c2*Y, where c1, and c2 are scalars carried in the AR, e.g. c1=2, c2=2. For an entry in the TDRA table, wherein K0<X, a UE can assume the actual K0 for the entry is X. For an entry in TDRA table, wherein K2<Y, a UE can assume the actual K2 for the entry is Y.

In another sub-example, an AR can indicate an explicit value of X/Y. A set of candidate values of X/Y can be provided to the UE through higher layer signaling and the AR can indicate one of the candidates. For an entry in TDRA table, wherein K0<X, a UE can assume that the actual K0 for the entry is X. For an entry in TDRA table, wherein K2<Y, a UE can assume that the actual K2 for the entry is Y. In yet another sub-example, an AR can indicate an offset to K0/K2, denoted as O0/O2. The actual slot offset between the last symbol of the CORESET of the DCI format reception and the corresponding PDSCH reception or PUSCH transmission can be K0+O0 or K2+O2, respectively. The minimum slot offset is X=K0'+O0 and Y=K2'+O2, where K0'/K2' is the minimum K0/K2 value from an active TDRA table or the default TDRA table if no additional TDRA table is configured, or a default value when the field is absent in the TDRA table for the DCI format.

In yet another example, the UE processing timeline related adaptation entity can be a maximum slot offset, denoted as X'/Y', between a last symbol of the CORESET of DCI format reception and a corresponding scheduled PDSCH/PUSCH, respectively. For any time offset K0 between a last symbol of the CORESET of a DL DCI format reception or of an UL DCI format reception and a corresponding PDSCH reception or PUSCH transmission, it is K0<=X' or K2<=Y', respectively. When the field indicating K0 is absent in a DL DCI format, such as DCI format 1_0/1_1. UE can apply the maximum slot offset X' as default value. When a field indicating K2 is absent in an UL DCI format, such as DCI format 0_0/0_1, the UE can apply the maximum slot offset Y' as default value. In one sub-example, an AR can indicate to a UE to extend/reduce or to scale X'/Y'. For example, X'=c1*X', Y'=c2*Y', where c1, and c2 are scalars provided by the AR. e.g. c1=2, c2=2. For an entry in the TDRA table, wherein K0>X', the UE can assume the actual K0 for the entry is X'. For an entry in the TDRA table, wherein K2>Y', the UE can assume the actual K2 for the entry is Y'. In another sub-example, an AR can indicate an explicit value of X'/Y'. The AR can indicate one of the configured candidate values of X'/Y'. For an entry in the TDRA table, wherein K0>X', the UE can assume the actual K0 for the entry is X'. For an entry in the TDRA table, wherein K2>Y', the UE can assume the actual K2 for the entry is Y'.

In yet another sub-example, an AR can indicate an offset to K0/K2, denoted as O0/O2. The actual slot offset between a last symbol of a CORESET of a DCI format and a corresponding PDSCH or PUSCH can be K0+O0 or K2+O2, respectively. The maximum slot offset X'/Y' is the maximum K0/K2 value from an active TDRA table, or the default TDRA table if no additional TDRA table is configured, or a default value when the field is absent in the DCI format.

In yet another example, the UE processing timeline related adaptation entity can be a maximum code block group (CBG) size per TB, i.e. maxCodeBlockGroupsPerTransportBlock. An AR can indicate to one or more preferred values from a set of predefined adaptation candidates of maximum code block group (CBG) size per TB. In yet another example, the UE processing timeline related adaptation entity can be the slot aggregation factor, L0, for receiving or transmitting a TB over L0>=1 consecutive slots in a PDSCH or PUSCH, respectively. L0) can be applicable at least for a UE-specific search space. A list of candidates for L0 can be either defined in the specification of the system operation or provided to the UE through higher layer signaling. An AR can indicate one of the predetermined or preconfigured values.

Figure 15:
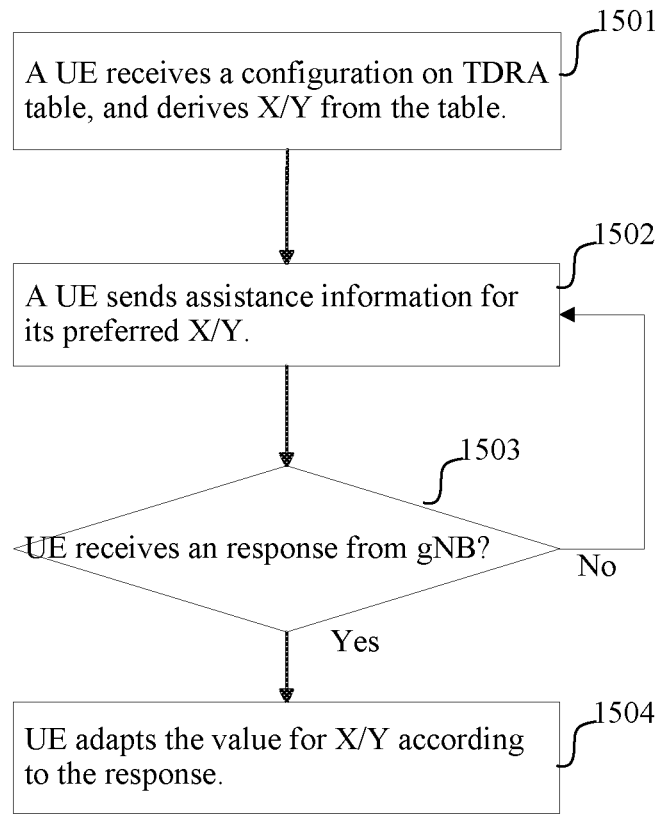
FIG. 15 illustrates an example of a UE procedure for UE-assisted adaptation on cross-slot scheduling for data reception/transmission according to one embodiment of the present disclosure.

FIG. 15 illustrates an example of a UE procedure for UE-assisted adaptation on cross-slot scheduling for data reception/transmission according to one embodiment of the present disclosure. The embodiment shown in FIG. 15 is for illustration only. Other embodiments could be used without departing from the scope of this disclosure.

As illustrated in FIG. 15, a UE receives a configuration for a time domain resource allocation (TDRA) table for PDSCH reception or PUSCH transmission, and derives a minimum scheduling offset for the PDSCH reception or the PUSCH transmission, X or Y respectively, as the minimum value of K0/K2 in the TDRA table in step 1501. The UE transmits assistance information for a preferred value for the minimum scheduling delay or the time offset between a last symbol of a PDCCH reception and a corresponding PDSCH reception or PUSCH transmission. X or Y, in step 1502. The UE determines whether or not the UE receives a response from a gNB in step 1503. When the UE receives a response from the gNB, the UE adapts the value for X or Y accordingly in step 1504. For example, the response from the gNB can be an ACK to a preferred value indicated from the UE in an AR transmission. For another example, the response can be an AR to indicate the exact value of X or Y.

Figure 16:
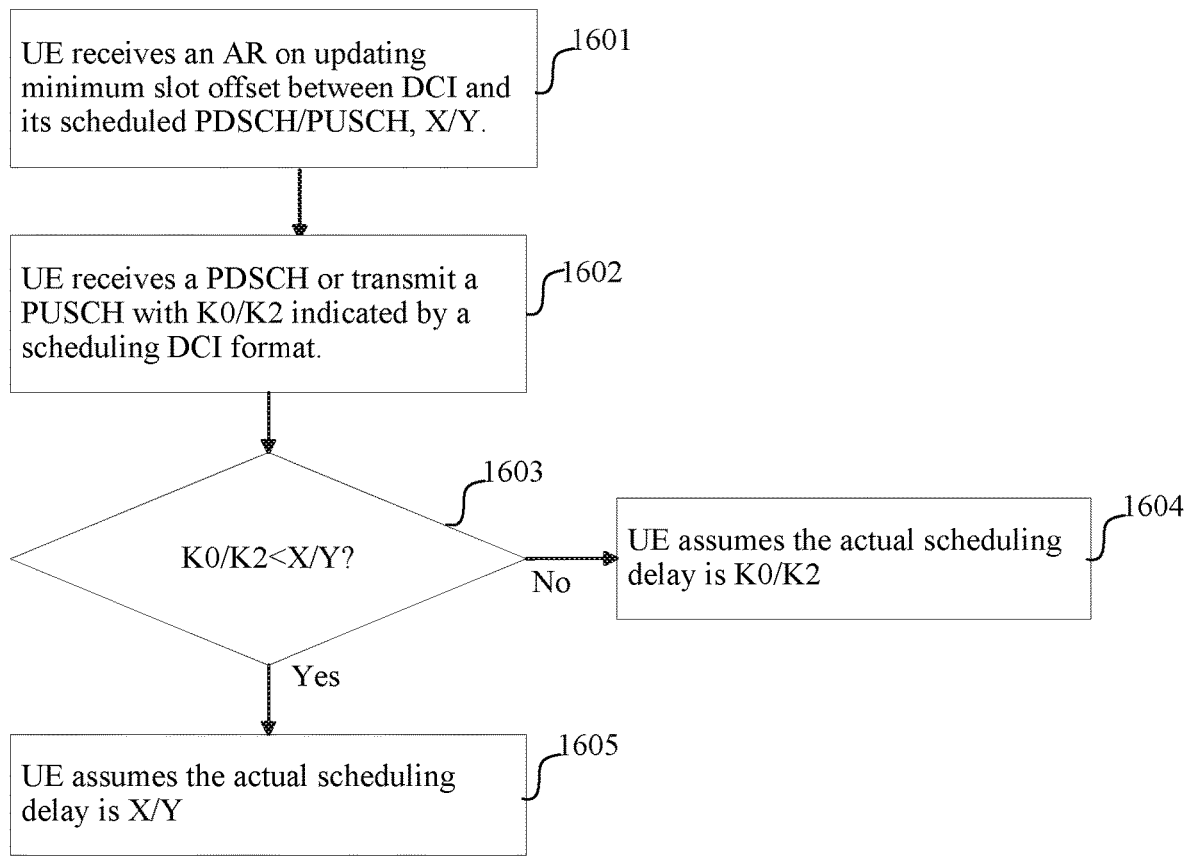
FIG. 16 illustrates an example of UE adaptation on a minimum scheduling delay for data reception/transmission according to one embodiment of the present disclosure.

FIG. 16 illustrates an example of UE adaptation on a minimum scheduling delay for data reception/transmission according to one embodiment of the present disclosure. The embodiment shown in FIG. 16 is for illustration only. Other embodiments could be used without departing from the scope of this disclosure.

A UE receives an AR on updating minimum slot offset between a last symbol of a CORESET for a DCI format reception and a corresponding PDSCH/PUSCH. X/Y in step 1601. The UE receives a PDSCH or transmits a PUSCH with scheduling delay K0/K2 indicated by a DCI format in step 1602. The UE determines whether or not K0<X or K2<Y in step 1603. When K0<X or K2<Y, the UE assumes that the actual delay between the last symbol of the CORESET of the DCI format reception and the corresponding PDSCH/PUSCH is X/Y in step 1605; otherwise, the UE assumes that the actual delay between the last symbol of the CORESET of the DCI format reception and the corresponding PDSCH/PUSCH is K0/K2 in step 1604.

An adaptation on UE processing timeline can be jointly indicated for one or a combination of the following entities from other operational dimensions.

In one example, the adaptation entity from another operational dimension for joint adaptation with the UE processing timeline can be a (de)activation of SCells.

In another example, the entity from another operational dimension for joint adaptation with UE processing timeline can be an active BWP. In another sub-example, a UE can be provided with an applicable value for any UE processing timeline related adaptation entity per BWP, and the UE applies the applicable value for UE processing timeline related adaptation entities associated with the active BWP.

In yet another example, the entity from another operational dimension for joint adaptation with UE processing timeline can be a PDCCH monitoring periodicity. The minimum PDCCH monitoring periodicity for a UE-specific search space set can be equal to the minimum of X and Y, where X and Y are the minimum K0 and the minimum K2, respectively. When an AR indicates an adaptation for X or Y, the minimum PDCCH monitoring periodicity for applicable search space sets, T^PDCCH_min, can be adapted accordingly, where T^PDCCH_min=min(X, Y). The UE assumes the PDCCH monitoring periodicity for associated search space set, ks, is not smaller than T^PDCCH_min, such that ks>=T^PDCCH_min. The associated search space sets can be UE specific search space sets.

In yet another example, the entity from another operational dimension for joint adaptation with the UE processing timeline can be the minimum slot offset for aperiodic CSI-RS measurement. When an AR indicates an adaptation for X, the minimum slot offset for aperiodic CSI-RS measurement, Z, can be adapted accordingly, where Z=X. The UE assumes that the slot offset for aperiodic CSI-RS measurement that is indicated in the DCI format triggering the CSI-RS measurement is no smaller than Z.

Figure 17:
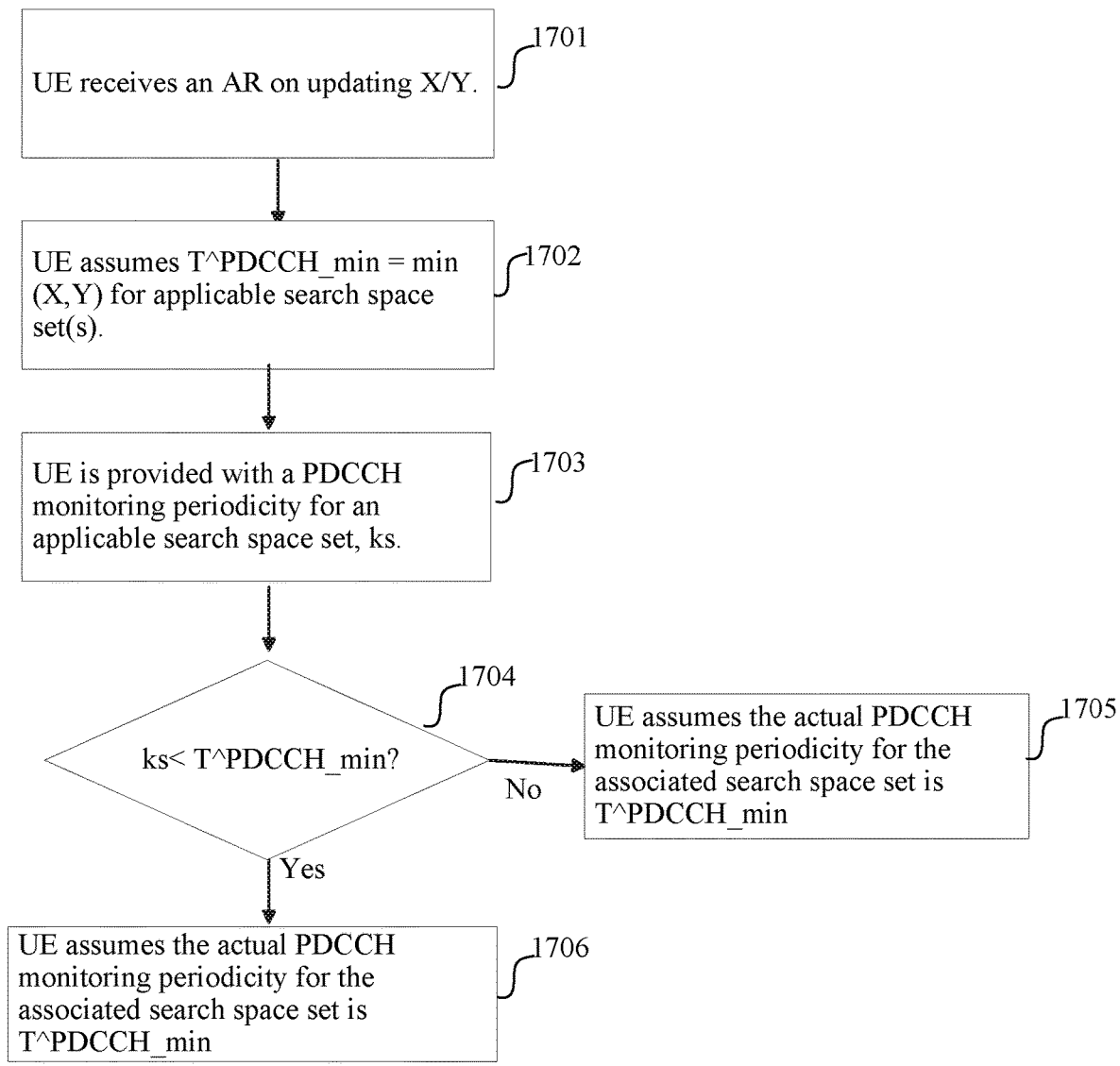
FIG. 17 illustrates an example of joint adaptation on a minimum scheduling delay for data reception/transmission and minimum PDCCH monitoring periodicity according to one embodiment of the present disclosure.

FIG. 17 illustrates an example of joint adaptation for a minimum scheduling delay for data reception/transmission and a minimum PDCCH monitoring periodicity according to one embodiment of the present disclosure. The embodiment shown in FIG. 17 is for illustration only. Other embodiments could be used without departing from the scope of this disclosure.

A UE receives an AR indicating a minimum slot offset between a last symbol of a CORESET for a DCI format reception and a corresponding PDSCH/PUSCH, X/Y in step 1701. The UE assumes the minimum PDCCH monitoring periodicity, T^PDCCH_min=min (X,Y), for applicable search space set(s) in step 1702. The applicable search space set(s) can be UE specific search space sets associated with DCI formats 0_0/0_1/1_0/1_1. The UE is provided with a PDCCH monitoring periodicity for an applicable search space set, ks in step 1703. The UE then determines whether or not ks<T^PDCCH_min in step 1704. If ks<T^PDCCH_min, the UE assumes the actual PDCCH monitoring periodicity for the associated search space set is T^PDCCH_min in step 1706; otherwise, the UE assumes the actual PDCCH monitoring periodicity for the associated search space set is ks in step 1705.

Figure 18:
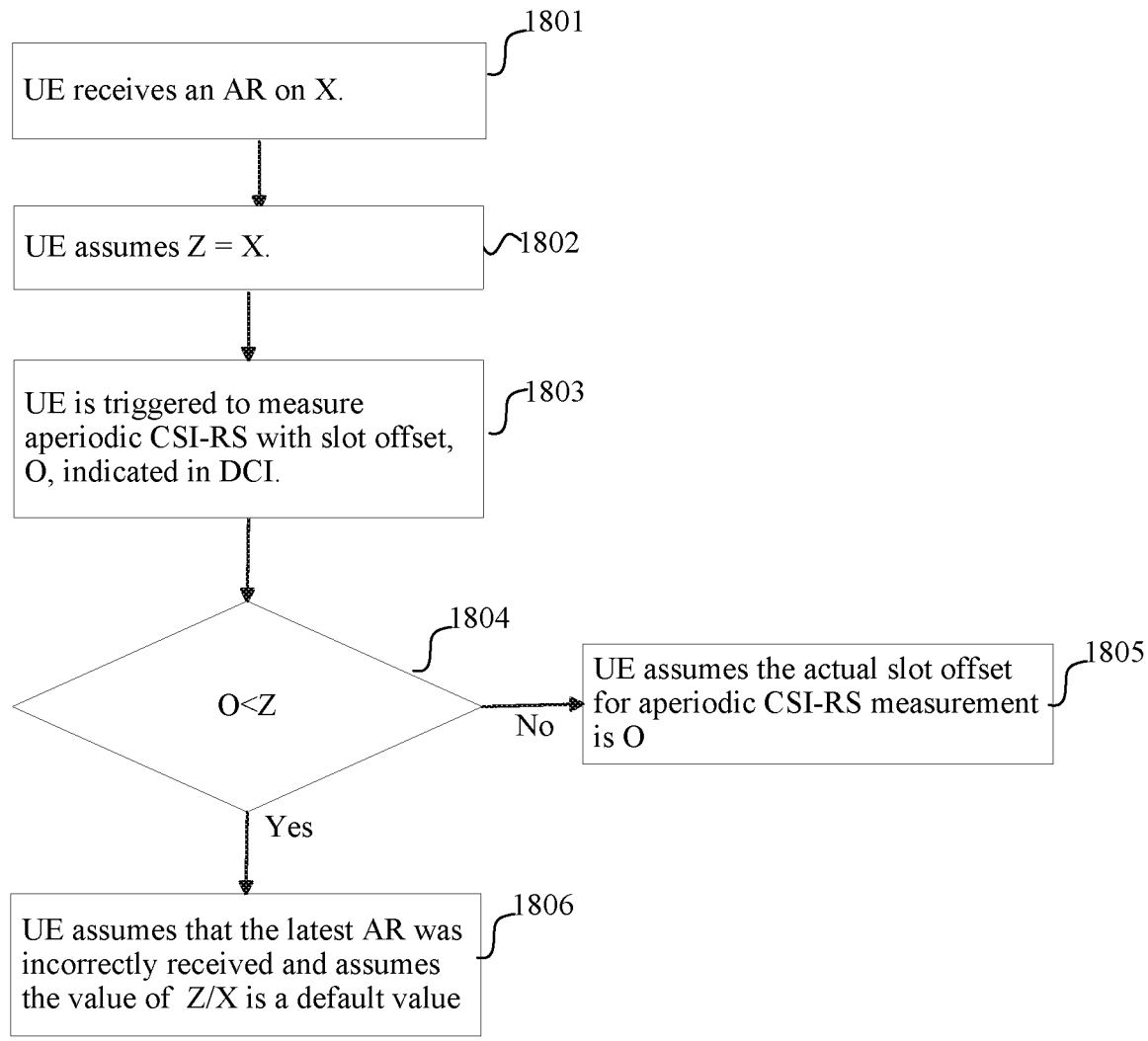
FIG. 18 illustrates an example of joint adaptation on a minimum scheduling delay for data reception and minimum slot offset for aperiodic CSI-RS measurement according to one embodiment of the present disclosure.

FIG. 18 illustrates an example of joint adaptation for a minimum scheduling delay for data reception and a minimum slot offset for aperiodic CSI-RS measurement according to one embodiment of the present disclosure. The embodiment shown in FIG. 18 is for illustration only. Other embodiments could be used without departing from the scope of this disclosure.

A UE receives an AR indicating a minimum slot offset between a last symbol of a CORESET for a DCI format reception and a corresponding PDSCH, X in step 1801. The UE assumes a minimum slot offset for aperiodic CSI-RS measurement, Z, Z=X in step 1802. The UE is triggered to measure aperiodic CSI-RS with slot offset, O, indicated by the DCI format in step 1803. The UE determines whether or not O<Z in step 1804. When O<Z, the UE assumes that the latest AR was incorrectly received and assumes the value of Z/X is a default value, for example, the minimum candidate value of Z=0, and the minimum slot offset between a last symbol of a CORESET for a DCI format reception and a corresponding PDSCH of X=0 in step 1806; otherwise, the UE assumes the actual slot offset for aperiodic CSI-RS measurement is O in step 1805.

To reduce the signaling overhead, an AR can indicate a common/unified minimum processing delay, F, that is applicable for at least one of the following processing timeline related adaptation entities for some associated search space sets. Given an applicable value for common/unified minimum processing delay, i.e. F, a UE assumes that the applicable value of any associated adaptation entity, E, is no less than the F, such that E>=F. The associated adaptation entity can be at least one of the following: a minimum slot offset between a last symbol of a CORESET for a DCI format reception and a corresponding PDSCH or PUSCH; a default value of slot offset between a last symbol of a CORESET for a DCI format reception and a corresponding PDSCH or PUSCH when the field of K0 or K2, respectively, is absent in the configured TDRA table, i.e. PDSCH-TimeDomainResourceAllocationList orPUSCH-TimeDomainResourceAllocationList; minimum aperiodic CSI-RS triggering offset; a minimum slot offset between one or more PDSCH receptions and a transmission of a PUCCH that includes corresponding HARQ-ACK information; a minimum aperiodic SRS (A-SRS) slot offset; and/or PDCCH monitoring periodicity for associated search space set(s).

For an AR on the unified minimum processing delay, F, for one example, a UE can be provided with a list of candidate values for F and an AR can indicate an applicable value of F. The candidate values can be either provided to UE through higher layer signaling or be defined in the specification of system operation. For one example for the former case, the candidate values can be the candidate values of K0 or K2 in a configured TDRA table without duplicates. For another example, a UE can be provided with an applicable value of F per BWP and the UE adapts its operation to the respective value for F associated with the active DL BWP. For yet another example, the UE can be provided with an offset to F. In this case, the UE applies the offset, O, to any associated processing timeline related adaptation entity, E, such that E=E'+O, where E' is the original applicable value for an associated processing timeline related adaptation entity.

Figure 19:
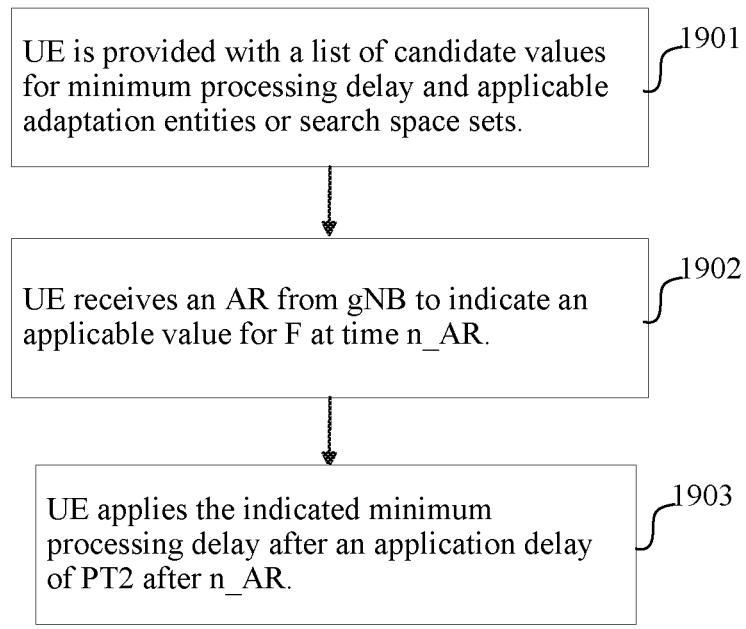
FIG. 19 illustrates an example of a UE adaptation procedure on a minimum processing delay for on one or more processing timeline related adaptation entities according to one embodiment of the present disclosure.

FIG. 19 illustrates an example of a UE adaptation procedure for a minimum processing delay for one or more processing timeline related adaptation entities according to one embodiment of the present disclosure. The embodiment shown in FIG. 19 is for illustration only. Other embodiments could be used without departing from the scope of this disclosure.

A list of candidates for the minimum processing delay can be either predefined in the specification of the system operation or provided to the UE through higher layer signaling. For example, the list of candidate values can be candidate values of K0 (without duplicates) from the configured TDRA table for PDSCH reception in the active BWP in either ascending or descending order. For another example, the list of candidate values can be two values, wherein one value is zero and the other value is non-zero value and configured by higher layer signaling. The applicable adaptation entities can either be defined in the specification of the system operation or provided to the UE through the higher layer signaling in step 1901. The UE receives an AR from a gNB wherein the AR indicates an applicable value for a minimum processing delay. F, at slot n_AR in an active BWP of a serving cell with SCS configuration of u_AR 1902. The UE applies the indicated applicable value after a delay of PT2 after n_AR in step 1903. The UE can determine the slot index for applying the indicated minimum processing delay according to the method in Embodiment 1-B of this disclosure. After the application delay of PT2, the UE expects that the value of any applicable adaptation entity. E, is no less than the indicated minimum processing delay, F, such that E>=F for an associated search space set.

When cross-carrier scheduling is enabled for a UE and the UE receives an AR through a DCI format scheduling a PDSCH reception or a PUSCH transmission, from a scheduling cell, wherein the DCI format indicates an applicable value for minimum processing delay, F, the UE assumes that the minimum processing delay for the scheduled cell is $$\max\left(F\_min, F \cdot \left\lfloor \frac{2^{\mu_{cell2}}}{2^{\mu_{cell1}}} \right\rfloor \right) \text{ or } \max\left(F\_min, F \cdot \left\lceil \frac{2^{\mu_{cell2}}}{2^{\mu_{cell1}}} \right\rceil \right) \text{ or } F \cdot \left\lceil \frac{2^{\mu_{cell2}}}{2^{\mu_{cell1}}} \right\rceil \text{ or } F \cdot \left\lfloor \frac{2^{\mu_{cell2}}}{2^{\mu_{cell1}}} \right\rfloor,$$

where $\mu_{cell,2}$ is the SCS configuration of the active BWP in scheduled cell/carrier, $\mu_{cell1}$ is the SCS configuration of the active BWP in the scheduling cell/carrier, and F_min is the minimum feasible value or default value for the minimum processing delay. F_min can be either defined in the specification of the system operation, for example, F_min=1 slot, or provided to the UE through higher layer signaling.

For applying a minimum processing delay, F, when a minimum PDCCH monitoring periodicity is one of the associated adaptation entities, the UE assumes that the PDCCH monitoring periodicity of associated search space set, T_PDCCH, equals to the minimum processing delay, such that T_PDCCH=F, if T_PDCCH is smaller than F. When a minimum slot offset between a last CORESET symbol for a DCI format reception and a corresponding PDSCH reception is one of the associated adaptation entities, the UE does not expect that the slot offset between the last CORESET symbol of the DCI format reception and the corresponding PDSCH reception, K0, is smaller than F. When a minimum slot offset between a last CORESET symbol of a DCI format reception and a corresponding PUSCH transmission is one of the associated adaptation entities, the UE does not expect that the slot offset between the last CORESET symbol of the DCI format reception and the corresponding PUSCH transmission, K2, is smaller than F.

When a default value of a slot offset between a last CORESET symbol for a DCI format reception and a corresponding PDSCH reception is one of the associated adaptation entities, the UE assumes that the slot offset between the last CORESET symbol of the DCI format reception and corresponding PDSCH reception is F, when the field of K0 is absent in the configured TDRA table, i.e. PDSCH-TimeDomainResourceAllocationList. When a default value of the slot offset between a last CORESET symbol of the DCI format reception and a corresponding PUSCH transmission is one of the associated adaptation entities, the UE assumes that the slot offset between the last CORESET symbol of the DCI format reception and the corresponding PUSCH transmission is F, when the field of K2 is absent in the configured TDRA table, i.e. PUSCH-TimeDomainResourceAllocationList. When a minimum aperiodic CSI-RS triggering offset is one of the associated adaptation entities, the UE does not expect that an aperiodic CSI-RS triggering offset is smaller than F. When a minimum slot offset between one or more PDSCH receptions and a transmission of a PUCCH that includes corresponding HARQ-ACK information is one of the associated adaptation entities, the UE does not expect that a slot offset between one or more PDSCH receptions and a transmission of a PUCCH that includes corresponding HARQ-ACK information, K1, is smaller than F. When an aperiodic SRS (A-SRS) slot offset is one of the associated adaptation entities, the UE does not expect that an aperiodic SRS slot offset is smaller than F.

An adaptation on skipping PDCCH monitoring can also be adopted jointly with an adaptation for a minimum processing delay, F. When a non-zero minimum processing delay, F>0, in the unit of one slot is applied, the UE can only monitor the first PDCCH monitoring occasion and skip remaining PDCCH monitoring occasion(s) between slot n and slot n+F−1. i.e. [n, n+F−1] for associated search space set(s), where n is the slot index for a PDCCH monitoring occasion that is not skipped by the UE.

In another approach, one adaptation entity in the dimension of time domain radio resources can be the schedulable slots for multi-slot scheduling. When a number of schedulable slots per DCI format, K, is larger than one, a 1-to-N mapping can be supported between a DCI format and corresponding TBs in a PDSCH reception or PUSCH transmission.

For the associated search space sets for any processing timeline related adaptation, the associated search space sets can either be defined in the specification of the system operation or be provided to the UE through higher layer signaling. In the former case, for example, the associated search space sets can be at least the UE specific search space set(s) that are not associated with DCI format(s) for scheduling PDSCH receptions or PUSCH transmission associated with URLLC traffic. Let DCI format 1_2 and DCI format 0_2 be the DCI formats for scheduling PDSCH and PUSCH for URLLC traffic, respectively. If the search space set is configured to a UE for monitoring DCI format 0_2 or DCI format 1_2 with CRC scrambled by C-RNTI, the UE can assume that the minimum processing delay for the search space set is zero regardless of the minimum processing delay indicated by the AR. Similar, a different (smaller) minimum time offset can apply when a CSI-RS reception is triggered by DCI format 0_2 and DCI format 1_2 than when a CSI-RS reception is triggered by DCI format 0_0, DCI format 0_1. DCI format 1_0, and DCI format 1_1. Similar, a different (smaller) number of maximum MIMO layers can apply for a PDSCH reception scheduled by DCI format 1_2 than for a PDSCH reception scheduled by DCI format 1_0 or DCI format 1_1 since the former is typically associated with reception of small TBs and enhanced reception reliability instead of larger data rates.

For another example, when the AR is provided through a DCI format, the associated search space set can be the search space set where the UE receives the AR of the minimum processing delay. In this case, the minimum processing delay indicated by an AR can only be applied to associated adaptation entities in the search space set where the UE receives the AR. In the latter case, a higher layer parameter can be provided to the UE, together with the search space set configuration, to indicate whether or not the UE can apply any minimum processing delay indicated by an AR for the search space set.

In the fourth approach of time domain UE adaptation scheme, an AR can trigger UE adaptation related to a number of schedulable slots for transmission of multiple TBs. When the number of schedulable slots per DCI format, M, is larger than one, the DCI format can be used to schedule M TBs over M consecutive slots. The consecutive slots are ones where a corresponding PDSCH reception or PUSCH transmission can occur and, for example for a PUSCH transmission, do not include DL slots or, in general, slots with a fewer number of UL symbols than a number of symbols indicated for the PUSCH transmission. An AR can indicate adaptation on at least one of the following adaptation entities related to the number of schedulable slots for transmission of multiple TBs.

In one example, the adaptation entity can be a minimum number of schedulable slots per DCI format, denoted as M_min. For a valid M_min, when a UE receives a DCI format for scheduling M TBs over M consecutive slots, the UE does not expect to receive M>=M_min. A list of candidate values of M_min can be either defined in the specification of the system operation or be provided to the UE through higher layer signaling. An AR can indicate applicable value of M_min from the list.

In another example, the adaptation entity can be a maximum number of schedulable slots per DCI format, denoted as M_max. For a valid M_max, when a UE receives a DCI format for scheduling M TBs over M consecutive slots, the UE does not expect to receive M<=M_max. A list of candidate values of M_max can be either defined in the specification of the system operation or provided to the UE through higher layer signaling, and an AR can indicate applicable value of M_max from the list.

In yet another example, the adaptation entity can be a number of schedulable slots per DCI format, M. A list of candidate values of M can be either defined in the specification of the system operation or provided to the UE through higher layer signaling, and an AR can indicate applicable value of M from the list.

Table 1 shows an example for a joint adaptation table in the time domain. The column of the adaptation table can be associated with adaptation entities, such as PDCCH monitoring periodicity, C-DRX cycle, and minimum processing delay. Each row of the table indicates joint adaptation on the respective adaptation entities, and can be associated with different power saving state.

TABLE 1

Joint Adaptation table in time domain

| Row index/Power saving state | PDCCH monitoring periodicity | C-DRX cycle | Minimum processing delay |
| --- | --- | --- | --- |
| 0 | 4 ms | 80 ms | 2 ms |
| 1 | 8 ms | 160 ms | 4 ms |
| ... | ... | ... | ... |

Embodiment 2-B. Frequency Domain Radio Resources

The second sub-embodiment considers UE adaptation schemes in the frequency domain. One or a combination of the following examples or approaches for UE adaptation in the dimension of frequency domain radio resources can be enabled.

In a first frequency domain UE adaptation, an AR can trigger UE adaptation of a CORESET configuration in an active DL BWP. The AR can indicate adaptation for at least one of the following CORESET configuration adaptation entities.

In one example, the CORESET configuration related entity for adaptation can be a corresponding number of consecutive symbols. An AR can indicate to increase or decrease the number of consecutive symbols of a CORESET.

In another example, the CORESET configuration related entity for adaptation can be a corresponding set of resource blocks.

In yet another example, multiple configuration candidates of CORESET with respect to different traffic load/UE power status/latency requirements/UE mobility status/link quality/channel condition can be provided to the UE through higher layer signaling. An AR can indicate one of the preconfigured configuration candidates.

The respective CORESET can be provided to the UE through higher layer signaling, for example, a configuration parameter can indicate whether or not the CORESET can be adapted through an AR. Alternatively, the respective CORESET ID can be provided by the AR.

In a second frequency domain UE adaptation scheme, an AR can trigger UE adaptation for an active DL/UL BWP or DL/UL BWP switching. In order to trigger BWP switching through an AR transmitted from a UE, the UE can be signaled a non-zero power CSI-RS (NZP CSI-RS) configuration for CSI measurement in a non-active BWP. Otherwise, the channel quality for non-active BWP can be determined based on measurements depending on UE implementation. For an AR transmitted from a UE, the AR can indicate one or more preferred active DL/UL BWP.

In a third approach of frequency domain UE adaptation, an AR can indicate (de)activation of SCells when a UE operates in CA mode. The configured cells, or component carriers (CCs), can be divided into multiple groups by the UE or by the gNB. When a CC group is constructed by the UE, the CC group information can be reported to the gNB through higher layer signaling. When a CC group is constructed by the gNB, the CC group information can be reported to the UE through higher layer signaling. An AR can indicate to (de)activate one or more CC groups. Alternatively, the AR can carry the ID(s) of SCell(s) for (de) activation explicitly.

DL/UL BWP switching can be jointly adapted with one or a combination of the following adaptation entities from other operational dimensions.

In one example, the adaptation entity from another operational dimension jointly adapted with DL/UL BWP switching can be a (de)activation of SCells. In this case, a set of active SCells can be preconfigured for each configured BWP through higher layer signaling. When a UE is triggered to switch to a new DL/UL BWP, the UE can operate in preconfigured active SCells associated with the target BWP indicated by the AR.

In another example, the adaptation entity from another operational dimension jointly adapted with DL/UL BWP switching can be a C-DRX configuration. In this case, C-DRX configuration can be provided to a UE for each configured BWP through higher layer signaling. When a UE is triggered to switch to a new DL/UL BWP, the UE can enable C-DRX operation with the configuration associated with the target BWP indicated by the AR.

In yet another example, the adaptation entity from another operational dimension jointly adapted with DL/UL BWP switching can be a maximum number of transmitter/receiver (TX/RX) antenna ports or a maximum number of DL/UL MIMO layers. In this case, a maximum number of TX/RX antenna ports or a maximum DL/UL MIMO layers can be provided to a UE for each configured BWP through higher layer signaling. When the UE is triggered to switch to new active DL/UL BWP, the UE applies the maximum number of TX/RX antenna ports or the maximum number of DL/UL MIMO layers associated with the target BWP.

Figure 20:
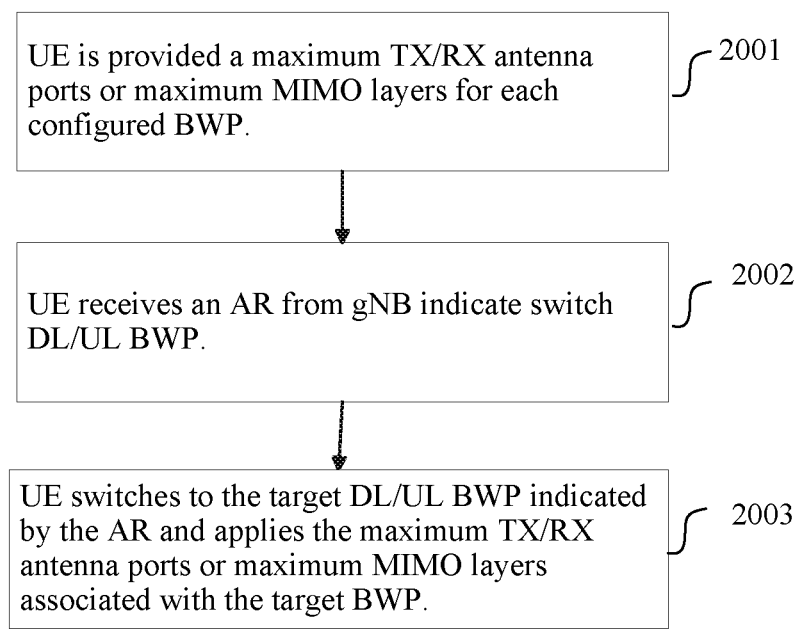
FIG. 20 illustrates an example of a UE procedure for joint adaptation on DL/UL BWP switching and maximum MIMO layers or maximum TX/RX antenna ports according to one embodiment of the present disclosure.

FIG. 20 illustrates an example of a UE procedure for joint adaptation on DL/UL BWP switching and maximum number of MIMO layers or maximum number of TX/RX antenna ports according to one embodiment of the present disclosure. The embodiment shown in FIG. 20 is for illustration only. Other embodiments could be used without departing from the scope of this disclosure.

As illustrated in FIG. 20, a UE can be provided a maximum number of TX/RX antenna ports or a maximum number of DL/UL MIMO layers for each configured BWP through higher layer signaling in step 2001. When the UE is triggered to switch to a new active DL/UL BWP in step 2002, the UE applies the maximum number of TX/RX antenna ports or the maximum number of DL/UL MIMO layers associated with the target BWP in step 2003.

Embodiment 2-C. Spatial Domain Radio Resources

The third sub-embodiment considers UE adaptation schemes in the spatial domain. One or a combination of the following examples or approaches for UE adaptation in the dimension of spatial domain radio resources can be enabled.

In a first approach of spatial domain UE adaptation, an AR can indicate to a UE a (de)activation of one or more RX or TX antenna port(s) at a UE for PDSCH reception or PUSCH transmission, respectively. When the AR is transmitted from a UE to a gNB, an association between a TX or RX antenna port adaptation and a CQI index, or a RS receiver power (RSRP), or a received SINR can be specified or configured to the UE. The UE can request to deactivate a TX or RX antenna port when a corresponding measurement is below a specified or configured first threshold. The UE can perform subsequent measurements for a deactivated TX or RX antenna port. When the measurement of a deactivated TX or RX antenna port is above a specified or configured second threshold, the UE can send an AR to the gNB to activate the TX or RX antenna port. When the AR is transmitted form a gNB to a UE, the gNB can trigger the adaptation accordingly based on UE's feedback on s CQI index, or a RS receiver power (RSRP) report, or a received SINR of TX/RX antenna ports.

Figure 21:
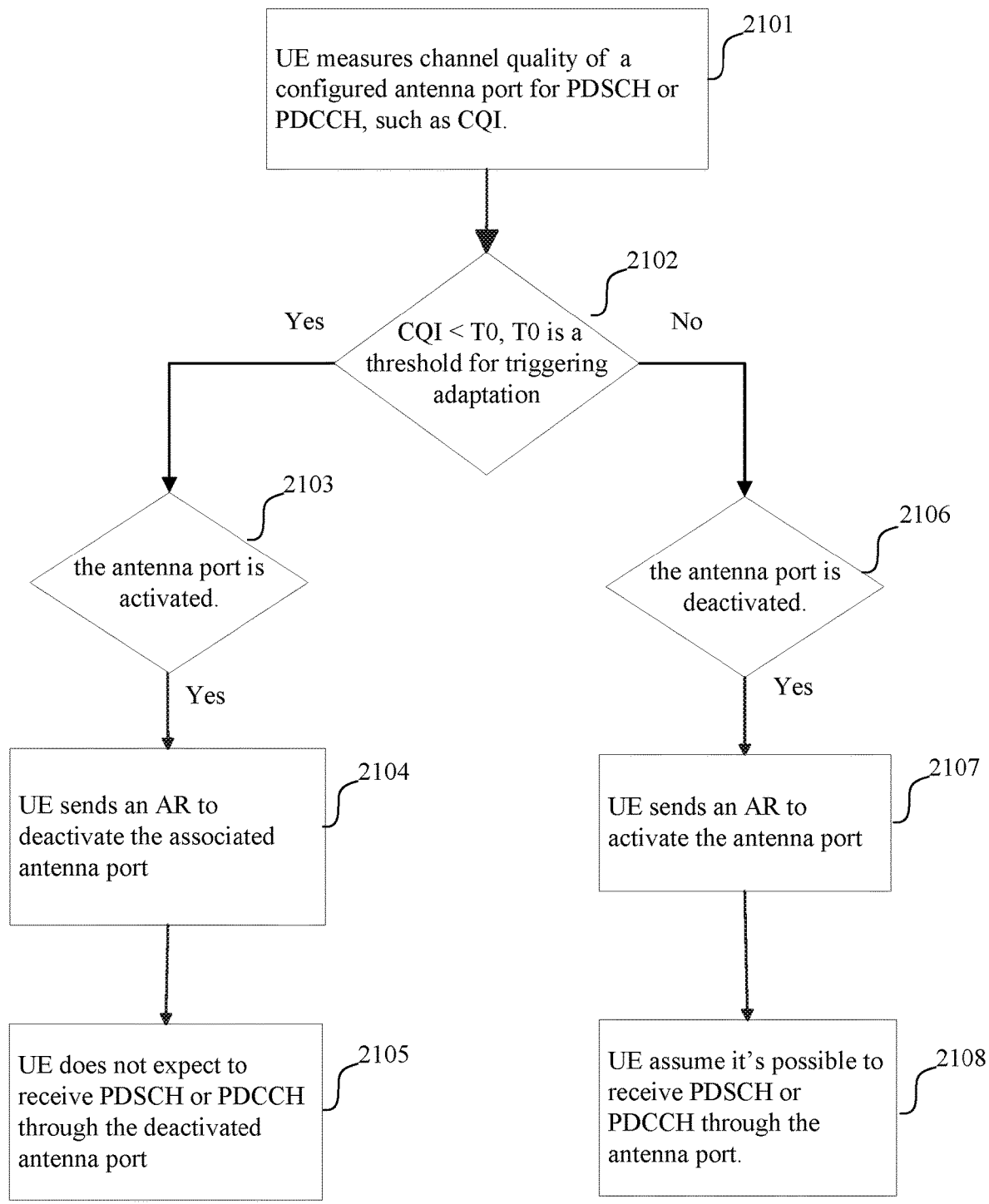
FIG. 21 illustrates an example of a UE procedure for (de)activation of antenna port according to one embodiment of the present disclosure.

FIG. 21 illustrates an example of a UE procedure for (de)activation of antenna port according to one embodiment of the present disclosure. The embodiment shown in FIG. 21 is for illustration only. Other embodiments could be used without departing from the scope of this disclosure.

As illustrated in FIG. 21, a UE can measure channel quality, such as CQI, for a configured antenna port for PDSCH or PDCCH reception in step 2101. The UE then determines whether or not the measured CQI is less than a threshold T0, where T0 can be either defined in the specification of the system operation, for example, T0=3, or provided to the UE through higher layer signaling in step 2102.

When the CQI is less than T0, the UE determines whether or not the antenna port is activated in step 2103. When the antenna port is activated, the UE transmits an AR to deactivate the antenna port in step 2104. The UE then does not expect to receive PDSCH or PDCCH through the antenna port in step 2105.

When the CQI is not less than T0 (or another threshold T1), the UE then determines whether or not the antenna port is deactivated in step 2106. When the antenna port is deactivated, the UE then transmits an AR to the gNB activate the antenna port in step 2107. The UE then assumes the UE can receive PDSCH or PDCCH through the antenna port in step 2108.

In a second approach of spatial domain UE adaptation, an AR can trigger UE adaptation on a maximum number of RX or TX antenna ports for PDSCH reception or PUSCH transmission. A UE can be provided with a list of candidate values for a maximum number of TX or RX antenna ports. An AR can indicate a value for a maximum number of TX or RX antenna ports from the preconfigured candidate list.

In a third approach of spatial domain UE adaptation, an AR can trigger UE adaptation on a maximum number of MIMO layers for PUSCH transmission or PDSCH reception. A list of candidate values for the maximum number of MIMO layers for PUSCH transmission or PDSCH reception can be either defined in the specification of the system operation or provided to the UE through higher layer signaling and is bounded by a UE capability. An AR can indicate a value for a maximum number of TX or RX antenna ports from the preconfigured candidate list.

An adaptation on any spatial domain radio resource can be jointly adapted with an active BWP. A UE can be provided with an applicable value for any spatial domain radio resource related adaptation entity per BWP, and the UE applies the applicable value associated with the active BWP. When the UE is triggered to switch BWP, the UE adapts the applicable value for any spatial domain radio resources related adaptation entity accordingly.

For an AR on any spatial domain radio resource related adaptation entity, E, in one example, a UE can be provided a list of candidate values for E, and an AR can indicate an applicable value of E. The candidate values can be either provided to the UE through higher layer signaling or be defined in the specification of the system operation. In another example, the UE can be provided with an offset O. The UE applies the offset, O, to spatial domain radio resources related adaptation entity, E, such that $E=E'+O$, where $E'$ is the original applicable value for a spatial domain radio resource related adaptation entity.

A spatial domain radio resource related adaptation entity can be any of the following: an activated TX or RX antenna port(s) at a UE for PDSCH reception or PUSCH transmission; a maximum number of TX or RX antenna ports for PDSCH reception or PUSCH transmission; a maximum of MIMO layers for PDSCH reception or PUSCH transmission; or an (de)activated number or set of SCells.

Embodiment 2-D. Baseband Processing Overhead Reduction

The fourth sub-embodiment considers UE adaptation schemes on baseband processing. One or a combination of the following examples or approaches for UE adaptation in the dimension of baseband processing overhead reduction can be enabled.

In a first approach of baseband processing related UE adaptation, an AR can indicate adaptation on PDCCH blind decoding operations at a UE. The AR can indicate adaptation on at least one of the following PDCCH blind decoding related adaptation entities.

In one example, the PDCCH blind decoding related adaptation entity can be a set of monitored CCE aggregation levels (ALs) for at least one or more search space set(s). For example, the adaptation on the monitored CCE aggregation levels can be based on a link quality experienced by the UE, such as a RSRP or a CQI for a corresponding CORESET or active BWP. The AR on DL/UL BWP can be provided based on any of the UE adaptation procedures defined in the Embodiment 1. In one sub-example, a UE can transmit a periodic or triggered AR to a gNB informing of one or more preferred configurations by the UE of CCE ALs for the UE to monitor. The gNB can confirm the actual set of CCE ALs for the UE to monitor through an AR response. In another sub-example, a UE can transmit a periodic or triggered UE assistance information report to the gNB. The gNB can confirm or adjust the set of CCE ALs for the UE to monitor through an AR response. The UE assistance information in the associated report can include one or a combination of the following information: link quality associated with PDCCH reception in CORESETs or in a DL BWP where the UE is configured to monitor PDCCH; one or more preferred sets of CCE ALs for the UE to monitor PDCCH.

In another example, a PDCCH blind decoding related adaptation entity can be a total number of PDCCH candidates across all CCE ALs. An AR can indicate a scaling for a number of PDCCH candidates to X % of the configured number of PDCCH candidates in an associated CORESET or across all CORESETs, where 0<X<=100. In case a fractional number of PDCCH candidates for a CCE AL results after scaling, the 'floor' or the 'ceiling' of the number can apply and whether it is the 'floor' or the 'ceiling' can be specified in the system operation.

In yet another example, the PDCCH blind decoding related adaptation entity can be a PDCCH blind decoding capacity, i.e. a number of PDCCH blind decodings a UE performs per slot. An AR can indicate to the UE to scale the number of PDCCH blind decodings per slot to X % of the configured capacity, where 0<X<=100. Similar to the number of PDCCH candidates, a 'floor' or a 'ceiling' function can further apply on a scaled number.

In yet another example, a PDCCH blind decoding related adaptation entity can be the smallest CCE AL to monitor. For a smallest CCE AL, v, the UE does not expect to monitor a CCE AL smaller than v.

In yet another example, a PDCCH decoding/monitoring related adaptation entity can be for a UE to skip PDCCH monitoring for a number of C-DRX cycles after the AR reception. The number of C-DRX cycles can be provided to the UE in advance by higher layer signaling or be indicated by the AR. An AR indication to the UE to skip PDCCH monitoring in a number of C-DRX cycles can be applicable to a subset of DCI formats that a UE is configured to monitor. For example, the AR indication to the UE to skip PDCCH monitoring can be applicable to search space sets associated with DCI formats 0_0, 0_1, 1_0, and 1_1 and not be applicable to search space sets associated with DCI formats 0_2 and 1_2. For example, the search space sets can be associated with a UE-specific search space. A motivation is that the former DCI formats can be associated with MBB traffic while the latter DCI formats can be associated with URLLC traffic that is sporadic and may require low latency that make it challenging for a gNB to determine whether or not a UE can skip monitoring of DCI formats 0_2 and 1_2 in next C-DRX cycles. It is also possible that the gNB configures a UE to receive AR for adaptation to PDCCH decoding operations only when the UE is not configured to monitor DCI formats 0_2 and 1_2. When the UE is configured to monitor DCI formats 0_2 and 1_2, the UE does not expect to receive a configuration for receiving an AR for skipping PDCCH monitoring in next C-DRX cycles.

Figure 22:
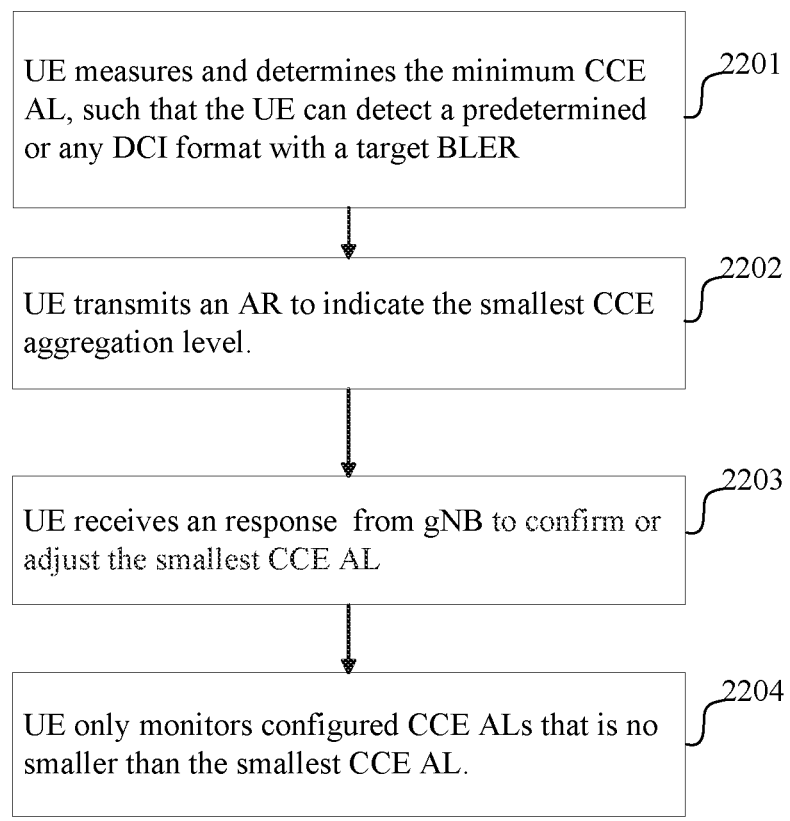
FIG. 22 illustrates an example of a UE procedure for adaptation on minimum CCE aggregation levels to monitor according to one embodiment of the present disclosure.

FIG. 22 illustrates an example of a UE procedure for adaptation of a minimum CCE aggregation level to monitor according to one embodiment of the present disclosure. The embodiment shown in FIG. 22 is for illustration only. Other embodiments could be used without departing from the scope of this disclosure.

As illustrated in FIG. 22, a UE can measure and determine minimum Control Channel Element (CCE) aggregation level (AL) such that the UE can detect a predetermined or any DCI format with a target Block Error Rate (BLER) in step 2201. The UE then transmits an AR to indicate the smallest CCE AL to gNB 2202. The UE can receive a response from the gNB to confirm or adjust the smallest CCE AL in step 2203. The UE then only monitors configured CCE ALs that are not smaller than the smallest CCE AL in step 2204.

An adaptation on a number of PDCCH blind decodings related entity can be jointly adapted with one or a combination of the following adaptation entities from other operational dimensions. In one example, the adaptation entity from another operational dimension for joint adaptation with a number of PDCCH blind decodings can be a (de)activation of SCells. In another example, the adaptation entity from another operational dimension for joint adaptation with a number of PDCCH blind decodings can be an (de)activation of C-DRX configuration. In yet another example, the adaptation entity from another operational dimension for joint adaptation with a number of PDCCH blind decodings can be a maximum number of DL/UL MIMO layers. In yet another example, the adaptation entity from another operational dimension for joint adaptation with a number of PDCCH blind decodings can be a PDCCH monitoring periodicity.

In a second approach of baseband processing related UE adaptation, an AR can indicate an adaptation on RRM measurement. The AR can indicate adaptation on at least one of the following RRM measurement related adaptation entities:

In one example, an RRM measurement related adaptation entity can be the periodicity of SS/PBCH block measurement time configuration (SMTC) window for a SS/PBCH block based RRM measurement. In one sub-example, an AR can indicate a scaling of a SMTC window periodicity according to a change of a SS/PBCH-based RSRQ or a SS/PBCH-based RSRP measurement at the UE. For example, an association between SMTC window periodicity scaling and a change of SS/PBCH-based RSRQ or SS/PBCH-based RSRP can be as follows. An AR can indicate to adapt to a next larger SMTC window periodicity when $$\frac{\sum_{i=2}^{N} |X_i - X_{i-1}|}{N-1} \leq T0,$$

where X_i is i-th measurement of a SS/PBCH-based RSRQ or SS/PBCH-based RSRP. N is a number of latest accumulated measurements, and T0 is a threshold; and/or an AR can indicate to adapt to a next smaller SMTC window periodicity when $$\frac{\sum_{i=2}^{N} |X_i - X_{i-1}|}{N-1} > T0,$$

where X_i is the i-th measurement of a SS/PBCH-based RSRQ or SS/PBCH-based RSRP, N is a number of latest accumulated measurements, and T0 is a threshold.

For another sub-example, an AR can indicate an adaptation on the periodicity of a SMTC window according to a change of a channel condition such as a channel condition status/level as defined in Embodiment 5. A UE can be provided with an association among predetermined adaptation candidates and different channel condition/channel condition status/levels. An AR can indicate one or multiple adaptation candidate(s).

For another sub-example, an AR can indicate an adaptation on the periodicity of a SMTC window according to a UE mobility status as defined in Embodiment 5. In this case, a UE can be provided an association among predetermined adaptation candidates and different UE mobility status. An AR can indicate one or multiple adaptation candidate(s).

In another example, a radio resource management (RRM) measurement related adaptation entity can be the periodicity of CSI-RS based measurements per cell or per group of cells. In one sub-example, an AR can indicate a scaling of a measurement periodicity according to a change of a CSI-RS based RSRQ or CSI-RS based RSRP measurement at UE. For example, an association between CSI-RS measurement periodicity scaling and a change of CSI-RS based RSRQ or CSI-RS based RSRP can be as follows. An AR can indicate an adaptation to a next larger CSI-RS measurement periodicity when $$\frac{\sum_{i=2}^{N} |X_i - X_{i-1}|}{N-1} \leq T0,$$

where X_i is an i-th measurement on CSI-RS based RSRQ or CSI-RS based RSRP. N is a number of latest accumulated measurements, and T0 is a threshold; an AR can indicate an adaptation to a next smaller CSI-RS measurement periodicity when $$\frac{\sum_{i=2}^{N} |X_i - X_{i-1}|}{N-1} > T0,$$

where X_i is an ith measurement on CSI-RS based RSRQ or CSI-RS based RSRP, N is a number of latest accumulated measurements, and T0 is a threshold. In another sub-example, an AR can indicate an adaptation on a periodicity of CSI-RS based measurement according to the change of a channel condition, i.e. channel condition status/level as defined in Embodiment 5.

A UE can be provided an association among predetermined adaptation candidates and different channel condition/channel condition status/level. An AR can indicate one or multiple adaptation candidate(s). In yet another sub-example, an AR can indicate adaptation on the periodicity of CSI-RS based measurement according to a UE mobility status as defined in Embodiment 5. A UE can be provided an association among predetermined adaptation candidates and different states of UE mobility status. An AR can indicate one or multiple adaptation candidate(s).

In yet another example, an RRM measurement related adaptation entity can be (de)activation of carrier frequencies to measure. The RRM measurement can be a CSI-RS based measurement or a SS/PBCH block based measurement. In one sub-example, an AR can indicate adaptation on the activation or deactivation of a list of carrier frequencies to measure, for example according to a change in channel condition, such as a channel condition status/level as defined in Embodiment 5. A UE can be provided with an association among predetermined adaptation candidates and different channel condition/channel condition status/level. An AR can indicate one or multiple adaptation candidate(s). In another sub-example, an AR can indicate adaptation on the activation or deactivation of a list of carrier frequencies to measure in adaptation to UE mobility status as defined in the Embodiment 5. A UE can be provided an association among predetermined adaptation candidates and different UE mobility status. An AR can indicate one or multiple adaptation candidate(s).

In yet another example, an RRM measurement related adaptation entity can be a (de)activation of cells per carrier frequency to measure. The RRM measurement can be a CSI-RS based measurement or a SS/PBCH block based measurement. In one sub-example, an AR can indicate adaptation on the activation or deactivation of a list of cells for a UE to measure, for example according to a change in channel condition such as a channel condition status/level as defined in Embodiment 5. A UE can be provided an association among predetermined adaptation candidates and different channel condition/channel condition status/levels. An AR can indicate one or multiple adaptation candidate(s). In another sub-example, an AR can indicate adaptation on the activation or deactivation of a list of cells to measure in adaptation to a UE mobility status as defined in the Embodiment 5. A UE can be provided an association between predetermined adaptation candidates and different states of UE mobility status. An AR can indicate one or multiple adaptation candidate(s).

For adaptation on RRM measurement, a set of adaptation candidates can be predetermined in the system operation with respect to different traffic loads/UE power status/latency requirements/UE mobility status/link quality/channel condition. Every adaptation candidate can be associated with one or a combination of entities/parameters related to RRM measurement and other operational dimensions. An AR on RRM measurement can be used to indicate one or multiple adaptations from the predetermined set of adaption candidates.

Embodiment 3: Power Saving Signal/Channel in the DL

The third embodiment of this disclosure considers a physical layer signal/channel for transmitting an adaptation request from a gNB to UE. The physical layer signal/channel is referred to as power saving signal/channel in the DL.

Embodiment 3-A: Control Message for AR from gNB

The first sub-embodiment of Embodiment 3 considers control messages to convey an AR or the content of the AR transmitted from a gNB, including adaptation entities and corresponding updates, for triggering any UE adaptation schemes in Embodiment 2.

In a first approach, a control message to convey an AR from a gNB can be a bitmap [v0, v1, . . . , v_{N−1}]. The AR indicated by a bitmap is referred to as AR format 1. This type of control message can be used to scale one or multiple adaptation entities. The bitmap can be included in an existing DCI format as a new field. For example, a new field can be added in DCI format 2_0/2_1/_2_2/2_3 for each UE in a group of UEs. Alternatively, some existing fields of a DCI format can be interpreted as a bitmap for conveying an AR. For example, existing fields in DCI format 1_0/1_1 can be re-interpreted to provide a field for AR when the UE operates in a power saving mode/state. Adaptation entities for AR format 1 can be either predefined in the specification of the system operation or provided to a UE through higher layer signaling. Each of the adaptation entities is associated with one or more bits within the bitmap. A binary value of a bit, v_i, within the bitmap can convey one of the following updates/values for an associated adaptation entity, e_i, according to the adaptation entity type.

Type 1.1): An associated adaptation entity has ON/OFF states. Then, v_i=0/1 can indicate activation/deactivation of an associated entity, respectively. For example, the associated adaptation entity can be a SCell or a group of SCells. When a SCell is deactivated, a UE can skip PDCCH monitoring in the deactivated SCell. For another example, the associated adaptation entity can be a search space set or a group of search space sets. For yet another example, the associated adaptation entity can be a CORESET or a group of CORESETs. For yet another example, the associated adaptation entity can be an antenna port or a group of antenna ports.

Type 1.2): The value of an associated adaptation entity is selected from a list of candidate values. The list of candidate values can be either defined in the specification of the system operation or provided to the UE through higher layer signaling. The applicable value of the associated adaptation entity is selected from a predetermined or configured list of candidates. Then, v_i=0/1 can indicate a selection of a next Nth larger/smaller value, respectively, where N is a positive integer, and can be either predefined in the specification of the system operation or provided to the UE through higher layer signaling. For example, the associated adaptation entity can be a long/short C-DRX cycle. For another example, the associated adaptation entity can be an Inactiv-ity timer of C-DRX operation. For yet another example, the associated adaptation entity can be an ON duration of a C-DRX operation.

Type 1.3): The value of an associated adaptation entity is a list/range of values. Then, v_i=0/1 can indicate a selection of a first/second half of the default or configured range/list. For example, the associated adaptation entity can be a set of CCE aggregation levels for a UE to monitor in a USS set.

Type 1.4): The value of an associated adaptation entity is a value within a range from v_min to v_max. Then, for example, when v_i=0, e_i=v_default, where v_default is a default configuration value or a configuration value provided by higher layers within the range, and when v_i=1, e_i=max (e_i/2, v_min) that can indicate a reduction of the associated entity to half a value for the associated entity. A 'floor' or a 'ceiling' function can apply when e_i/2 is not an integer. For example, an associated adaptation entity can be a number of PDCCH candidates across CCE aggregation levels. For another example, an associated adaptation entity can be a number of activated antenna ports. For yet another example, an associated adaptation entity can be USS monitoring periodicity; For yet another example, associated adaptation entity can be a PDCCH monitoring periodicity.

In a second approach, a control message to convey an AR can be a new DCI format with N fields. This type of AR is referred to as AR format 2. Each field in the DCI format can be associated with one adaptation entity. Adaptation entities in the new DCI format can be either predefined in the specification of the system operation or provided to a UE through higher layer signaling. A number of candidate values for each field can be same or different. For example, a number of candidates for a field can be 2/4/8 with size of 1/2/3 bits. A list of candidate values for associated adaptation entities can be either defined in the specification of the system operation or provided to the UE through higher layer signaling. The DCI format fields for conveying an adaptation request can be configurable by higher layers, such as in Tables 2 to 5. A UE can determine an association among fields and adaptation entities in the new DCI format through any of the following. In one example, one field in the DCI format can be associated with a single adaptation entity. The associated adaptation entity can be any adaptation entity described in Embodiment 2 of this disclosure. All examples of adaptation entity in AR format 1 can also be examples for AR format 2 and can be associated to fields in AR format 2. In another example, one field in the DCI format can be associated with multiple adaptation entities within one or across multiple operational domains/aspects. The candidate values for each field can be an index to an adaptation table. The adaptation table jointly encodes a relationship among the associated adaptation entities.

Table 2 shows potential DCI format fields for UE adaptation per search space set s and Control Resource Set (CORESET) p.

TABLE 2

| Field | Field size/bit | Notes |
|---|---|---|
| Index of the search space set for adaptation, s, | 1-2 | if a new DCI format is used |
| Scaling of the monitoring periodicity, $k_s$ | 1 | "1": $k_s = 2k_s$; "0": $k_s = k_s/2$ |
| Scaling of the monitoring duration, $T_s$ | 1 | "1": $T_s = T_s/2$; "0": $T_s = 2T_s$ |
| Activated ALs, L | 1 | "1": {1, 2, 4}, "0": {8, 16} |
| Activated PDCCH candidates | 1-2 | $M_s^{(L)} = c1 * M_s^{(L)}$, where $c1 \in$ |

TABLE 2-continued

| Field | Field size/bit | Notes |
|---|---|---|
| per activated AL L, $M_s^{(L)}$ | | {0%, 25%, 50%, 100%} |
| number of consecutive symbols for CORESET p, $D_p$ | 1 | "1": $D_p = \max(D_p - 1, 3)$, "0": $D_p = \min(D_p + 1, 1)$, |
| BWP indicator | 1-3 | |

Table 3 shows potential DCI format fields for (de)activation of search space sets for PDCCH monitoring.

TABLE 3

| Field | Field size/bit | Notes |
|---|---|---|
| (de)activation of CORESET s | 1 | "1/0": deactivation/activation |
| (de)activation of all search space sets in CORESET p | 1 | "1/0": deactivation/activation |
| (de)activation of all search space sets in active DL BWP, i | 1 | "1/0": deactivation/activation |
| The sleep duration when search space set(s) are deactivated, T_sleep | 1-2 | T_sleep = c2*T0, where T0 = PDCCH monitoring periodicity/DRX cycle, and $c2 \in \{1, 2, 4, 8\}$. |
| DL activated BWP index when search space set(s) are activated | 1-2 | |

Table 4 illustrates potential DCI format fields for power saving signal/channel monitored outside Active Time of DRX.

TABLE 4

| Field | Field size/bit | Notes |
|---|---|---|
| Wake-up or go-to-sleep for next N DRX ON durations. N can be either fixed and defined in the specification of system operation, e.g. N = 1 or provided to UE through higher layer signaling. | 1 | "1/0": wake-up/go-to-sleep; or "0/1": wake-up/go-to-sleep |
| BWP indication | 2 | Indicate the active BWP. This field can be activated when the first field trigger UE to wake-up for next N DRX ON duration(s) |
| Wake-up or go-to-sleep for next N + 1 to (K + 1) * N DRX ON duration(s). K can be either fixed and defined in the specification of system operation, e.g. K = 1 or provided to UE through higher layer signaling. | K, e.g. K = 2 | This field can be activated when the first filed trigger UE to go-to-sleep for next N DRX ON duration(s) |
| Minimum scheduling delay K0/K2 for DL/UL | 1-2 | Indicate the active BWP. This field can be activated when the first filed trigger UE to wake-up for next N DRX ON duration |
| Adaptation table indicator | 1-2 | Indicate the row of adaptation table for joint adaptation across multiple power consumption aspects. This field can be activated when the first filed trigger UE to wake-up for the next DRX ON duration |

Table 5 illustrates potential DCI format fields for power saving signal/channel monitored within the Active Time of DRX.

TABLE 5

| Field | Field size/bit | Notes |
|---|---|---|
| Skip PDCCH monitoring for next N periodicity. N can be either fixed and defined in the specification of system operation, e.g. N = 1 or provided to UE through higher layer signaling. | 1 | "1/0": skip/not skip; or "0/1": skip/not skip |
| Adaptation table indicator | 1-2 | Indicate the row of adaptation table for joint adaptation across multiple power consumption aspects. This field can be activated when the first filed trigger UE to do not skip PDCCH monitoring for next N PDCCH monitoring periodicities. |
| Skip PDCCH monitoring for next N + 1 to (K + 1) * N periodicity. K can be either fixed and defined in the specification of system operation, e.g. K = 1 or provided to UE through higher layer signaling. | K, e.g. K = 2 | This field is activated when the first field trigger UE to do not skip PDCCH monitoring for next N PDCCH monitoring periodicities. |

In a third approach, the control message to convey an AR from gNB can be a list of adaptation entities and corresponding value pairs. Each adaptation entity can be independently configured whether or not is included in the list and a size of the AR format 3 can be determined based on the adaptation entities contained in each AR message. This type of AR is referred to as AR format 3. All examples of adaptation entities in AR format 1 or in AR format 2, and their combinations, can be examples for AR format 3.

Embodiment 3-B: Physical Downlink Channel for AR from gNB

The second sub-embodiment of Embodiment 3 considers a physical downlink channel for transmitting the AR from a gNB to a UE.

An AR, such as AR Format 1 or AR format 2, can be conveyed by a DCI format through a PDCCH. A DCI format and a corresponding search space set can be defined according to one of the following examples.

In one example, the DCI format can be a modification of DCI format 1_1/1_0 with some new fields. A UE monitors DCI format 1_0/1_1 in a USS for an AR from a gNB.

In another example, the DCI format can be an existing DCI format but can be interpreted differently for a UE configured for operation in a power saving mode.

In another example, the DCI format can be a new UE-specific DCI format. The CRC bits of the new UE-specific DCI format can be scrambled by a new RNTI, such as a CPS-RNTI. The new DCI format can reuse a structure of DCI format 1_0/1_0 with CRC scrambled by the new UE-specific RNTI, and the UE monitors the new DCI format in one or more USS sets.

In yet another example, the DCI format can be a new UE group-common (GC) DCI format that a UE is configured to monitor in a CSS. The CRC bits of the new DCI format can be scrambled by a new RNTI, such as a PS-RNTI. The new DCI format can reuse the structure of DCI format 2_2.

A UE can be provided with any of the following for a search space set for monitoring PDCCH for the new DCI format. Any of the following can be either defined in the specification of the system operation or be provided to the UE through higher layer signaling.

- A search space set index s. In one example, the search space set s can be either one of the configured search space sets for other purposes. In another example, the search space set s can be a dedicated search space set and cannot be used for other purposes.
- An association between the search space set s and a CORESET p. For example, CORESET p can be CORESET 0.
- A PDCCH monitoring periodicity of ks slots. For example, ks=10 slots.
- A duration of Ts<ks slots indicating a number of consecutive slots, in the period of ks, where the UE monitors PDCCH candidates for search space set s. For example, Ts=1.
- A number of PDCCH candidates $M_s^{(L,PS)}$ per CCE aggregation level $L^{PS}$. For example, $M_s^{(L,PS)}=1$ for aggregation level $L^{PS}=1$ or 2 or 4 or 8 or 16.
- An indication to monitor PDCCH candidates for associated DCI formats. For example, the UE may only monitor the new DCI format in search space set s.

A UE can be provided with any of the following for the CORESET of PDCCH receptions providing a DCI format with an AR. Any of the following can be either fixed and defined in the specification of the system operation or provided to the UE through higher layer signaling.

- A CORESET index p. In one example, the CORESET p can be one of the configured CORESETs for other purposes. In another example, the CORESET p can be a dedicated CORESET and can not be used for purposes.
- A precoder granularity for a number of REGs in the frequency domain where the UE can assume use of a same DM-RS precoder. For example, the precoder granularity can be the total bandwidth of the CORESET p. In this case, the DM-RS precoder is same for all the RBs of CORESET p.
- A number of consecutive symbols that provides a CORESET size in the time domain. For example, the number of consecutive OFDM symbols for CORESET p can be fixed to 3.
- A set of resource blocks that provides a CORESET size in the frequency domain. For example, the set of resource blocks of CORESET can be fixed to 50 RBs.

When an AR is transmitted in a DCI format that a UE can be configured to monitor for other purposes, such as DCI format scheduling PDSCH receptions or PUSCH transmissions, a UE may receive multiple applicable values that will be valid for a same slot. To avoid a misunderstanding of applicable values for associated adaptation entities between the gNB and the UE, the UE can use any of the following methods.

In one example, when the UE receives an AR in slot n, the UE does not expect any different AR before the AR is applied after an application delay. In another example, when the UE receives multiple ARs that become effective/valid at a same slot n, the UE only applies the first received AR, and ignores the others. In yet another example, when the UE receives multiple ARs that become effective/valid at a same slot n, the UE only applies a last received AR, and ignores the others. In yet another example, when the UE receives multiple ARs that become effective/valid at a same slot n, the UE only applies the smallest applicable value indicated by the ARs. For example, when the AR indicates a minimum processing delay, the UE applies the minimum indicated value when the UE receives multiple ARs that become effective/valid at a same time.

To reduce a signaling overhead while maintaining flexibility on adaptation granularity, multiple DCI formats with different selected fields can be defined in the specification of the system operation or provided to a UE through higher layer signaling. Each of the DCI formats can include a different subset of adaptive parameters or adaptation entities. For example, one DCI format can be associated with a PDCCH monitoring configuration. For another example, one DCI format can be used when a UE is triggered to wake-up and another DCI format can be used when a UE is triggered to go-to-sleep. When multiple DCI formats with different fields are supported, the DCI format indicator can be included as one field of the DCI format.

An AR from a gNB, such as AR format 3, can be conveyed in a MAC CE through a PDSCH.

Embodiment 3-C: Power Saving Signal/Channel for Acknowledgement Response from a gNB The third sub-embodiment of Embodiment 3 considers a physical downlink channel and a control message for a gNB to transmit an ACK or NACK in response to receiving an AR transmission from a UE.

In a first approach, an ACK or NACK response to a UE can be provided through a DCI format in a PDCCH, such as a DCI format for scheduling a PDSCH reception or a PUSCH transmission. For example, a field of 1 bit in one or more DCI formats can be used for a gNB to provide an ACK/NACK response to an AR from a UE where, for example, a binary '1' value can represent a positive acknowledgement (ACK) and a binary '0' value can represent a negative acknowledgement or an absence of a corresponding PUCCH reception (NACK/DTX).

In a second approach, an ACK or NACK response can be provided through a wake-up signal (WUS)/go-to-sleep signal (GSS).

In a third approach, an ACK or NACK response can be provided through a DL RS transmission to the UE. In one example, a modified CSI-RS can be used to provide ACK or NACK response where, for example, an initial condition of CSI-RS sequence can indicate an ACK or NACK response ('0' or '1'). In another example, a modified DMRS of PDCCH or a PDSCH can be used to provide an ACK or NACK response where, for example, an initial condition of the DMRS sequence can indicate an ACK or NACK response ('0' or '1').

In a fourth approach, an ACK or NACK response can be provided through a new DL channel/signal. A number of PRBs, over one or multiple symbols within a slot, can be configured by a gNB to a UE as reserved for the gNB to transmit a signal providing an ACK or NACK response to an AR transmission by the UE. The UE can expect to monitor the DL channel or signal that provides the AR response. Multiple AR responses corresponding to multiple UEs can be multiplexed in the DL channel/signal, for example using code-division multiplexing (CDM) or frequency-division multiplexing (FDM), and a UE can be further configured with a code in case of CDM or with REs in case of FDM for receiving an associated AR response.

In a fifth approach, an AR response can be provided through MAC/RRC signaling that is provided to a UE in a PDSCH, similar to an activation of a transmission configuration indication (TCI) state.

Embodiment 4: Power Saving Signal/Channel in the UL

A fourth embodiment of this disclosure considers a physical layer signal/channel design for transmitting an adaptation request from a UE to a gNB. The physical layer signal/channel is referred as power saving signal/channel in the UL.

Embodiment 4-A: Control Message for AR from a UE

In a first approach, a control message to convey an AR can be a bitmap [$v0, v1, \ldots, v\_(N-1)$]. The AR indicated by a bitmap is referred to as AR format 1. This type of control message can be used to scale one or multiple adaptation parameters. The bitmap can be included with other UCI in a PUCCH transmission as a new field.

Adaptation entities for AR format 1 can be predefined in a system operation or provided to a UE by a gNB through higher layer signaling. Each of the adaptation entities is associated with a predefined or configured bit index within the bitmap.

A binary value of a bit, $v\_i$, can convey one of the following updates for an associated adaptation entity, $e\_i$, according to the following adaptation entity types.

Type 1.1): An associated adaptation entity has ON/OFF states. Then, $v\_i=0/1$ can indicate activation/deactivation of associated entity, respectively. For example, the associated adaptation entity can be a SCell or a group of SCells. When a SCell is deactivated, a UE skips PDCCH monitoring in the deactivated SCell. For another example, the associated adaptation entity can be a search space set or a group of search space sets. For yet another example, the associated adaptation entity can be a CORESET or a group of CORESETs. For yet another example, the associated adaptation entity can be an antenna port or a group of antenna ports.

Type 1.2): The value of an associated adaptation entity is selected from a list of candidate values. The list of candidate values can be either defined in the specification of the system operation or provided to the UE through higher layer signaling. The applicable value of the associated adaptation entity is selected from a predetermined list of candidates. Then, $v\_i=0/1$ can indicate a selection of a next Nth larger/smaller value, respectively, where N is a positive integer, and can be either predefined in the specification of the system operation or provided to the UE through higher layer signaling. For example, the associated adaptation entity can be a long/short C-DRX cycle. For another example, the associated adaptation entity can be an Inactivity timer of C-DRX operation. For yet another example, the associated adaptation entity can be an ON duration of C-DRX operation.

Type 1.3): The value of an associated adaptation entity is a list/range of values. Then, $v\_i=0/1$ can indicate a selection of a first/second half of the default or configured range/list. For example, the associated adaptation entity can be CCE aggregation levels to monitor in USS.

Type 1.4): A value of an associated adaptation entity is a value within a range from $v\_min$ to $v\_max$. Then, for example, when $v\_i=0$, $e\_i=v\_default$, where $v\_default$ is a default configuration value or a configuration value provided by higher layers within the range, and when $v\_i=1$, $e\_i=max$ ($e\_i/2$, $v\_min$) that can indicate a reduction of the associated entity to half a value for the associated entity. A 'floor' or a 'ceiling' function can apply when $e\_i/2$ is not an integer. For example, an associated adaptation entity can be a number of PDCCH candidates across CCE aggregation levels. For another example, an associated adaptation entity can be a number of activated antenna ports. For yet another example, an associated adaptation entity can be a USS monitoring periodicity. For yet another example, an associated adaptation entity can be a PDCCH monitoring periodicity.

In a second approach, a control message to convey an AR can be a new UCI type, other than HARQ-ACK information, CSI, or SR request, with N fields for AR. This type of AR is referred to as AR format 2. Adaptation entities can be predefined in a system operation or configured to a UE by a gNB by higher layers, and are indicated by the UCI. Two types of association between fields in the UCI and configured adaptation entities can be supported for AR format 2:

Type 2.1): one field in the UCI can be associated with a single adaptation entity. The associated adaptation entity can be a single adaptation entity from one operational dimension. All examples of adaptation entity in AR format 1 can also be examples for AR format 2 and can be associated to fields in AR format 2.

Type 2.2): one field in the UCI can be associated with multiple adaptation entities within one or across multiple operational dimension(s). The candidate values for each field can be an index from a predetermined or configured table, wherein the table jointly encodes a relationship among the associated adaptation entities. A number of candidate values for each field can be same or different. For example, a number of candidate values can be 1, 2 or 4.

In a third approach, a message in AR can be a list of adaptation entities with their associated values. Each adaptation entity can be independently configured whether or not is included in the list and a size of AR format 3 can be determined based on the adaptation entities contained in each AR message. This type of AR is referred to as AR format 3. All examples of adaptation entity in AR format 1, all examples of adaptation entity in AR format 2, and their combinations, can be examples for AR format 3.

In a fourth approach, the message in AR can be a list of one or multiple preferred adaptations from s UE. S number of preferred adaptations that s UE can request can be predetermined in a system operation, such as for example one adaptation, or be configured to the UE by higher layers. If the UE is configured to request more than one preferred adaptations, the order of preference can be according to the order of the corresponding fields in the AR.

Embodiment 4-B: Physical UL Channel for AR from UE

The second sub-embodiment of the Embodiment 4 considers a physical uplink channel for transmitting an AR from a UE to a gNB.

For a periodic AR from a UE, the AR can be transmitted over dedicated PUCCH/PUSCH resources. The UE can be configured an AR periodicity, i.e. T0, and a PUCCH/PUSCH resource for transmission of a PUCCH/PUSCH that includes the AR. The periodic AR can coincide with a periodic/semi-persistent CSI report having a same or different periodicity and the UE can then combine the AR and the CSI report in a same PUCCH/PUSCH resource. If a number of available REs (excluding REs used for DMRS transmission) in a PUCCH/PUSCH resource is not sufficient for control information in a respective PUCCH/PUSCH transmission to achieve a target code rate, the UE can prioritize transmission of the AR over transmission of CSI reports.

For a triggered/aperiodic AR, one or a combination of multiple channels as defined below can be used to transmit the AR.

In a first example, a PUCCH can be used to provide an AR. For example, a PUCCH format 2, 3, or 4, can be used to provide a bitmap of N bits to represent the AR (AR format 1), where N is a predefined or configured to a UE by a serving gNB through higher layer signaling. AR format 2 or AR format 3 can also be provided by a PUCCH.

In a second example, a PUSCH can be used to provide an AR. An AR transmission in a PUSCH can be through a MAC CE that can typically support a larger AR payload for more detailed AR information that an AR transmission in a PUCCH. All AR formats or a subset of AR formats can be supported by a MAC CE in a PUSCH.

Embodiment 5: UE Assistance Information

In one approach of UE assistance information, UE assistance information can be an implicit adaptation request for preferred adaptations by the UE as discussed in the first embodiment of this disclosure. This type of UE assistance information can be transmitted through power saving signal/channel as defined in the Embodiment 4 of this disclosure.

In a second approach of UE assistance information, UE assistance information can be power saving state/mode. The $N>=1$ power saving state(s)/mode(s) can be associated with different power saving schemes or UE adaptations or power saving gain level, or power consumption level. One or more power saving state(s)/mode(s) can be either defined in the specification of the system operation or provided to UE through higher layer signaling. For example, three power saving states, PSS_0, PSS_1, PSS_1 can be predetermined by a UE to indicate high, medium, low power saving gain or power consumption level. The UE can report to a gNB a preferred power saving gain level, or power consumption level, by transmitting assistance information about the corresponding power saving state/mode.

In a third approach of UE assistance information, UE assistance information can be a preferred power saving signal configuration, i.e. the configuration for a physical layer signal/channel to trigger UE adaptation. The associated configuration parameters to report can be a monitoring periodicity for the power saving signal/channel, or a BWP for receiving the power saving signal/channel. This type of UE assistance information can be reported by higher layer signaling, for example, in a MAC CE through a PUSCH transmission.

In a fourth approach of UE assistance information, UE assistance information can be associated with UE power status/UE mobility status/channel condition status/link quality status/traffic load status.

For UE battery/power status, multiple UE battery/power status states associated with different battery levels can be either defined in the specification of the system operation or provided to UE through higher layer signaling. For example, UE power/battery status0/UE power/battery status 1/UE power/battery status 2 can be predefined with respect to battery level of (0-33%]/(33%-66%]/(66%-100%], respectively.

For a UE mobility status, multiple UE mobility status states associated with different UE speeds or a number of handovers within a time period can be either defined in the specification of the system operation or provided to UE through higher layer signaling. For example, UE mobility status0/UE mobility status1/UE mobility status2 can be predefined to indicate low/medium/high speed UE, respectively.

For channel condition status/level, multiple channel condition status/levels associated with SINR/CQI/RSPR/RSRQ of reference sequence can be either defined in the specification of the system operation or provided to UE through higher layer signaling. The channel condition status/level can be defined per antenna port, or BWP, or SCell, or a group of SCells.

In one example, multiple channel condition levels, for example, channel condition status 0, channel condition status 1, and/or channel condition status 2 can be predefined associated to bad/moderate/good channel condition.

In another example, a change of channel condition can be captured to assist the UE adaptation in operation parameters. A channel condition status can be associated with a change of SINR/CQI/RSRP/RSRQ measured over a time period. Multiple channel condition status in terms of the change of channel condition can be predetermined. For example, channel condition status 0, channel condition status 1 and/or channel condition status 2 can be predefined associated to small/medium/large change of channel condition For link quality status/level, multiple link quality status/levels associated with PDCCH reception in CORESETs where the UE is configured to monitor PDCCH can be either defined in the specification of the system operation or provided to UE through higher layer signaling. Multiple link quality status can be associated with channel quality indicator (CQI), for example, link quality status 0, link quality status 1 and/or link quality status 2 can be defined to indicate bad/moderate/good link quality, respectively.

For a traffic load state, multiple traffic load states associated with a buffer status/size at a UE can be either defined in the specification of the system operation or provided to UE through higher layer signaling. For example, multiple traffic load status states, denoted as, S^traffic_0, S^traffic_1 and S^traffic_2, can be defined to indicate a high traffic load, a moderate traffic load, or large traffic load, respectively.

The predetermined UE power status, UE mobility status, channel condition status, link quality status, and/or traffic load status can be fixed or provided to a UE through higher layer signaling.

A periodic UE assistance information report in the third UE-assisted approach can be transmitted over a PUCCH resource. The UE can be configured a report periodicity, i.e. T1, and a PUCCH resource for transmission of a PUCCH that includes the report. The periodic UE assistance information report can coincide with a periodic/semi-persistent CSI report with a same or different periodicity, and the UE can then combine the two reports in a same PUCCH resource. If a number of available REs (excluding REs used for DMRS transmission) in a PUCCH resource is not sufficient for all control information types in a respective PUCCH transmission to achieve a target code rate, the UE can prioritize transmission of the UE assistance information report for power saving purpose over transmission of CSI reports. The configuration of periodic PUCCH/PUSCH for a UE to provide an assistance report can include any of the following parameters: a periodicity, T0; a start OFDM symbol; a duration in terms of a number of consecutive OFDM symbols; a starting RB; and/or a number of continuous RBs in the frequency domain; a DMRS configuration.

For a triggered UE assistance information report in the third UE-assisted approach, a PUSCH can be used to provide the report. A UE assistance information report transmitted in a PUSCH can be through a MAC CE that can typically support a larger payload for more detailed UE assistance information than a in a PUCCH.

Radio Resource Control (RRC) state is a conventional solution for providing to a UE system access, power savings, and mobility optimization. Apart from the RRC states of RRC_CONNECTED and RRC_IDLE, that are already supported in 4G long-term evolution (LTE), NR introduces an additional RRC state, RRC_INACTIVE, to adjust to different service characteristics. The characteristics of the supported RRC states are summarized in Table 6.

TABLE 6

RRC_IDLE

PLMN selection;
Broadcast of system information;
Cell re-selection mobility;
Paging for mobile terminated data is initiated by 5GC;
Paging for mobile terminated data area is managed by 5GC;
DRX for CN paging configured by NAS.

RRC_INACTIVE

Broadcast of system information;
Cell re-selection mobility;
Paging is initiated by NG-RAN (RAN paging);
RAN-based notification area (RNA) is managed by NG-RAN;
DRX for RAN paging configured by NG-RAN;
5GC-NG-RAN connection (both C/U-planes) is established for UE;
The UE AS context is stored in NG-RAN and the UE;
NG-RAN knows the RNA which the UE belongs to.

RRC_CONNECTED

5GC-NG-RAN connection (both C/U-planes) is established for UE;
The UE AS context is stored in NG-RAN and the UE;
NG-RAN knows the cell which the UE belongs to;
Transfer of unicast data to/from the UE;
Network controlled mobility including measurements.

RRM Measurement

A UE in RRC_CONNECTED mode is configured by the network to perform measurements and report a received signal measurement information to a gNB. An RRC Reconfiguration message includes the followings elements:

Measurement Object: List of objects (with indication of the frequency/time location and subcarrier spacing of reference signals to be measured) on which measurements are to be performed.

Reporting Configuration: A list of reporting configurations where there can be one or multiple reporting configurations per measurement object. It comprises periodic or event-driven triggers to send measurement report, RS type (e.g. SS/PBCH block or CSI-RS) and report format (such as, information to be included, e.g. RSPR) of the report.

Measurement Identity: A list of measurement identities where each measurement identity links one measurement object with one reporting configuration. This identifies a measurement and defines the applicable measurement object and reporting configuration.

Quantity configurations: The quantity configuration defines the measurement filtering configuration used for all event evaluation and related reporting of that measurement type.

Measurement Gaps: This indicates the time period when no downlink or uplink transmissions are performed. The objective of this time gap is to enable UE to switch radio and perform measurements from the neighboring cells when they operate on frequencies other than that of the serving cell.

For a synchronization signal (SS) based RRM measurement, a SS reference signal received power (SS-RSRP) and SS reference signal received quality (SS-RSRQ) are measured by UE and reported to the gNB. SS-RSRP is measured based on the resource elements that include secondary synchronization signals (SSS) and potentially also based on the resource elements that include demodulation reference signals (DMRS) for a physical broadcast channel (PBCH). The measurement time resources for SS-RSRP are confined within the SS/PBCH-block measurement time configuration (SMTC). A UE is not expected to perform SS-RSRP outside the SMTC, wherein the SMTC is configured to the UE by system information for RRC_IDLE and RRC_INACTIVE mode and by radio resource control (RRC) for RRC_CONNECTED, and each SMTC configuration contains a window periodicity, a window duration, and a window offset. SS-RSRQ is defined as the ratio of N times SS-RSRP and NR carrier received signal strength indicator (RSSI), where N is a number of resource blocks in the carrier RSSI measurement bandwidth that can be same as for SS-RSRP. The measurement time resource is configured by system information for RRC_IDLE and RRC_INACTIVE mode and by RRC for RRC_CONNECTED. The measurement time resource configuration contains a slot-level indication within the SMTC, where the indication is using a bitmap, and a symbol-level indication within the configured slot(s), where the indication is using a starting symbol index as 0 and configurable ending symbol index from the set of {1, 5, 7, 11}.

The information Element (IE) of 'useServingCellTimingForSync' defined in 'measObjectNR' from RRC signaling is used to indicate whether the timing among associated cells in the target carrier is synchronized or not. When the useServingCellTimingForSync is set to TRUE, a UE can use a timing of a serving cell to derive a SS/PBCH block index transmitted by neighboring cells for intra-frequency measurement, while the UE can use a timing of any detected cell in the target frequency layer to derive a SS/PBCH block index transmitted by neighboring cells for inter-frequency measurement. However, there are many cases where useServingCellTimingForSync is set to FALSE or is not enabled. Then, the UE has to decode PBCH or identify PBCH-DMRS sequence for SS/PBCH block index identification and timing synchronization. The process of PBCH decoding or PBCH-DMRS identification consumes additional UE power and can cause measurement delay.

Moreover, the duration of SMTC window is only configured at a subframe level. An IE of ssb-ToMeasure defined in measObjectNR is used to indicate the SS/PBCH blocks to be measured within the associated SMTC window. However, SSB-ToMeasure in the format of a bitmap cannot help a UE to locate SS/PBCH blocks that need to be measured in an asynchronous network as the timing differences among associated target cells are random and can be at a symbol level. Thus, there are unnecessary UE measurements in both front and end boundaries within the associated SMTC window, and UE power consumption is large due to the overhead on SS/PBCH block index identification in an asynchronous network.

In CSI-RS based RRM measurements, a CSI reference signal received power (CSI-RSRP) and CSI reference signal received quality (CSI-RSRQ) are measured by the UE and reported to the gNB, wherein the CSI-RS for RRM measurement can be transmitted periodically. CSI-RSRP is measured based on the resource elements that include CSI-RS as configured by RRC for RRM measurement purpose. CSI-RSRQ is defined as the ratio of N times CSI-RSRP and CSI-RSSI, where N is a number of resource blocks in a CSI-RSSI measurement bandwidth. For CSI-RSSI, the measurement bandwidth is same as the configured CSI-RS bandwidth and the measurement time resource corresponds to symbols containing the configured CSI-RS occasions.

A UE cost will increase if a UE is required perform CSI-RS measurements with multiple cell timings because a CSI-RS based measurement, that is different from a SS/PBCH block based measurement, is operated in frequency domain, FFT operation is involved, and more accurate timing is required.

In C-DRX mode, an objective is for a UE to operate (e.g. receive PDCCH, perform time-frequency tracking, RRM measurements including RLM and neighbor cell measurement, and so on) for as short duration as possible in order to minimize UE power consumption. A UE may not be required to measure CSI-RS outside the active time. However, when measurement results for serving cell after the UE wakes up are not accurate, or when beam tracking for a neighboring cell is needed, it can be beneficial that the UE has more flexibility on mobility measurement based on RS resources associated with C-DRX but not confined strictly within the active time and the active DL BWP.

UE Mobility State

In LTE systems, a mobility state of a UE is detected by counting a number of hand overs (# HOs) over a specified period of time. A number of cell changes is compared with two thresholds (N_H and N_L, configured by gNB) to determine one of the three mobility states: high, medium, and normal. These states are determined as: # HOs>N_H implies high, N_L<# HOs<N_H implies medium, and # HOs<N_L implies normal mobility state, respectively.

Therefore, there is a need to enhance the design for SS/PBCH block based measurements, at least for asynchronous networks. There is another need to enhance a design for CSI-RS based measurements, at least for asynchronous networks. There is another need to reduce or avoid unnecessary RRM measurements by utilizing a change of UE mobility status and channel or link condition. Also, there is another need to optimize the RRM measurement in C-DRX.

For an asynchronous network, unless explicitly mentioned otherwise, a timing among associated target cells to be measured per target carrier defined in measObjectNR from RRC signaling could be random in symbol level or slot level or radio frame level. The target carrier contains the ssbFrequency defined in measObjectNR that indicates a frequency location of associated SS/PBCH blocks to be measured, and refFreqCSI-RS defined in measObjectNR that indicates a frequency location of CSI-RS resources to be measured.

Embodiment 6: Enhancement on SS/PBCH Based Measurement

The sixth embodiment of this disclosure considers enhancements on SS/PBCH based intra-frequency and inter-frequency mobility measurements. An associated mobility measurement quantity can be at least one of SS-RSRP or SS-RSRQ or SS-SINR or NR carrier RSSI, wherein each mobility measurement quantity can be applicable for beam management, or L3 mobility, or RLM measurement.

A set of SS/PBCH blocks for a UE to measure within an SMTC measurement duration can be configured to the UE by a network through a bitmap, such as ssb-ToMeasure, by higher layer signaling. If not configured by higher layers, the UE assumes to measure on all SS/PBCH blocks within the configured SMTC duration. In synchronous networks, a UE can derive a SS/PBCH block index from a serving cell when an associated configuration parameter useServingCellTimingForSync is set to TRUE; otherwise, the UE may need to decode the PBCH or identify the PBCH-DMRS sequence for SS/PBCH block index identification and timing synchronization. However, both the location and implicit indication of SS/PBCH block indices may not work well for an asynchronous network when a timing difference among all target measurement cells is random and unknown to the UE. Moreover, the SMTC window may need to be large in order to capture all configured SS/PBCH block instances from all associated target cells. Thus, this embodiment defines approaches to locate and identify the SS/PBCH blocks for the UE to measure with high accuracy and low complexity for UE power savings on SS/PBCH block based measurements such as in an asynchronous network.

Figure 23:
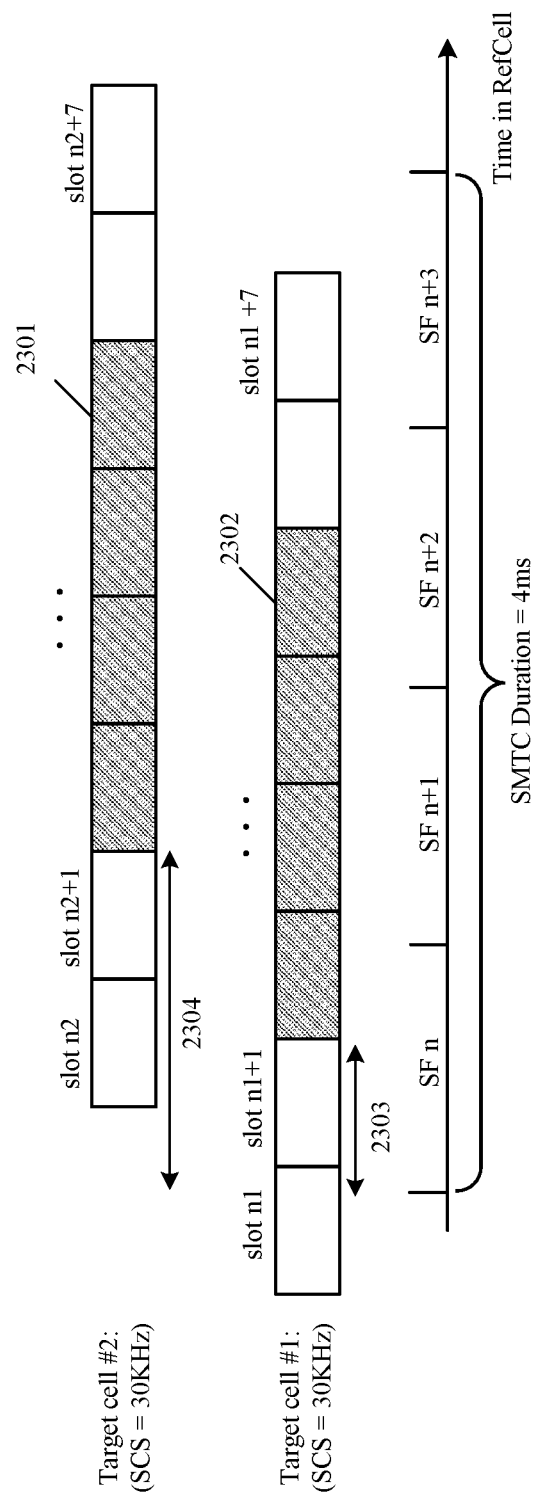
FIG. 23 illustrates an example of one measurement occasion with SMTC window duration of 4 ms and two target cells for SS/PBCH block based measurement in asynchronous network according to one embodiment of the present disclosure.

FIG. 23 illustrates an example of one measurement occasion with a SMTC window duration of 4 ms and two target cells for SS/PBCH block based measurement according to one embodiment of the present disclosure. The embodiment shown in FIG. 23 is for illustration only. Other embodiments could be used without departing from the scope of this disclosure.

Three reference numbers 2303 and 2304 indicate a time offset relative to a reference cell (RefCell) from target cell #1 and target cell #2, respectively. The slots with reference numbers 2301 and 2302 are the SS/PBCH block burst sets from target cell #1 and target cell #2, respectively.

In a first approach, a UE can perform SS/PBCH block based measurements, wherein a configured measurement duration can be common for a group of cells such as to be utilized for an asynchronous network. In one example, the cells to measure (target cells), associated to a SMTC window per target carrier can be classified into groups according to their timing difference relative to a reference cell. The UE can be configured to perform SS/PBCH block based measurement using a configured cell-group specific measurement duration among target cells with time offsets within a predefined interval.

In one example for the reference cell in the first approach, the reference cell (RefCell) can be the serving cell (i.e. SpCell) for intra-frequency measurement. In another example for the reference cell in the first approach, the reference cell can be one of the detected cells in the target frequency layer for inter-frequency measurement. In yet another example for the reference cell in the first approach, the reference cell can be the cell with earliest timing among all the target cells associated to the SMTC window so that the time offset from other target cells relative to the RefCell would be positive.

In one example for the cell-group determination in the first approach, the cell-group identity for a target cell can be derived from the time offset in the target cell relative to the reference cell. There can be K cell-groups configured by a gNB, where the cell-group # k (k=0, . . . , K−1) contains target cell(s) with time offset within the same interval, such as [k*O^SMTC_granularity, (k+1)*O^SMTC_granularity], where O^SMTC_granularity is the time offset granularity associated to the SMTC window. The cell-group ID for target cell with cell ID # i can be determined by its time offset relative to the RefCell, denoted as O_i, according to Equation 1B:

$$\text{CellGroup\^ID}\_i = \text{floor}(O\_i / O\text{\^SMTC\_granularity}) \quad \text{Equation 1B}$$

In the first approach, a UE can be configured to perform SS/PBCH based measurements confined within a measurement duration associated to the cell group (e.g. a cell-group specific measurement duration), wherein the measurement duration for cell group # k can be determined as the duration between a first slot index and a last slot index, relative to the start of the associated SMTC window duration, denoted as firstSlot_k, and lastSlot_k, correspondingly (where k= 0, . . . , K). The cell-group specific measurement duration can be configured from at least one of the following options or examples.

In a first measurement configuration option (MD configuration option 1)), firstSlot_k, and lastSlot_k, can be determined by the cell-group ID (e.g. k), the granularity of time offset (e.g. O^SMTC_granularity), and the duration of SS/PBCH block burst set (e.g. D^SSBs). The start of measurement duration (e.g. firstSlot_k) can be computed according to Equation 2, and the end of measurement duration (e.g. lastSlot_k) can be computed according to Equation 3, respectively.

$$\text{firstSlot\_}k = k * O\hat{\ }\text{SMTC\_granularity}, \quad \text{Equation 2}$$

$$\text{lastSlot\_}k = (k+1) * O\hat{\ }\text{SMTC\_granularity} + D\hat{\ }\text{SSBs}, \quad \text{Equation 3}$$

In a second measurement configuration option (MD configuration option 2)), firstSlot_k can be determined by the minimum time offset among the target cells within the cell-group # k, according to Equation 4, while lastSlot_k can be determined by the maximum time offset among the target cells within the cell-group # k and the duration of SS/PBCH block burst set (e.g. D^SSBs), according to Equation 5.

$$\text{firstSlot\_}k = O\hat{\ }\min\_k, \quad \text{Equation 4}$$

$$\text{lastSlot\_}k = O\hat{\ }\max\_k + D\hat{\ }\text{SSBs}, \quad \text{Equation 5,}$$

wherein O^min_k=min {O_i}, and O^max_k=max {O_i} for CellGroup^ID_i=k.

Figure 24:
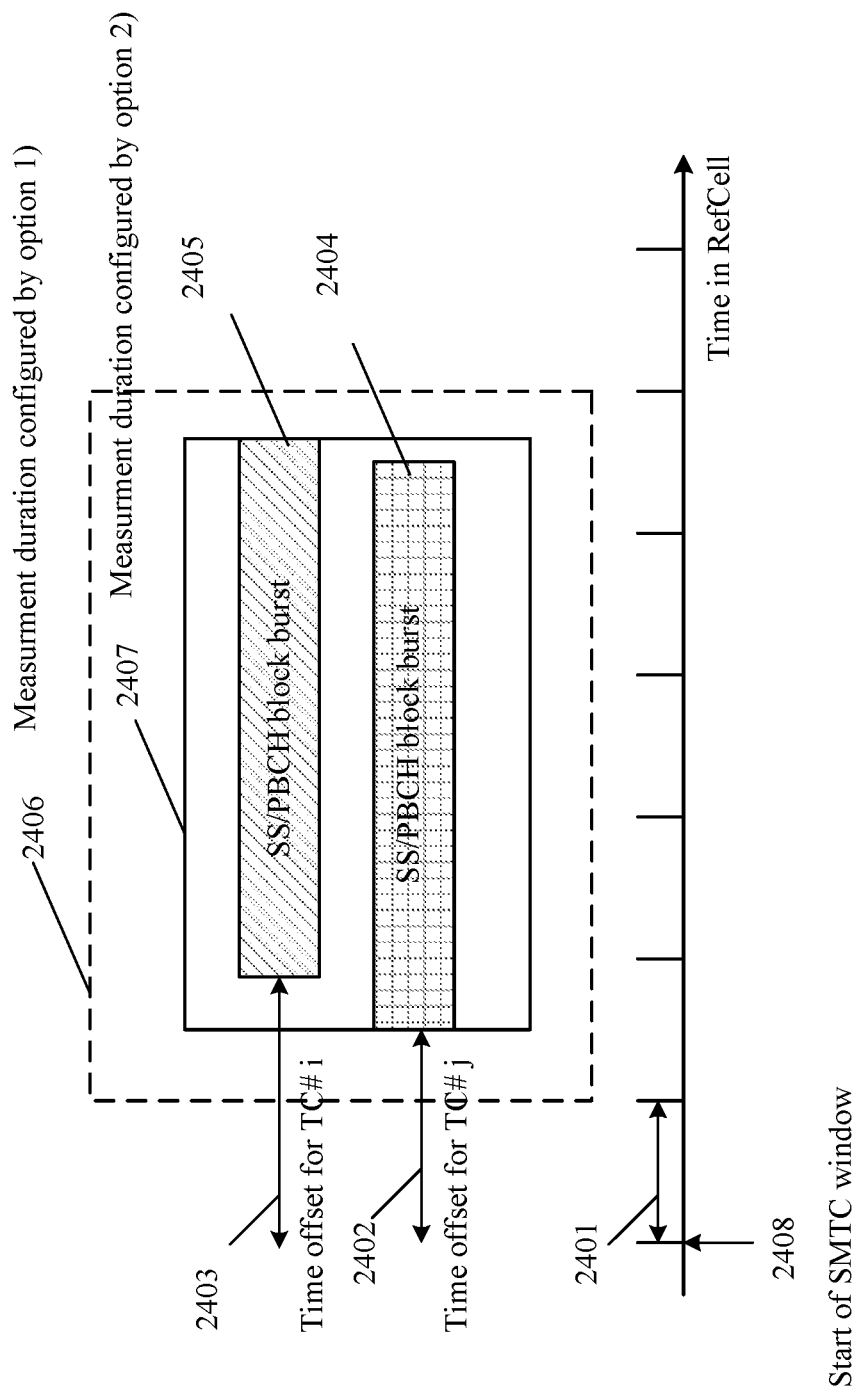
FIG. 24 illustrates the example on the measurement duration for cell-group #1 according to one embodiment of the present disclosure.

FIG. 24 gives an illustration of the example on the measurement duration for cell-group #1 according to one embodiment of the present disclosure. The embodiment shown in FIG. 24 is for illustration only. Other embodiments could be used without departing from the scope of this disclosure.

The reference number 2401 indicates the offset granularity, O^SMTC_granularity; the reference number 2408 indicates the start of the associated SMTC window duration, the reference numbers 2404 and 2405 are SS/PBCH blocks from two target cells with time offset within the interval [O^SMTC_granularity, O^SMTC_granularity*2], represented by the reference numbers 2402 and 2403, respectively. The reference umber 2406 indicates the measurement duration for cell-group #1 configured using the first option (e.g. MD configuration option 1), and the reference number 2407 indicates the measurement duration for cell-group #1 configured based the second option (e.g. MD configuration option 2).

Figure 25:
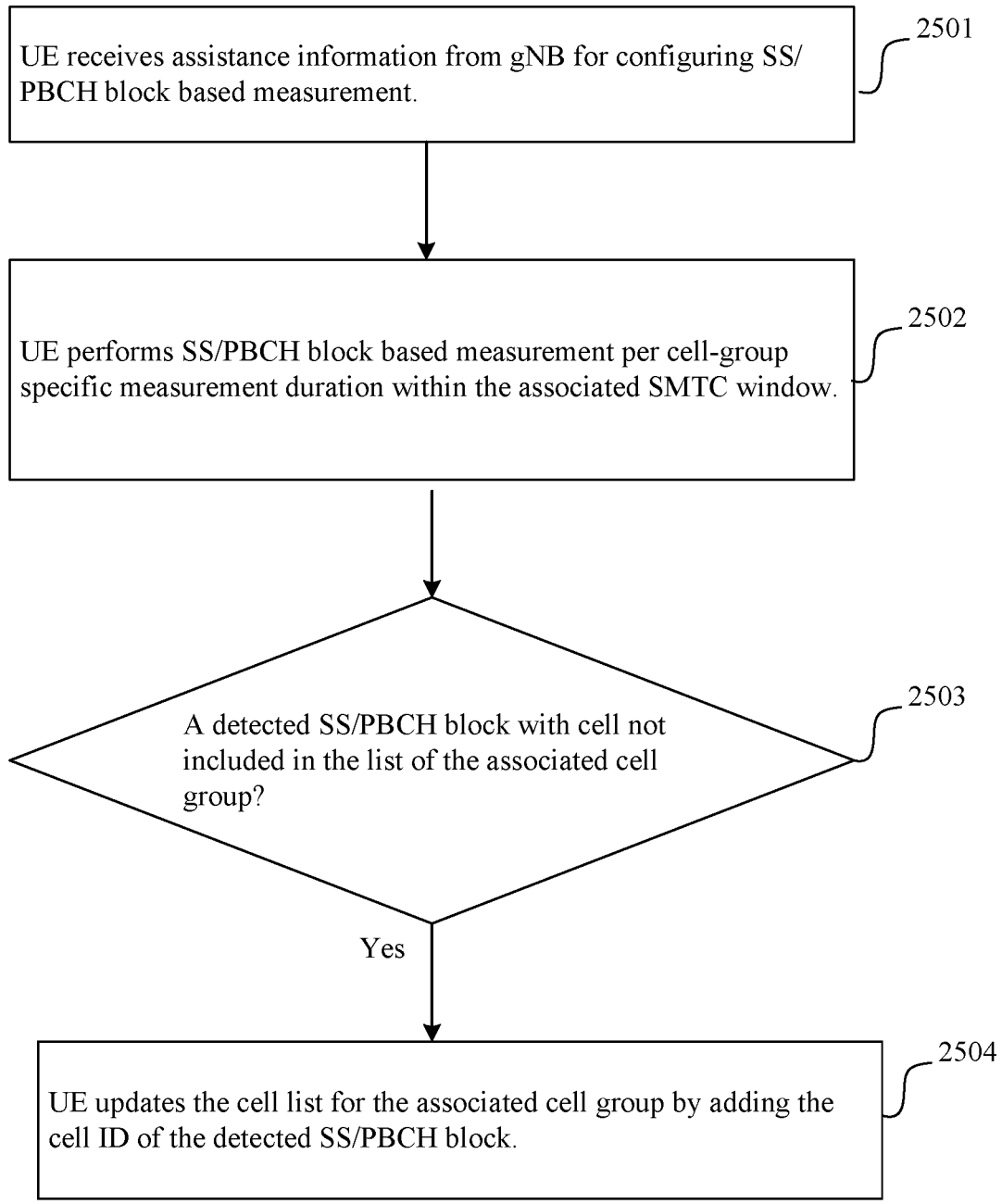
FIG. 25 illustrates an example procedure for SS/PBCH blocks based measurement in the associated SMTC window when the first approach in this embodiment is enabled according to one embodiment of the present disclosure.

FIG. 25 illustrates an example procedure for SS/PBCH blocks based measurement in the associated SMTC window when the first approach in the sixth embodiment is enabled according to one embodiment of the present disclosure. The embodiment shown in FIG. 25 is for illustration only. Other embodiments could be used without departing from the scope of this disclosure.

In the first approach, a gNB can signal assistance information to a UE for configuring the cell-group specific and SS/PBCH block based measurements in step 2501. The related assistance information can be provided to the UE through higher layer signaling. The UE performs SS/PBCH block based measurements per cell-group specific measurement duration within the associated SMTC window in step 2502. The assistance information from the gNB can be selected from the following examples.

In a first example of the assistance information, a gNB can signal to a UE a list of cell groups in an associated SMTC window per measurement frequency layer where each cell group consists of a list cell(s) to be measured (i.e. target cells) with time offset within the same interval, such as computed based on Equation 1B.

In a second example of the assistance information, a gNB can signal a UE assistance information for configuring a cell group specific measurement duration, wherein the assistance information for configuring the cell-group specific measurement duration can be determined according to the type of configuration option adopted.

For one sub-example, when MD configuration option 1 is adopted, the assisted information for configuring the cell-group specific measurement duration can be the time offset granularity in the associated SMTC, O^SMTC_granularity, and is common for all cell groups.

For another sub-example, when MD configuration option 2 is adopted, the assisted information for configuring the cell group specific measurement duration can be the minimum and maximum time offsets among the target cells within the cell-group # k and is cell-group specific.

In a second approach, a gNB can signal to a UE a time offset of SS/PBCH block location relative to a reference cell (RefCell) per cell for SS/PBCH block based measurements associated to a SMTC window per frequency layer. In one example for the reference cell, the reference cell (RefCell) can be the serving cell (i.e., SpCell) for intra-frequency measurement, and one of the detected cells in the target frequency layer for inter-frequency measurement. In another example for the reference cell, the reference cell can be the cell with earliest timing among all the target cells associated to the SMTC window so that the time offset from other target cell relative to the RefCell would be positive.

In the second approach, the SS/PBCH block time offset for target cell # i, denoted by O^SSB_i can be normalized with granularity of half slot, such that O^SSB_i=floor(O_i/D_halfslot), where O_i is the absolute time offset between target cell # i and RefCell, and D_halfSlot is the duration of half slot among all associated target cells per frequency layer.

In the second approach, in step 2503 it is determined when a detected SS/PBCH block with cell not included in the list of the associated cell group. The index of a detected SS/PBCH block associated to the target cell # i can be derived from the corresponding detected time of the secondary synchronization sequence (SSS) in the detected SS/PBCH block, denoted as T^detected_i and the reference time of the SSS from the first SS/PBCH block in the RefCell, denoted as T^SSB_0, when UE has the knowledge on the associated SS/PBCH block time offset, O^SSBs_i, according to Equation 6; otherwise, the UE needs to decode the PBCH in the associated SS/PBCH to identify the SS/PBCH index. In step 2504, the UE can add a record of the time offset for the detected cell # i, determined by the corresponding detected time of the secondary synchronization sequence (SSS) in the detected SS/PBCH block, denoted as T^detected_i, and the reference time of the SSS from the first SS/PBCH block in the RefCell, denoted as T^SSB_0, according to Equation 7.

$$\text{SSBIndex\_}i = \text{floor}((T\hat{\ }\text{detected\_}i - T\hat{\ }\text{SSB\_0})/D\_\text{half-Slot}) - O\hat{\ }\text{SSB\_}i \quad \text{Equation 6}$$

$$O\hat{\ }\text{SSB\_}i = \text{floor}((T\hat{\ }\text{detected\_}i - T\hat{\ }\text{SSB\_0})/D\_\text{half-Slot}) - \text{SSBIndex\_}i \quad \text{Equation 7}$$

In the second approach, the SS/PBCH blocks to be measured can be indicated to a UE by a bitmap, $BMj=[v_0, \ldots v_1 \ldots v_{L-1}]$, for the target cells with time offset at the same level, such as $O\char`\^SSB\_i=j$. The size of the bitmap, L, can be equal to the size of SS/PBCH block burst set among the target cells associated to the SMTC window. If the bit, $v_1$, in the bitmap, BM_j, equals to 1, it indicates the Ith SS/PBCH block for target cell # i with time offset $O\char`\^SSB\_i$ equals to j should be measured; otherwise if the bit, $v_1$, in the bitmap, BM_j, equals to 0, it indicates the Ith SS/PBCH block for target cell # i with time offset $O\char`\^SSB\_i$ equals to j can be skipped.

Figure 26:
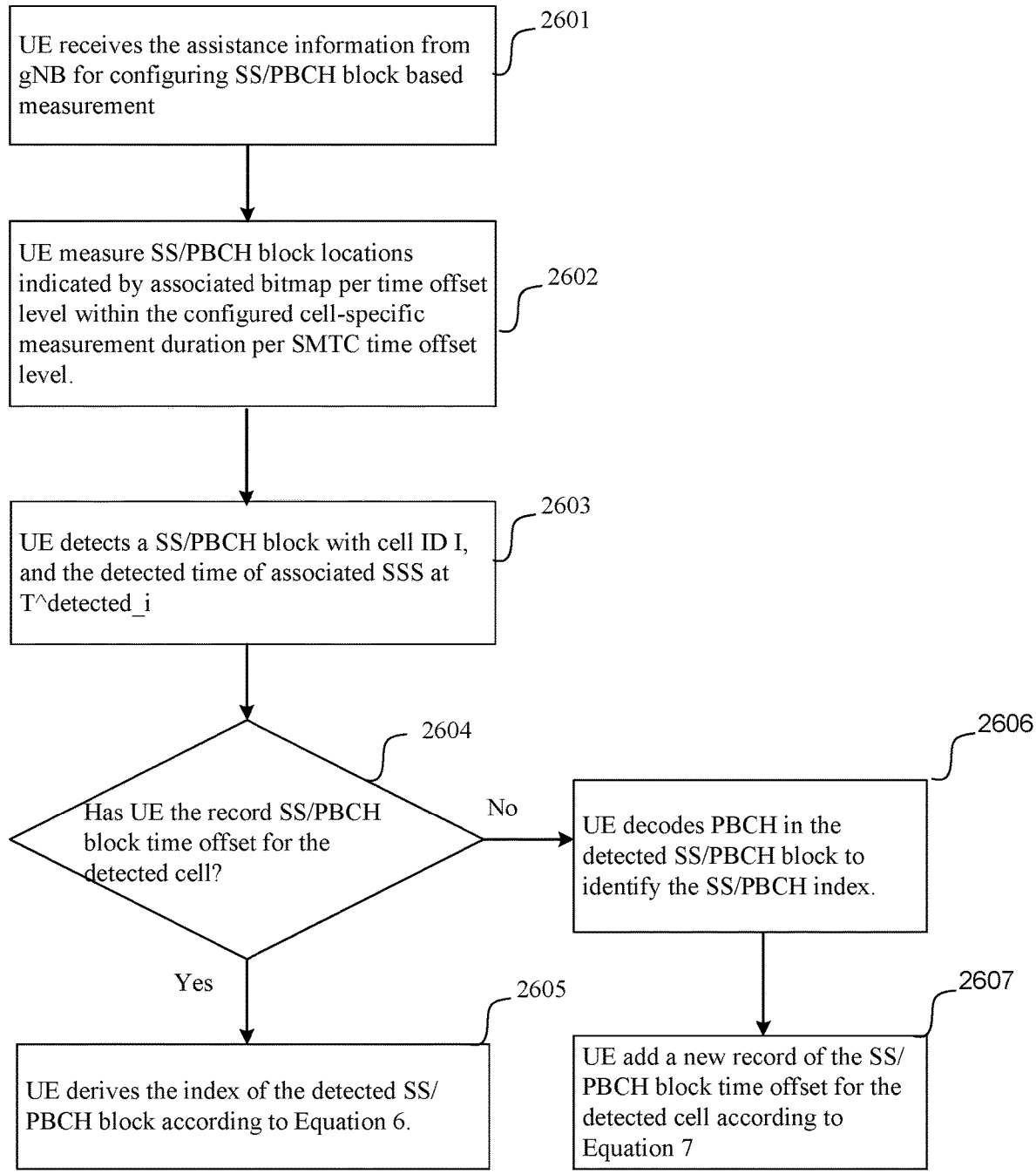
FIG. 26 illustrates the UE procedure when the second approach in this embodiment is enabled according to one embodiment of the present disclosure.

FIG. 26 illustrates a UE procedure when the second approach in the sixth embodiment is enabled according to one embodiment of the present disclosure. The embodiment shown in FIG. 26 is for illustration only. Other embodiments could be used without departing from the scope of this disclosure.

In step 2601, the UE receives the assistance information from gNB for configuring SS/PBCH block based measurement. In step 2602, the UE measures SS/PBCH block locations indicated by associated bitmap per time offset level within the configured cell-specific measurement duration per SMTC time offset level. In step 2603, the UE detects a SS/PBCH block with cell ID I, and the detected time of associated SSS at T^detected_i. In step 2604, it is determined whether UE has the record SS/PBCH block time offset for the detected cell. If yes, the UE derives the index of the detected SS/PBCH block according to Equation 6 in step 2605; otherwise, UE decodes PBCH in the detected SS/PBCH block to identify the SS/PBCH index in step 2606, and add a new record of the SS/PBCH block time offset for the detected cell according to Equation 7 in step 2607.

The gNB can signal the assistance information to the UE for SS/PBCH block based measurement without decoding PBCH on discontinuous duration. The related assistance information can be delivered to UE through higher layer signaling, and it can be selected from the following examples.

In a first example of the assistance information, a gNB can signal UE the SS/PBCH time offset between target cell # i and reference cell, $O\char`\^SSB\_i$.

In a second example of the assistance information, a gNB can signal UE the bitmaps indicating the SS/PBCH blocks to be measured for one or more time offset level(s).

In one consideration, the first approach and second approach defined in the sixth embodiment can be adopted simultaneously. In this case, the time offset granularity, i.e. O^SMTC_granularity in the first approach equals to the half slot duration among all target cells, i.e. D_halfSlot in second approach. The corresponding SS/PBCH time offsets, O^SSB_i, and bitmaps, BM_j, in the second approach can be delivered to UE per cell-group as defined in approach one according to Equation 1B instead of per cell.

Embodiment 7: Enhancement on CSI-RS Based Mobility Measurement

The seventh embodiment of this disclosure considers enhancements on CSI-RS based intra-frequency and inter-frequency mobility measurements. The associated mobility measurement quantity can be CSI-RSRP, or CSI-RSRQ, or CSI-SINR, or CSI-RSSI, wherein each mobility measurement quantity can be applicable for beam management or L3 mobility or RLM measurement.

A UE can perform periodic CSI-RS based mobility measurement among the configured CSI-RS resources per target carrier. The CSI-RS resources to be measured are typically configured per target cell (TC) in both frequency domain and time domain. The duration for cell-specific CSI-RS based measurement is less than one slot and is indicated by the first OFDM symbol configured by higher layer signaling. However, the CSI-RS resources from different cells could have different timing offsets and spread out in time domain, such as in an asynchronous network. Then, the slot boundaries are not aligned among associated target cells. A UE may need to be configured with longer measurement duration in order to tolerate time offsets among target cells.

Figure 27:
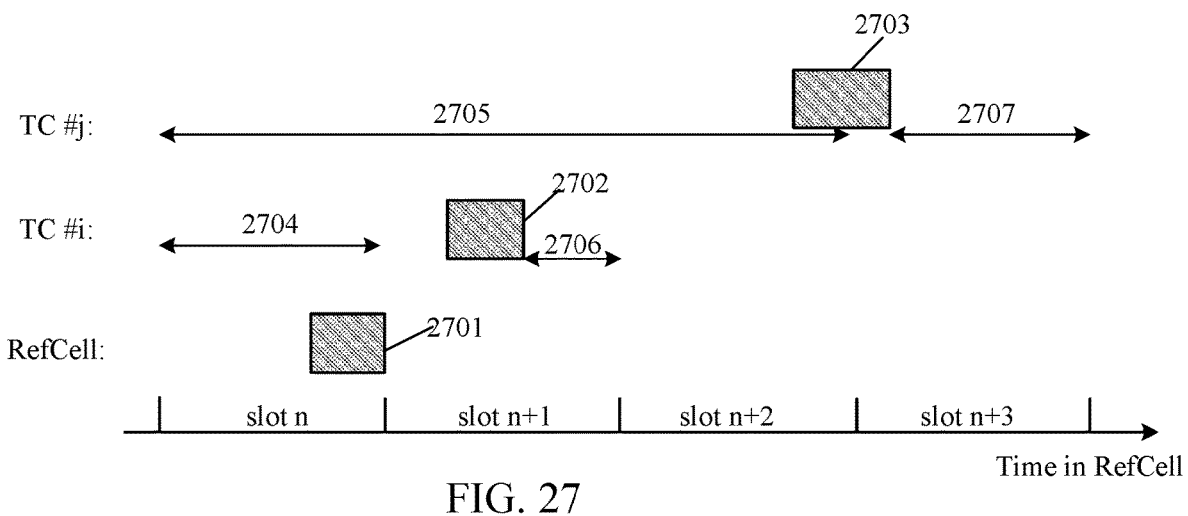
FIG. 27 illustrates an example of CSI-RS resources from different target cells with random time offsets in both slot level and symbol level according to one embodiment of the present disclosure.

FIG. 27 illustrates an example of CSI-RS resources from different target cells with random time offsets in both slot level and symbol level according to one embodiment of the present disclosure. The embodiment shown in FIG. 27 is for illustration only. Other embodiments could be used without departing from the scope of this disclosure.

The reference numbers 2701, 2702, and 2703 indicate one CSI-RS resource occasion from a reference cell (RefCell), TC # i, and TC # j, respectively. The reference numbers 2704 and 2705 indicate the slot level time offset relative to the RefCell for TC # i, and TC # j, respectively. The reference numbers 2706 and 2707 indicate the OFDM symbol level time offset relative to the RefCell for TC # i, and TC # j, respectively.

In a first approach, the CSI-RS based measurement timing configuration (CMTC) window is designed for CSI-RS based mobility measurement, for example to be utilized for an asynchronous network. A UE can perform CSI-RS based measurements on a configured duration confined within the CMTC window. An accurate measurement duration per target cell (TC), i.e., the associated cell to measure, can be determined by the configured duration of associated CMTC window and the time offset of target cell relative to a reference cell (RefCell).

In one example for the reference cell in the first approach, the reference cell (RefCell) can be the serving cell (i.e., SpCell) for intra-frequency measurement.

In another example for the reference cell in the first approach, the reference cell (RefCell) can be one of the detected cells in the target frequency layer for inter-frequency measurement.

In yet another example for the reference cell in the first approach, the reference cell can be the cell with earliest timing among all target cells associated to the CMTC window so that the time offset from other target cells relative to the RefCell would be positive.

Figure 28:
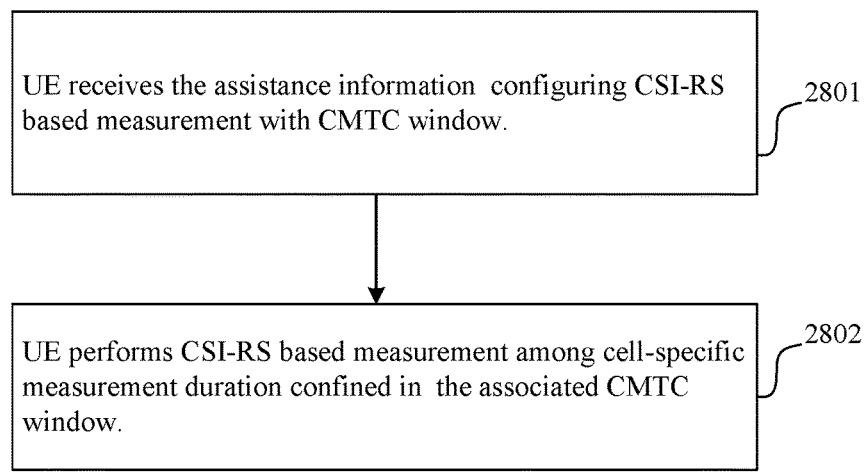
FIG. 28 illustrates an exemplary processing procedure at a UE when the first approach in the second embodiment of the present disclosure is enabled.

FIG. 28 illustrates an exemplary processing procedure at a UE when the first approach in the seventh embodiment of the present disclosure is enabled. The embodiment shown in FIG. 28 is for illustration only. Other embodiments could be used without departing from the scope of this disclosure.

In step 2801, the UE receives assistance information configuring CSI-RS based measurement with CMTC window. In step 2802, the UE performs CSI-RS based measurements among cell-specific measurement durations confined in the associated CMTC window.

In the first approach, the gNB can signal the UE assistance information to configure the CMTC window for configuring the CSI-RS based measurement per frequency layer. The assistance information can be selected from the following examples.

In a first example of assistance information, the gNB can signal the UE the periodicity of CMTC, i.e., T^CMTC. T^CMTC can be selected from a set of values, such as {4 ms, 8 ms, O1 ms, 20 ms, and 40 ms}.

In a second example of assistance information, the gNB can signal the UE a list of cell(s) to be measured (i.e., target cells) associated with the CMTC window. The associated target cells have CSI-RS resources with same periodicity as the associated CMTC window.

In a third example of assistance information, the gNB can signal the UE assistance information for configuring the duration of CMTC, i.e. D^CMTC. The duration of CMTC and be in term of number of OFDM symbols to measure, such that 0<D^CMTC<=N^slot_OS, where N^slot_OS is the number of OFDM symbols per slot among associated target cells per frequency layer.

In a fourth example of assistance information, the gNB can signal the UE a time offset of target cell # i relative to a reference cell, O^CMTC_i. The time offset for TC # i, O^CMTC_i, should be less than the periodicity of CMTC, such as 0<=O^CMTC_i<T^CMTC.

In the first approach, the duration of CSI-RS resources to measure for target cell # i, can be less than one slot. The slot with CSI-RS resources to measure for target cell # i, denoted as slotToMeasure_i, can be derived from the periodicity of the associated CMTC window, and the time offset of the target cell. For example, slotToMeasure_i=n_slot, when mod(n_slot*D^slot_duration, T^CMTC)=O^CMTC_i, In a fifth example of assistance information, the gNB can signal the UE the assistance information about the OFDM symbols with CSI-RS resources to measure within a measurement slot, i.e. slotToMeasure_i. In one sub-example, the measurement duration for TC # i, can be indicated by the first OFDM symbol to measure, denoted as firstOS_i. In this case, the UE can perform CSI-RS based measurements in D^CMTC consecutive OFDM symbols, starting from the first OFDM symbol with index of firstOS_i. In another sub-example, the measurement duration for TC # i, can be indicated by the last OFDM symbol to measure, denoted as lastOS_i. In this case, the UE can perform CSI-RS based measurement in D^CMTC consecutive OFDM symbol, ending at the last OFDM symbol with index of lastOS_i.

In the first approach, the CSI-RS based measurement timing configuration (CMTC) window is designed for CSI-RS based mobility measurement, such as to be utilized for an asynchronous network. In step 2901, the UE receives assistance information configuring CSI-RS based measurements within the CMTC window. In step 2902, the UE can perform CSI-RS based measurements on the configured duration confined within the CMTC window. An accurate measurement duration per target cell (TC), i.e., the associated cell to measure, can be determined by the configured duration of associated CMTC window and the time offset of target cell relative to a reference cell (RefCell).

In the second approach, the gNB can signal to the UE the measurement duration per CSI-RS resource associated to any target cell for CSI-RS based measurement, such as to be utilized for an asynchronous network. The UE can be configured to measure multiple cells per frequency layer, wherein each target cell can be associated with multiple sets of CSI-RS resources with different periodicity, offset, and first OFDM symbol to measure. The UE may base the timing of the CSI-RS resource on the timing of a reference cell (RefCell).

In one example for the reference cell in the second approach, the reference cell (RefCell) can be the serving cell (i.e. SpCell) for intra-frequency measurement and one of the detected cells in the target frequency layer for inter-frequency measurements. In another example for the reference cell in the second approach, the reference cell can be one of associated target cells for inter-frequency measurements.

In the second approach, the duration of the CSI resource for the UE to measure for the configured CSI-RS resource with index # j from target cell # i, can be signaled to the UE and is denoted as D^CSI_{i,j}. The duration per CSI-RS resource and target cell, D^CSI_{i,j}, can be a number of OFDM symbols less than the number of OFDM symbols per slot, such that 0<D^CSI_{i,j}<=N^slot_OFDM, where N^slot_OFDM is the number of OFDM symbols per slot among all the associated target cells per frequency layer.

Figure 29:
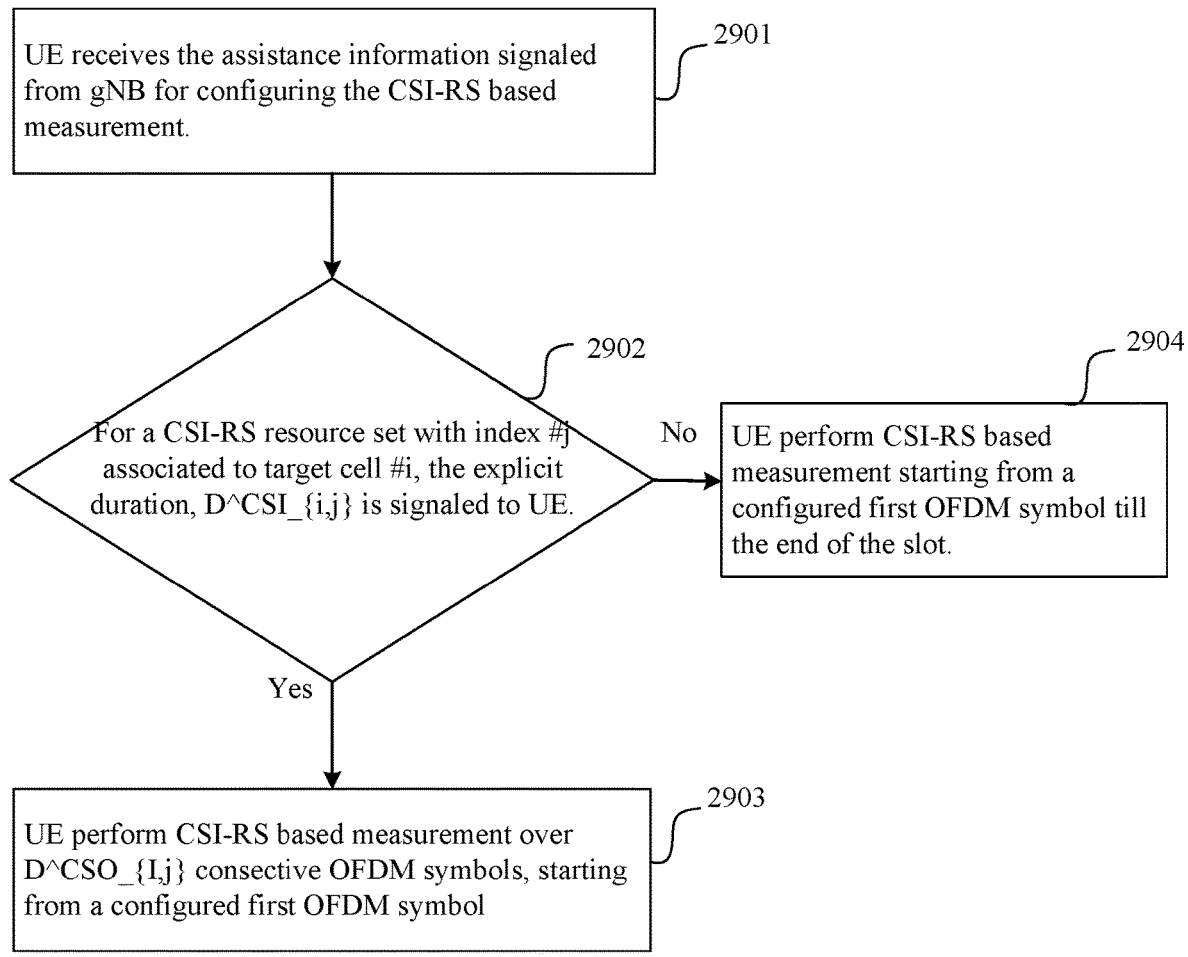
FIG. 29 illustrates the processing procedure at UE when the second approach in the second embodiment is enabled according to one embodiment of the present disclosure.

FIG. 29 illustrates the processing procedure at UE when the second approach in the seventh embodiment is enabled according to one embodiment of the present disclosure. The embodiment shown in FIG. 29 is for illustration only. Other embodiments could be used without departing from the scope of this disclosure.

In step 2901, the UE receives assistance information signaled from the gNB for configuring the CSI-RS based measurements. In step 2902, for a CSI-RS resource set with index # j associated to target cell # i, the explicit duration, D^CSI_{i,j} is signaled to the UE. For the CSI-RS resource set with index # j associated with target cell # i, the UE can perform CSI-RS based measurements over D^CSI_{i,j} consecutive OFDM symbols, starting from the first OFDM symbol, firstOS_{i, j}, when the explicit duration, D^CSI_{i,j}, is also signaled to UE in step 2903; otherwise, the UE can perform CSI-RS based measurements starting from the first OFDM symbol, firstOS_{i,j}, until the end of the associated measurement slot in step 2904. The first OFDM symbol to measure and the associated measurement slot can be configured to the UE by the gNB.

Embodiment 8: Reduction on Mobility Measurement Adapted to UE Mobility or Channel Condition The eighth embodiment of this disclosure consider a reduction on mobility measurements according to UE mobility or channel condition. The associated mobility measurement quantity can be a SS-RSRP, or a SS-RSRQ, or a SS-SINR, or carrier RSSI for SS/PBCH block based beam management, or L3 mobility, or RLM measurement, and CSI-RSRP, or CSI-RSRQ, or CSI-SINR, or CSI-RSSI for CSI-RS based beam management, or L3 mobility, or RLM measurement.

Figure 30:
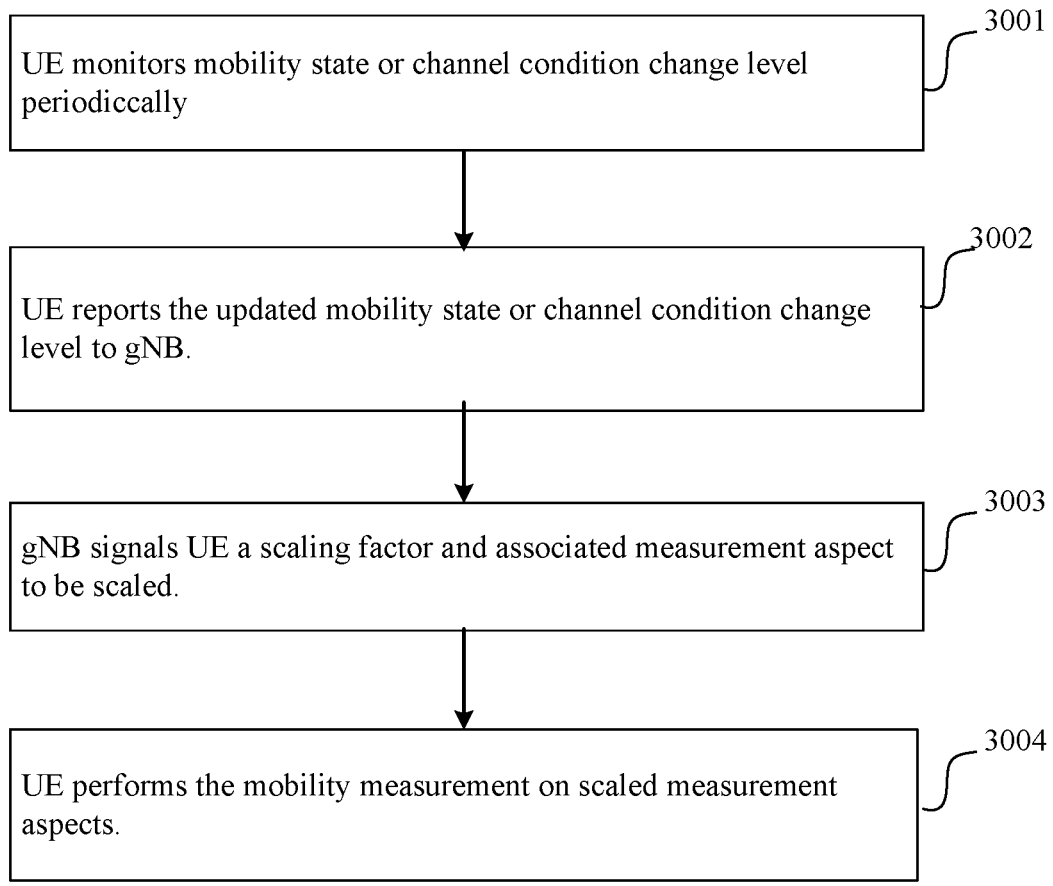
FIG. 30 illustrates an exemplary processing procedure at a UE to enable scaled mobility measurement defined in the third embodiment of the present disclosure.

FIG. 30 illustrates an exemplary processing procedure at a UE to enable scaled mobility measurement defined in the eighth embodiment of the present disclosure. The embodiment shown in FIG. 30 is for illustration only. Other embodiments could be used without departing from the scope of this disclosure.

In one approach, there can be N_MS predefined UE mobility states supported, such as denoted as MS_n, where n=0, . . . , N_MS-1. The N_MS mobility states can be defined in an ascending order. For example, when N^MS=3, the three mobility states can be: a very low UE mobility, a low UE mobility, and a normal UE mobility.

In one example, for UE mobility state configuration, the mobility state can be determined by a number of hand overs (HOs) over a predefined interval, T_HO. In this case, the index n increases with respect to the growth of number of HOs within time. T_HO. In another example, for UE mobility state configuration, the mobility state can be derived from a UE speed. In this case, the index n increases with the respect to the growth of UE speed.

In another approach, there can be L^CC_MQ predefined channel condition change levels supported, such as denoted as CC^MQ_l, where l=0 . . . . , L^CC_MQ-1. The L^CC_MQ channel condition change levels can be defined in an ascending order. For example, when L^CC_MQ=3, the three channel condition change levels can be: a very small channel condition change, a small channel condition change, and a normal channel condition change. The channel condition change level can be associated with a measurement quality, MQ, such as a CSI-RSRP. The channel condition change level can be derived from the variance of associated measurement quantity MQ over a time interval. T^MQ.

In step 3001, the UE can monitor the real-time mobility state and channel condition change level periodically. In step 3002, the UE can trigger a request on scaled mobility measurement by reporting its mobility state or channel condition change level to the gNB. In step 3003, the gNB can signal a scaling factor and corresponding measurement aspects to be scaled after receiving the updated mobility state and channel condition change level from the UE. In step 3004, the UE can perform a scaled mobility measurement on associated RS resources on associated measurement aspects accordingly. The associated reference sequence (RS) resources can be SS/PBCH blocks for SS/PBCH block based measurement, and CSI-RS resources set for CSI-RS based measurement in both synchronous and asynchronous networks.

The scaling factor signaled by the gNB can be selected from a predefined or configured set of values with size N, such as $\{s_0, \ldots s_1 \ldots, s_{N-1}\}$, where $0 \leq s_i \leq 100\%$. For example, the set of candidate values for scaling factor can be (0%, 25%, 50%, 100%). The gNB can signal the UE the scaling factor according to the UE mobility state or channel condition change level reported by the UE. The scaling factor can be applied to one or multiple measurement aspect(s).

One example of the measurement aspect to be scaled can be a number of measurement carriers, i.e. N^carriers, such that N^carriers=N^carriers_0*$s_i$, where N^carriers_0 is a total number of carriers configured to measure.

Another example of measurement aspect to be scaled can be a number of measurement cells. i.e., N^cells, such that N^cells=N^cells_0*$s_i$, where N^cells_0 is a total number of cells configured to measure.

Another example of the measurement aspect to be scaled can be a periodicity of SMTC window, such that T^SMTC=T^SMTC_0*$s_i$, where T^SMTC_0 is an initial configured periodicity of an associated SMTC window.

Another example of the measurement aspect to be scaled can be a bandwidth of CSI-RS resources to measure, i.e., BW^CSI, such that BW^CSL=BW^CSI_0,*$s_i$, where BW^CSI_0 is an initial bandwidth configured to measure per frequency layer.

Another example of the measurement aspect to be scaled can be a number of CSI-RS resources per target cell to measure, i.e., N^CSIperCell, such that N^CSIperCell=N^CSIperCell_0,*$s_i$, where N^CSIperCell_0 is an initial number of CSI-RS resources configured per target cell.

Embodiment 9: Optimization of RRM Measurement in C-DRX Mode

The ninth embodiment of this disclosure considers optimization for mobility measurements in RRC_CONNECTED DRX (C-DRX) mode.

In existing systems, a UE is only configured to perform CSI-RS based measurement confined in the active time of C-DRX and over RB resources within the associated DL active BWP. This could be inefficient and a UE may not able to report an associated measurement quantity in time, due to the restrictions in both the time and the frequency domains.

In this embodiment, approaches to provide more flexibility on mobility measurement in C-DRX mode are defined.

Figure 31:
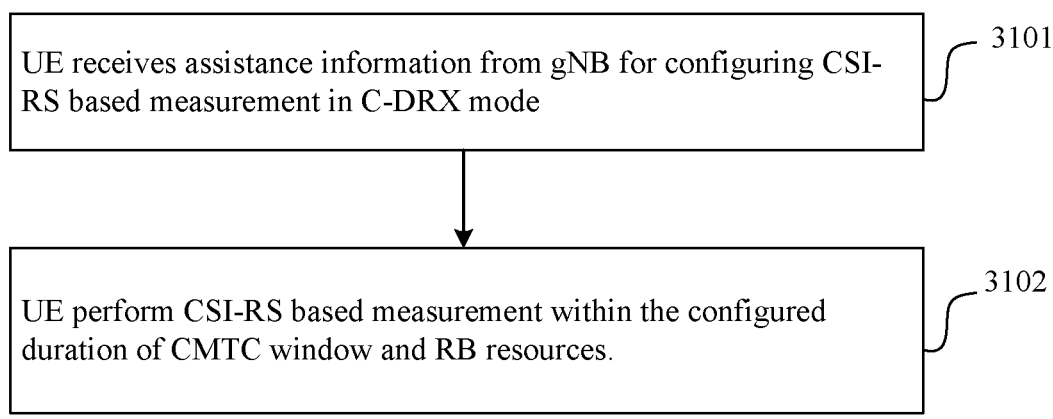
FIG. 31 illustrates an exemplary processing procedure at UE when the first approach according to the fourth embodiment of the present disclosure.

FIG. 31 illustrates an exemplary processing procedure at UE when a first approach according to the ninth embodiment of the present disclosure. The embodiment shown in FIG. 31 is for illustration only. Other embodiments could be used without departing from the scope of this disclosure.

In a first approach, a set of CSI-RS resources can be configured for mobility measurement in C-DRX mode. The associated mobility measurement quantity can be CSI-RSRP, or CSI-RSRQ, or CSI-SINR, or CSI-RSSI for CSI-RS based beam management or L3 mobility or RLM measurement.

In step 3101, the UE receives assistance information from a gNB for configuring CSI-RS based measurement in C-DRX mode. In step 3102, the UE performs the CSI-RS based measurements within the configured duration of CMTC window and RB resources.

The time domain configuration of the first approach can be determined by a CSI-RS based measurement timing configuration (CMTC) window associated with a C-DRX cycle. The CMTC per UE can be configured by assistance information signaled from the gNB. The related assistance information can be delivered to the UE through higher layer signaling and used for designing CMTC including the following aspects.

In one design aspect of CMTC, a periodicity of CMTC window, denoted as T^CMTC, can be associated with a C-DRX cycle, denoted as T^CDRX. T^CDRX can either be the long DRX cycle or short DRX cycle, such that T^CMTC=c0*T^CDRX, where c0>=1, is a positive integer.

In one example, c0 can be a fixed value predefined in a specification of the system operation. In another example, c0 is semi-static and provided to the UE through the high layer signaling. In yet another example, S^CMTC can be provided to the UE through L1 channels, such as a PDCCH. In another design aspect of CMTC, a list of associated cells to measure (i.e., target cells) is provided to the UE. The target cells can be cells with the configured BWP overlapped with the active DL BWP of the UE.

In yet another design aspect of CMTC, the time offset of CMTC window, denoted as O^CMTC is provided to the UE. The offset of CMTC window can be associated with the time offset of C-DRX, denoted as, O^CDRX. In one example, O^CMTC=O^CDRX+O_gap, where O_gap is constant.

In yet another design aspect of CMTC, the duration of CMTC window, denoted as D^CMTC is provided to the UE. The duration of CMTC window can be associated with the ON duration of CDRX, denoted as D^CDRX. In one example, D^CMTC=c1*D^CDRX, where c1 is a fraction, such that 0<c<1, e.g., c=0.1.

The frequency domain configuration of the first approach can be configured based on assistance information from the gNB. The related information can be provided to the UE through higher layer signaling and used for configuring the CSI-RS based measurement in frequency domain including the following aspects.

In one design aspect of frequency domain configuration, the target carrier is provided to the UE. The UE can be configured to measure a carrier within a range relative to the DL active BWP. Denoting the center of the carrier as RB^targetCarrier, the target carrier can be selected for the UE to measure, when abs(RB^targetCarrier−(startRB^BWP+N^BWP_RBs))<=Q_RBs, where QRBs is constant, and startRB^BWP, and N^BWP_RBs are start RB and the bandwidth of associated DL BWP, respectively.

In another design aspect of frequency domain configuration, the bandwidth of CSI-RS resources to measure for a target cell # i, denoted as BW^CSI_i, is provided to the UE. BW^CSI_i can be associated with the bandwidth of the active DL BWP for the UE, N^BWP_RBs. In one example, BW^CSI_i=N^BWP_RBs*c3, where c3 is a fraction, such that 0<c3<1, e.g. c3=0.25.

In a second approach, a sequence based wake-up signal (WUS) can be used to support mobility measurement outside the active time in C-DRX mode. The associated mobility measurement quantity can be WUS-RSRP, or WUS-RSRQ, or WUS-SINR, or WUS0-RSSI for WUS-RS based beam management, or L3 mobility, or RLM measurement.

Figure 32:
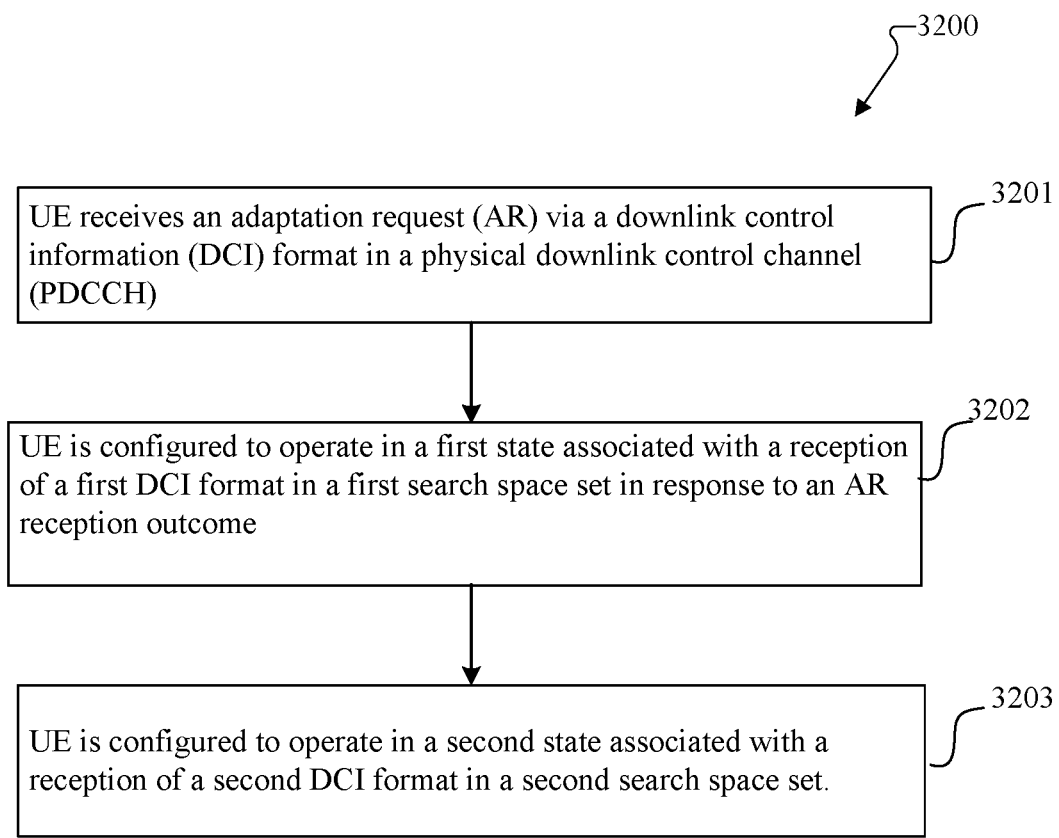
FIG. 32 illustrates a flowchart of an example method for operating a UE according to embodiments of the present disclosure.

FIG. 32 illustrates a flowchart of a method 3200 for operating a UE according to embodiments of the present disclosure. The embodiment of the method 3200 illustrated in FIG. 32 is for illustration only. FIG. 32 does not limit the scope of the present disclosure to any particular implementation. The method 3200 may be performed by a UE such as UE 116 or any other UEs discussed herein.

The method 3200 begins with the UE 116 receiving an adaptation request (AR) via a downlink control information (DCI) format in a physical downlink control channel (PDCCH) from a base station in step 3201. For example, in step 3201, the first DCI format may schedule a reception of a first physical downlink shared channel (PDSCH), and the second DCI format may schedule a reception of a second PDSCH, wherein each of the first and second states may be a value for a minimum timing offset between a last symbol for a reception of a DCI format scheduling a PDSCH reception and a first symbol of the PDSCH reception, and a value of the first state may be larger than a value of the second state.

For another example, in the step 3201, the first DCI format may schedule a reception of a first channel state information reference signal (CSI-RS), the second DCI format may schedule a reception of a second CSI-RS, wherein each of the first and second states is a value for a minimum timing offset between a last symbol for a reception of a DCI format scheduling a CSI-RS reception and a first symbol of the CSI-RS reception, and a value of the first state is larger than a value of the second state.

For another example in the step 3201, the first DCI format may schedule a reception of a first physical downlink shared channel (PDSCH), the second DCI format may schedule a reception of a second PDSCH, wherein each of the first and second states may be a value for a number of layers associated with multi-input multi-output (MIMO) for a PDSCH reception, and a value of the first state may be larger than a value of the second state.

For another example, each of the first and second states is associated with PDCCH monitoring for a DCI format, wherein the first state is skipping of PDCCH monitoring for the first DCI format, and the second state is PDCCH monitoring for the second DCI format. In one option, skipping of PDCCH monitoring is for a number of discontinuous reception (DRX) cycles.

For another example, the UE may further transmit assistance information. The assistance information includes one or more configurations for the first state, and the assistance information is provided by a medium access control (MAC) control element (CE).

The UE 116 then configure the transceiver to operate in a first state associated with a reception of a first DCI format in a first search space set in response to an AR reception outcome in step 3203.

Thereafter, the UE 116 configures the transceiver to operate in a second state associated with a reception of a second DCI format in a second search space set in step 3203.

The BS 102 may perform a reciprocal process in that the BS 102 transmits an adaptation request (AR) via a downlink control information (DCI) format in a physical downlink control channel (PDCCH), and the BS operates in a first state associated with a transmission of a first DCI format in a first search space set depending on the AR transmission, and the BS operates in a second state associated with a transmission of a second DCI format in a second search space set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) comprising:
a transceiver configured to receive a first physical downlink control channel (PDCCH), wherein the first PDCCH provides a first downlink control information (DCI) format that includes a first adaptation request (AR) to indicate a value for at least one of:
  a first minimum slot offset,
  a second minimum slot offset,
  a maximum number of spatial layers, and
  a time duration for skipping PDCCH monitoring; and
a processor operably coupled to the transceiver, the processor configured to indicate to the transceiver to operate in a first state in response to the first AR,
wherein the transceiver is further configured to:
  operate in the first state after a predetermined application delay, and
  receive a second PDCCH, wherein:
    the second PDCCH provides a second DCI format that includes a second AR and
    an end of the second PDCCH reception is after an end of the first PDCCH reception by a time that is smaller than the predetermined application delay, and
wherein the processor is further configured to determine that the second AR is the same as the first AR.

2. The UE of claim 1, wherein the transceiver is configured to:
receive a physical downlink shared channel (PDSCH) when the second DCI format schedules a reception of the PDSCH, wherein a time between the end of the second PDCCH reception and a beginning of the PDSCH reception is not smaller than the first minimum slot offset, wherein the first state corresponds to the first minimum slot offset; or transmit a physical uplink shared channel (PUSCH) when the second DCI format schedules a transmission of the PUSCH, wherein a time between the end of the second PDCCH reception and a beginning of the PUSCH transmission is not smaller than the second minimum slot offset, wherein the first state corresponds to the second minimum slot offset.

3. The UE of claim 2, wherein:
the second DCI format schedules a reception of a channel state information reference signal (CSI-RS), and
the transceiver is further configured to receive the CSI-RS, wherein a time between the end of the second PDCCH reception and the beginning of the CSI-RS reception is not smaller than the first minimum slot offset.

4. The UE of claim 1, wherein:
the processor is further configured to disable an indication to the transceiver to operate a second state in response to the second AR.

5. The UE of claim 1, wherein:
the first DCI format schedules a reception of a physical downlink shared channel (PDSCH) and includes a bandwidth part (BWP) index,
the processor is further configured to indicate the transceiver to switch to a BWP with the BWP index, and
the first state corresponds to the PDSCH reception with a number of spatial layers in the BWP, wherein the number of spatial layers is no larger than the maximum number of spatial layers.

6. The UE of claim 1, wherein:
the first state corresponds to suspending PDCCH receptions that provide the first DCI format to indicate the time duration for skipping PDCCH monitoring; and
the transceiver is further configured to resume the PDCCH receptions that provide the first DCI format after the first state.

7. The UE of claim 1, wherein the transceiver is further configured to transmit one or more values for the first state using a medium access control (MAC) control element (CE).

8. A base station comprising:
a transceiver configured to transmit a first physical downlink control channel (PDCCH), wherein the first PDCCH provides a first downlink control information (DCI) format that includes a first adaptation request (AR) to indicate a value for at least one of:
a first minimum slot offset,
a second minimum slot offset,
a maximum number of spatial layers, and a time duration for skipping PDCCH monitoring; and
a processor operably connected to the transceiver, the processor configured to indicate to the transceiver to operate in a first state based on transmission of the AR,
wherein the transceiver is further configured to:
operate in the first state after a predetermined application delay, and
transmit a second PDCCH, wherein:
the second PDCCH provides a second DCI format that includes a second AR, and
an end of the second PDCCH transmission is after an end of the first PDCCH transmission by a time that is smaller than the predetermined application delay, and wherein the processor is further configured to determine that the second AR is the same as the first AR.

9. The base station of claim 8, wherein the transceiver is configured to:
transmit a physical downlink shared channel (PDSCH) when the second DCI format schedules a transmission of the PDSCH, wherein a time between the end of the second PDCCH transmission and a beginning of the PDSCH transmission is not smaller than the first minimum slot offset, wherein the first state corresponds to the first minimum slot offset; or receive a physical uplink shared channel (PUSCH) when the second DCI format schedules a reception of the PUSCH, wherein a time between the end of the second PDCCH transmission and a beginning of the PUSCH reception is not smaller than the second minimum slot offset, wherein the first state corresponds to the second minimum slot offset.

10. The base station of claim 9, wherein:
the second DCI format schedules a transmission of a first channel state information reference signal (CSI-RS), and
the transceiver is further configured to transmit the CSI-RS, wherein a time between the end of the second PDCCH transmission and the beginning of the CSI-RS transmission is not smaller than the first minimum slot offset.

11. The base station of claim 8, wherein:
the processor is further configured to disable an indication to the transceiver to operate a second state based on the second AR.

12. The base station of claim 8, wherein:
the first DCI format schedules a transmission of a physical downlink shared channel (PDSCH) and includes a bandwidth part (BWP) index,
the processor is further configured to indicate the transceiver to switch to a BWP with the BWP index, and
the first state corresponds to the PDSCH transmission with a number of spatial layers in the BWP, wherein the number of spatial layers is no larger than the maximum number of spatial layers.

13. The base station of claim 8, wherein:
the first state corresponds to suspending PDCCH transmissions that provide the first DCI format to indicate the time duration for skipping PDCCH monitoring; and
the transceiver is further configured to resume the PDCCH transmissions that provide the first DCI format after the first state.

14. The base station of claim 8, wherein the transceiver is further configured to receive one or more values for the first state using a medium access control (MAC) control element (CE).

15. A method for a user equipment (UE), the method comprising:
receiving, by a transceiver in the UE, a first physical downlink control channel (PDCCH), wherein the first PDCCH provides a first downlink control information (DCI) format that includes a first adaptation request (AR) to indicate a value for at least one of:
a first minimum slot offset,
a second minimum slot offset,
a maximum number of spatial layers, and
a time duration for skipping PDCCH monitoring;
indicating, by a processor in the UE, to the transceiver to operate in a first state in response to the first AR;
operating the transceiver in a first state after a predetermined application delay;

receiving a second PDCCH, wherein:
  the second PDCCH provides a second DCI format that includes a second AR, and
  an end of the second PDCCH reception is after an end of the first PDCCH reception by a time that is smaller than the predetermined application delay, and
determining that the second AR is the same as the first AR.

16. The method of claim 15, further comprising:
receiving a physical downlink shared channel (PDSCH) when the second DCI format schedules a reception of the PDSCH, wherein a time between the end of the second PDCCH reception and a beginning of the PDSCH reception is not smaller than the first minimum slot offset, wherein the first state corresponds to the first minimum slot offset; or
transmitting a physical uplink shared channel (PUSCH) when the second DCI format schedules a transmission of the PUSCH, wherein a time between the end of the second PDCCH reception and a beginning of the PUSCH transmission is not smaller than the second minimum slot offset, wherein the first state corresponds to the second minimum slot offset.

17. The method of claim 16, wherein:
the second DCI format schedules a reception of a first channel state information reference signal (CSI-RS), and
the method further comprises receiving the CSI-RS, wherein a time between the end of the second PDCCH reception and the beginning of the CSI-RS reception is not smaller than the first minimum slot offset.

18. The method of claim 15, further comprising disabling an indication to the transceiver to operate a second state in response to the second AR.

19. The method of claim 15, wherein:
the first DCI format schedules a reception of a physical downlink shared channel (PDSCH) and includes a bandwidth part (BWP) index,
the method further comprises indicating the transceiver to switch to a BWP with the BWP index, and
the first state corresponds to the PDSCH reception with a number of spatial layers in the BWP, wherein the number of spatial layers is no larger than the maximum number of spatial layers.

20. The method of claim 15, wherein:
the first state corresponds to suspending PDCCH receptions that provide the first DCI format to indicate the time duration for skipping PDCCH monitoring, and
the method further comprises resuming the PDCCH receptions that provide the first DCI format after the first state.

* * * * *